(12) United States Patent
Didomenico

(10) Patent No.: US 12,345,993 B2
(45) Date of Patent: Jul. 1, 2025

(54) LIGHT CONTROL BY MEANS OF FORCED TRANSLATION, ROTATION, ORIENTATION, AND DEFORMATION OF PARTICLES USING DIELECTROPHORESIS

(71) Applicant: Giant Leap Holdings, LLC, Orinda, CA (US)

(72) Inventor: Leo D. Didomenico, Orinda, CA (US)

( * ) Notice: Subject to any disclaimer, the term of this patent is extended or adjusted under 35 U.S.C. 154(b) by 952 days.

(21) Appl. No.: 17/187,622

(22) Filed: Feb. 26, 2021

(65) Prior Publication Data

US 2021/0208469 A1     Jul. 8, 2021

Related U.S. Application Data

(63) Continuation-in-part of application No. 16/530,889, filed on Aug. 2, 2019, now Pat. No. 11,385,516.

(60) Provisional application No. 62/985,327, filed on Mar. 5, 2020.

(51) Int. Cl.
| | |
|---|---|
| *G02B 26/08* | (2006.01) |
| *G02B 1/06* | (2006.01) |
| *G02F 1/166* | (2019.01) |
| *G02F 1/167* | (2019.01) |
| *G02F 1/1676* | (2019.01) |
| *G02F 1/169* | (2019.01) |
| *G02F 1/29* | (2006.01) |

(52) U.S. Cl.
CPC ............... *G02F 1/167* (2013.01); *G02B 1/06* (2013.01); *G02F 1/166* (2019.01); *G02F 1/1676* (2019.01); *G02F 1/169* (2019.01); *G02F 2202/06* (2013.01); *G02F 2202/36* (2013.01); *G02F 2203/03* (2013.01)

(58) Field of Classification Search
CPC . G02B 1/06; G02F 1/167; G02F 1/166; G02F 1/1676; G02F 1/169; G02F 2202/06; G02F 2202/36; G02F 2203/03
USPC .................................. 359/245–279, 290–320
See application file for complete search history.

(56) References Cited

U.S. PATENT DOCUMENTS

| | | | |
|---|---|---|---|
| 8,217,891 B2 * | 7/2012 | Wang .................... | G09G 3/344 345/107 |
| 2007/0171334 A1 * | 7/2007 | Jeng ....................... | B82Y 20/00 349/86 |
| 2011/0085229 A1 * | 4/2011 | Lavrentovich ........... | G02F 1/29 977/932 |
| 2012/0188295 A1 * | 7/2012 | Joo .......................... | G02F 1/17 345/690 |
| 2012/0193551 A1 * | 8/2012 | Christophersen ......... | H01J 3/14 250/397 |
| 2015/0246553 A1 * | 9/2015 | Tamoto ................... | G02F 1/167 347/199 |

(Continued)

FOREIGN PATENT DOCUMENTS

WO    WO-2011136474 A2 *   11/2011       G02F 1/167

*Primary Examiner* — Mahidere S Sahle
(74) *Attorney, Agent, or Firm* — The Law Office of Austin Bonderer, PC; Austin Bonderer

(57) ABSTRACT

Methods and embodiments are provided for the coordinated translation, rotation, and deformation of swarms of nanoparticles by means of forced diffusion by dielectrophoresis in order to affect the scattering of light and the synthesis of the central quantity to all optics: refractive index. Applications include electronic beam steering of light, concentration of sunlight, augmented reality displays, and medical diagnostics, and many others.

25 Claims, 16 Drawing Sheets

(56) References Cited

U.S. PATENT DOCUMENTS

| | | | | |
|---|---|---|---|---|
| 2015/0261023 A1* | 9/2015 | Lavrentovich | ...... | G02F 1/13306 |
| | | | | 349/1 |
| 2015/0346580 A1* | 12/2015 | Williams | ................ | G02F 1/353 |
| | | | | 977/783 |
| 2019/0217309 A1* | 7/2019 | Yossifon | ................ | B03C 5/028 |
| 2019/0367749 A1* | 12/2019 | Garcia | .................... | C09D 5/26 |
| 2021/0318566 A1* | 10/2021 | Oh | ........................ | G02F 1/0136 |

\* cited by examiner

FIG. 1A
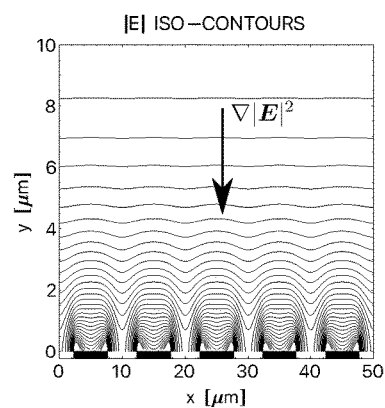
FIG. 1B
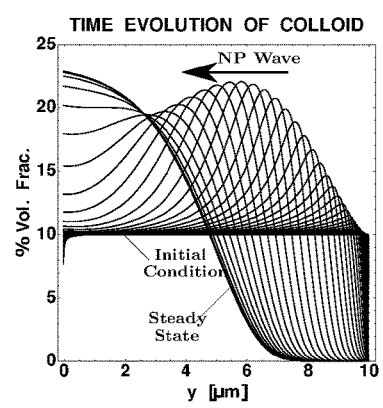
FIG. 1C
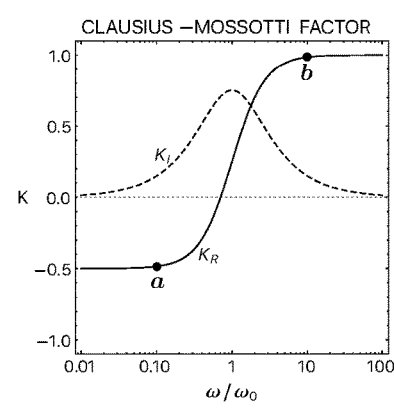
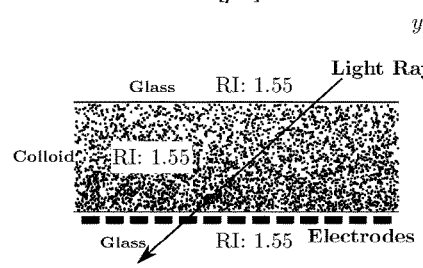
FIG. 1D
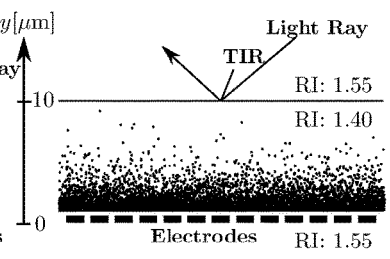
FIG. 1E
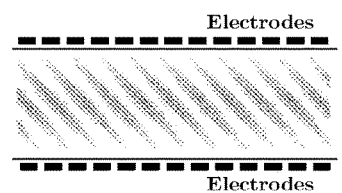
FIG. 1F

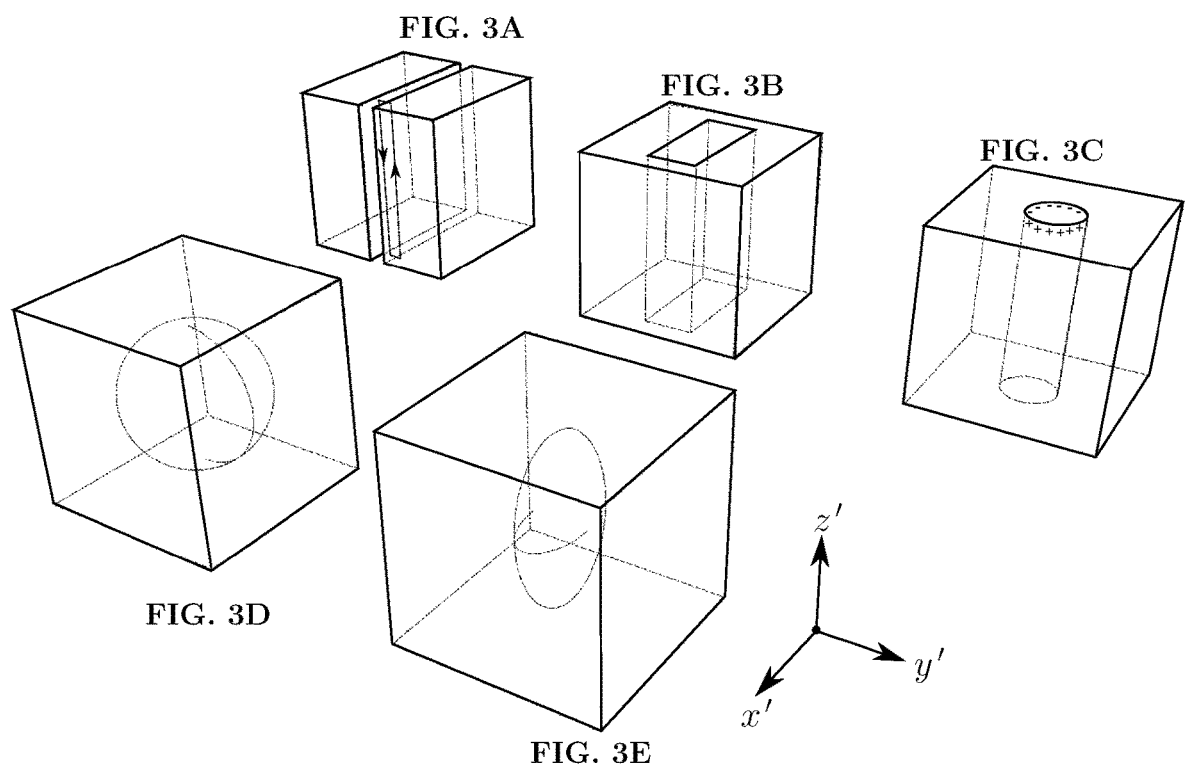

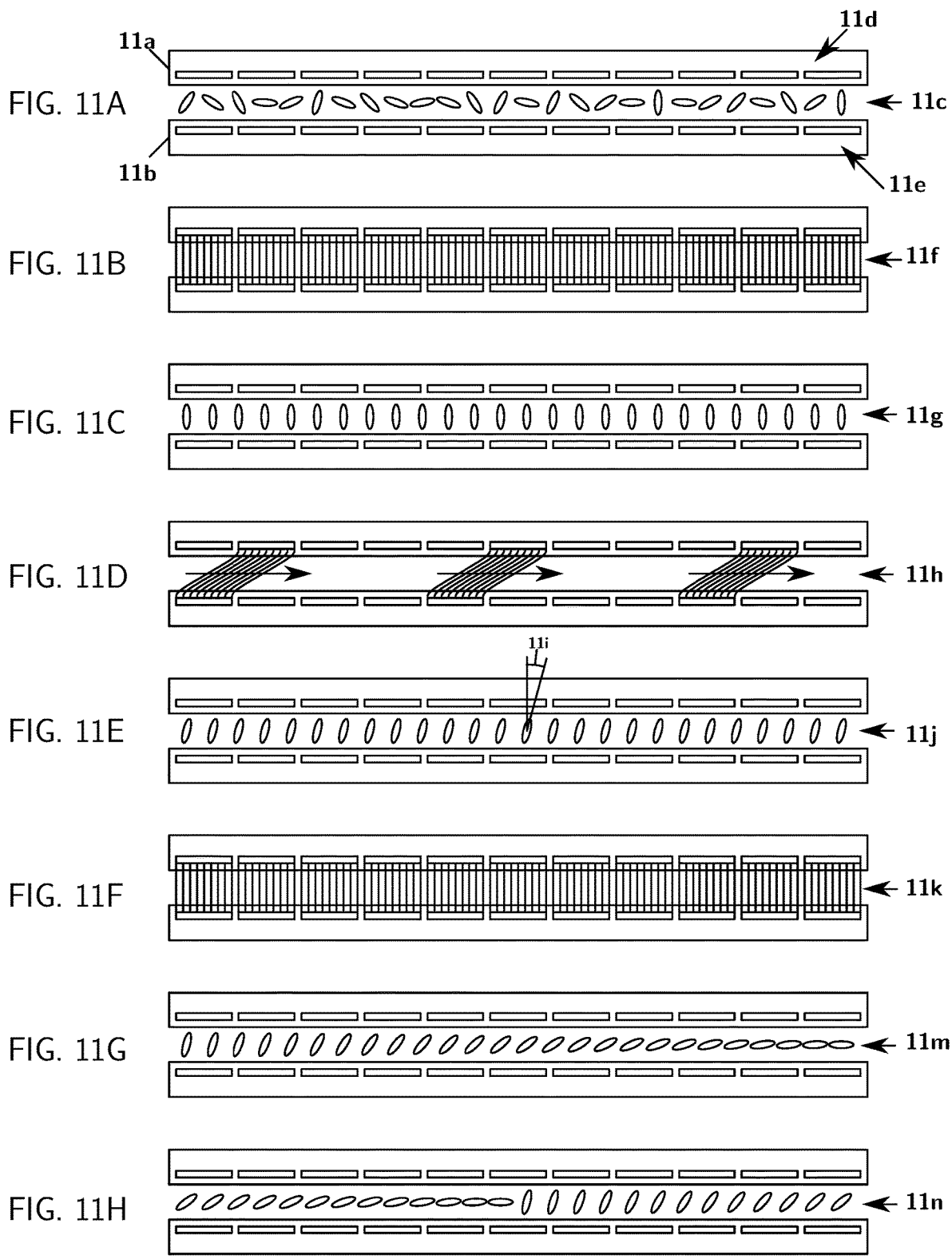

LIGHT CONTROL BY MEANS OF FORCED TRANSLATION, ROTATION, ORIENTATION, AND DEFORMATION OF PARTICLES USING DIELECTROPHORESIS

CROSS REFERENCE TO RELATED APPLICATIONS

This application claims benefit of provisional patent application number U.S. 62/985,327, entitled "Agile Light Control By Means of Orientational Dielectrophoresis and Electrorotation," which was filed by Leo D. DiDomenico on 2020 Mar. 5, the entirety of which is incorporated herein by reference. This application is also a continuation-in-part of U.S. patent application Ser. No. 16/530,889, filed Aug. 2, 2019 and entitled, "Agile Light Con-trol by Means of Noise, Impulse, and Harmonic Signal Induced Dielectrophoresis Plus Other Phoretic Forces to Control Optical Shock Waves, Scattering, and the Re-fractive Index of Colloids; Applications Include: Solar Electricity, Solar Smelting, Solar Desalination, Augmented-Reality, LiDAR, 3D-Printing, High-Power Fiber Lasers, Electronic Lenses, Light Beam Steering, Robotic Vision, Sensor Drones, Diffraction-Minimizing Light Beams, Power Beaming, and Software-Configurable Optics," which was filed by Leo D. DiDomenico on 2019 Aug. 2 and is included herein in its entirety by this reference.

TECHNICAL FIELD OF INVENTION

This disclosure describes the direct electronic control of light by synthesizing the complex-valued tensor-form of the refractive index in space and time using nanoparticle distributions, orientations, and deformable particle shapes in at least one of a gas, a vacuum, a solution, a colloid, and suspension to control scattering and redirect light and its wavefronts, often along substantially curved trajectories, while also controlling polarization, intensity, loss and gain and other optical parameters.

BACKGROUND ART

In U.S. Pat. No. 10,371,936, having patent date 2019 Aug. 6 and entitled, "Wide Angle, Broad-Band, Polarization Independent Beam Steering and Concentration of Wave Energy Utilizing Electronically Controlled Soft Matter," which is included herein in its entirety by this reference, the current applicant provides a first generation (G1) of a light control technology based on mixing two or more liquid chemicals to form a solution that provides a Refractive Index Matching (RIM) liquid. The G1 technology is characterized by mixing the molecules of two or more liquid chemicals, both of which have molecules that are less than 1 nm in maximum size. The resulting liquid solution may be advected through capillaries by various means (e.g. pressure differences) to hide and reveal optical boundaries so that total internal reflection (TIR) may provide light steering. In subsequent discussions G1 may be used to refer to the technology of this paragraph and the patent mentioned herein.

In patent application Ser. No. 16/530,8879, which is described above in section: Cross Reference to Related Applications, the current author provides a second generation (G2) of a light control technology based on changing at least one of the liquid components of the G1 technology to a (typically) solid spherical nanoparticle so that dielectrophoresis (DEP) can provide a means for electronically controlled advection. DEP comprising conventional DEP that uses two-phase electrical excitation to provide pondermotive forces in the positive direction of the gradient of the square of the electric field (pDEP), or in the negative direction of the gradient of the square of the electric field (nDEP). DEP also comprising four-phase electrical excitation to provide pondermotive forces in the direction of a traveling wave (twDEP). Substantial theory and examples were provided for using nanoparticle spatial translation to affect control of the scalar refractive index and consequently provide light control. Additionally, the use of electrical noise, which is in the form of band-limited electric fields, is shown to lower the required voltage levels for DEP in the frequency domain. In subsequent discussions G2 may be used to refer to the technology of this paragraph and the patent application mentioned in this paragraph. One of the key distinguishing features of G1 from G2 is that G1 uses solutions with particle size less than 1 nm while G2 is based on colloids with particle size between 1 nm and 1000 nm for visible light optics, but with a strong preference towards particle size of about 30 nm to reduce Tyndall effect at the same time as increasing DEP forces by a million over particles in solution.

The reader should note that the current disclosure is about a third generation (G3) of this author's light control technology. In G3 at least one of particle translation, rotation, orientation and deformation in an electric field provides a geometric anisotropy and a resulting anisotropy in the refractive index. This allows the use of electric fields to actively take control of the complex-valued tensor form of the refractive index of a colloid by light scattering techniques in such a way to electronically manipulate the flow of light directly and dynamically. G2 and G3 in combination allow optics by manipulating particles in a colloid. That said, the emphasis in G3 is rotation, orientation, and deformation of particles.

Additional prior art is found in Liquid Crystal Displays (LCDs) and Suspended Particle Devices (SPDs), which are examples of fluidic devices that use the asymmetry of a plurality of particles to control light. The distinguishing feature of these prior art devices is that they use electromagnetic fields having zero frequency $\omega=0$ electrode excitation. For avoidance of doubt, zero frequency does not mean that there is no ON and OFF switching. Moreover, even if AC fields are used in this prior art, the fields are not used to select the particle orientation as is the case in the G3 technology of this disclosure where $\omega \neq 0$.

In practical terms, this means that while LCDs and SPDs have two orientations the devices of this disclosure can have an infinite number of orientations. This corresponds to changing the scattering and refractive index properties continuously and having a continuous control over light scattering and the effective refractive index of light. This includes the G3 control over optical loss, optical amplification, ray trajectory, wavefront curvature, polarization, and optically applied forces on particles.

BRIEF DESCRIPTION OF THE DRAWINGS

The foregoing discussion is only an introduction and other objects, features, aspects, and advantages will become apparent from the following detailed description and drawings of physical principles given by way of illustration. Note that figures are often drawn for improved clarity of the underlying physical principles, are not necessarily to scale, and have certain idealizations introduced to show the essence of the method and embodiments and to make descriptions clear.

FIG. 1A shows electric fields magnitudes from an array of electrodes.

FIG. 1B shows a nanoparticle concentration as a function of time resulting from a step input in electric fields for dielectrophoresis.

FIG. 1C shows an example Clausius-Mossotti factor for spherical particles.

FIG. 1D shows an example of an optical switch passing light based on particle translation and light scattering only.

FIG. 1E shows an example of an optical switch reflecting light based on particle translation and light scattering only.

FIG. 1F shows an example of a structured nanoparticle layer forming a grating that can scatter light.

FIG. 3A shows a finite gap of a first dielectric that is surrounded by a second dielectric.

FIG. 3B shows an infinite rectangular tube of a first dielectric that is surrounded by a second dielectric.

FIG. 3C shows an infinite cylindrical tube of a first dielectric that is surrounded by second dielectric.

FIG. 3D shows a sphere of a first dielectric that is surrounded by second dielectric.

FIG. 3E shows a spheroid of a first dielectric that is surrounded by second dielectric.

FIG. 11A shows a cross section of light steering panel with random orientation of nanoparticles in a colloid.

FIG. 11B shows a cross section of light steering panel with electric fields in the colloid control volume to align nanoparticles.

FIG. 11C shows a cross section of light steering panel with aligned nanoparticles.

FIG. 11D shows a cross section of light steering panel with perturbation electric fields sweeping through the colloid control volume.

FIG. 11E shows a cross section of light steering panel with nanoparticles having an angular perturbation.

FIG. 11F shows a cross section of light steering panel with electric fields within the colloid control volume that have at least one of different field strength, different frequency, and different on-time so as to set the orientation of nanoparticles as a function of position.

FIG. 11G shows a cross section of light steering panel with nanoparticles having different orientations along the colloid control volume.

FIG. 11H shows a cross section of light steering panel with an alternative angular orientation distribution of nanoparticles along the colloid control volume.

SUMMARY

Figures 2A, 2B, 2C, 2D, 2E:
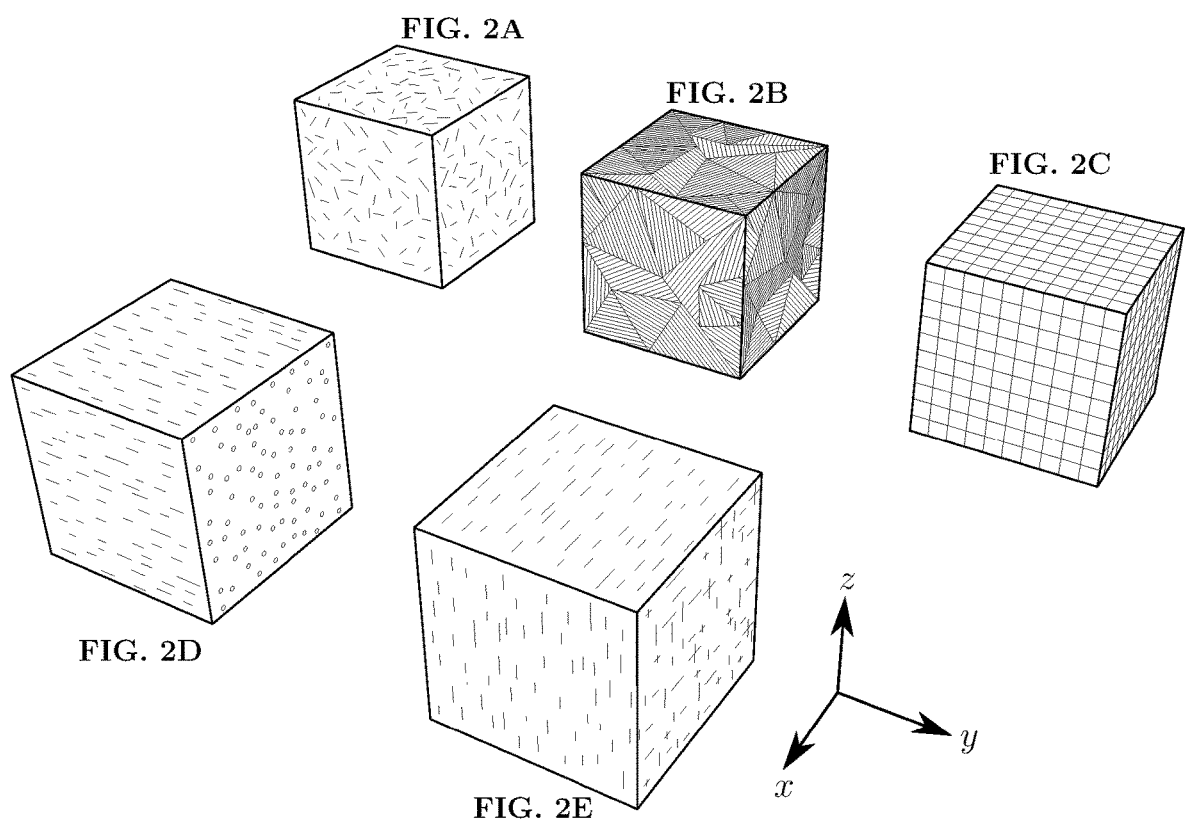
FIG. 2A shows completely random cylindrical molecules (from a distance) that create an amorphous isotropic material
FIG. 2B shows a polycrystalline material that is on average isotropic.
FIG. 2C shows a crystalline material that is anisotropic-except for cubic crystals.
FIG. 2D shows cylindrical molecules that are all oriented along the long axis and otherwise placed randomly.
FIG. 2E shows cylindrical molecules that are all oriented along the short axis and otherwise placed randomly.

Methods and embodiments are provided for the coordinated translation, rotation, and deformation of large numbers of nanoparticles by means of forced diffusion by dielectrophoresis in order to affect the scattering of light and the synthesis of the central quantity to all optics: refractive index. Applications include electronic beam steering of light, concentration of sunlight, augmented reality displays, and medical diagnostics, and many others.

THE WRITTEN DESCRIPTION

Foundational Physical Principles

Introduction

The technology disclosed herein is named Particle Swarm Optics (PSO) by this author to reflect its physical presentation of a swarm of electronically coordinated particles to affect optics. PSO is used to electronically synthesize the quantity central to all optics and photonics: Refractive Index (RI). This is done by means of light scattering. The objective of the technology is a transparent material that is software programmable to become an optical system as its internal structure adapts and changes quickly at the scale of optical wavelengths. This is accomplished by using electronically controlled Dielectrophoresis (DEP) to provide forces, torques, and stress on electrically neutral nanoparticles (NPs) within a colloid or suspension for coordinated translation, continuous rotation, transient orientation, and/or deformation of NPs using up to several tens of thousands of sub-wavelength NPs per cubic micron. Historically, manipulating small numbers of cells for medicine, biology, and genetic analysis has been the predominant use of dielectrophoresis. However, here DEP is used to typically control "a swarm" of light scattering NPs to synthesize isotropic and/or anisotropic RI for many optics and electromagnetic radiation control applications.

Again, for the avoidance of doubt a solution contains particles that are typically smaller than 1 nm, a colloid contains particles that are between 1 nm and 1,000 nm, and a suspension has particles that are larger than 1,000 nm. Both the continuous medium and dispersed medium (e.g. particles therein) can be a gas, liquid, and/or solid. Different types of colloids exist. If the dispersed medium is a solid then it is called a sol and include: solid aerosol (e.g. smoke, and dust), liquid sol (e.g. paint and milk), solid sol (e.g. ruby glass). If the dispersed medium is a liquid then the colloids include: liquid aerosols (e.g. fog and mist), emulsions (e.g. milk), and gels (e.g. gelatin). If the dispersed medium is gas then the colloids include: liquid foam (e.g. whipped cream) and solid foams (e.g. aerogel). In this document most colloids are liquid sols and emulsions. However, other types of colloid may in certain circumstances also be applicable. Additionally, larger particles of suspensions may be used in optical systems under certain conditions. Therefore, when a term like nanoparticle (NP) is used it is to be understood that in certain applications the particle may in fact be larger even many microns in size. Note, for controlling sub-millimeter wave "light" radiation even larger sized particles may be used. Also, for this disclosure the continuous medium may also be a vacuum or gas, so that devices can work in space without freezing or boiling.

PSO's historical origin is concentrated solar energy with a first application area of Concentrating Solar Thermal (CST) for intense heat for industrial electricity, steel smelting, desalination, glass, etc. without fossil fuels. A second application area is display technology such as compact virtual reality displays, and RGB laser displays. A third application area is lasers for cutting, welding, hole drilling, beamed energy-distribution networks, high-energy fiber bundle lasers with cladding-based RI phase shifters & thermal compensation, active beam-combiners, solid/wet-state beam directors, self-healing optics, and wavefront compensators. This impacts areas such as beamed energy distributions networks for powering airborne drones. A fourth application area is LiDAR transceivers, THz-Wave beam steering, broad-band optical antennas, inertial sensors, single-pixel cameras. A fifth application area is information technologies such as optical neural networks, quantum computing optics, 5G Light Fidelity (LiFi) networks. A sixth application area is meta-materials such for adaptive thermal signature control via fluidic photonic band-gap meta-materials. A seventh application area is optics for very large aperture adjustable-membrane-optics for satellites & astronomy, dynamic free-form optics, glancing-angle reflections for γ-ray astronomy, adaptive lighting, negative RI optics induced by resonant NP clusters, and dynamic holograms. Many other features and applications exist.

PSO is based on DEP, which provides forces, torques, and stresses on uncharged particles. The forces are on electrically neutral particles and in the direction of the electric field's energy gradient and not in the direction of the electric field itself. For the forces to be in the direction of the field itself the particles would have to be charged, and this would imply electrophoresis (nota bene!!) not dielectrophoresis as the governing process. Furthermore, torques require anisotropic media and/or non-spherical NP shapes so the electric field internal to the particle is not in the same direction as the electric field external to the NP.

The simplest PSO system is based on a paper-thin colloid sandwiched between two transparent glass sheets with transparent electrodes printed on the glass. Light passing through the panels is redirected, focused, and/or wavefront compensated depending on the spatial distribution of NPs and their orientation. Coordinating this is a microprocessor that converts the desired behavior of light into a RI distribution in space and time. This is then converted into an array of oscillating voltage amplitudes, phases, and frequencies that are applied to transparent pixelated electrodes to create the needed electric fields to control DEP forces F and torques T on the NPs in the colloid. The resulting forces and torques on NPs in the liquid causes changes on at least one of a NP's position, orientation and shape so that light scattering phenomena provide an effective average RI of the colloid from point-to-point to provide a controllable graded refractive index. For example, a colloid's liquid component may have a low RI of about 1.4, and its NP components have a high RI of almost 2.9 so that the range of the synthesized RI is $1.4 \leq RI \leq 2.4$, though multi-scattering and other effects may decrease this range somewhat. Simple applications using dielectric NPs include steering, focusing, and general wavefront control of light. The use of metals, dielectrics, semiconductors, crystals like titanium dioxide, cage molecules (e.g. Bucky balls), cluster-particles with resonances, electrets, biologically self-assembled particles, quantum dots, plasmonic dots, doped glass with optical gain, bubbles, viruses, polyimide NPs, and other NPs and NP combinations can extend optical functionality into advanced areas such as laser sources, neural networks, and quantum computing.

Stable colloids with maximum NP size, typically between 30 nm-40 nm diameter, are used for visible light RI synthesis and should ideally stay in the colloidal suspension indefinitely. The colloid must also be optically clear and of low optical insertion loss at 10 μm colloid thickness and have the correct conductivity and permittivity of liquid and NPs to create the correct response of the electric susceptibility for DEP force control by impressing different frequencies. Colloids must not aggregate via Van der Waals, Casimir, and other short range forces; do not present an undesired color due to light-absorbing crystal-structure defects from NP manufacture, and have a number of physiochemical properties related to fluids, particle size, shape, composition, and non-toxicity. Another set of complex considerations also exist for the choice of the liquid. Some of the issues include viscosity, temperature stability, chemical stability, photostability, high transmissivity, ionic vs. covalent liquids, Newtonian fluids changing to non-Newtonian fluids at the nano-scale, toxicity, and others. An example of this colloid synthesis complexity is the use of irradiation of newly fabricated NPs by intense γ-rays, X-ray, ultraviolet light, and/or neutron bombardment to reconfigure crystal structure and convert dark-colored absorptive colloids into highly transparent optical materials. High-quality colloids have been demonstrated in this way in academic and industrial labs. Also, the minimization of undesired Tyndall scattering by a careful selection of particle size and its bulk RI is an important consideration.

Additionally, DEP excitation frequencies typically occur between 1 kHz and 1 GHz at 1 KV. However, a noise voltage can trade kV-level sine waves for logic-level signal sources using an easily generated large bandwidth. For example, a 1 kV sinusoidal signal can be converted into a modest 1 V/√Hz noise level at 1 MHz bandwidth—this allows low-cost electronics.

Next, a survey of equations and processes to synthesize RI based on NP diffusion of spheres, prolate spheroids, and oblate spheroids follows. In particular, the state of colloid can be represented by two or more probability density functions (PDFs). The first PDF $f_F = f_F(r, t, \omega)$ is for NP positions and connects to particle translation by DEP induced forces. The second PDF $f_T = f_T(r, t, \theta, \phi, \omega)$ is for NP orientation and connects to particle rotation by DEP induced torques. In these equations r is position of a differential volume within the colloid, t is time, a NP's zenith angle is θ, a NP's azimuth angle is ϕ, and ω is the DEP electric field excitation frequency.

Further, Re[•] is the real part function, F is the average force on a NP, T is the average torque on a NP, $\epsilon_L(\omega)$ is the permittivity of the liquid at DEP frequency ω, ν is the volume of a NP, $\bar{\bar{\chi}}(\omega)$ is the NP's tensor electric susceptibility at DEP frequency ω (e.g. typically up to 1 kHz to 1 GHZ) due to NP shape, $E_{in}(r)$ is the input electric field phasor at DEP frequency, $v_P$ is the volume fraction of the NPs, $\bar{\bar{\xi}}$ is the average rotational diffusion tensor, $\bar{\bar{W}}$ is a rotation matrix in spherical coordinates, $\gamma_F$ is a NP's linear mobility and $\gamma_T$ is the NP's rotational mobility, $\bar{\bar{n}}_A$ is the average complex tensor form of the RI of the colloid, $n_L$ is the liquid's scalar RI, $\bar{\bar{I}}$ is the identity matrix, $\bar{\bar{n}}_P$ is a NP's effective RI including depolarization, and λ the optical wavelength. Additionally, gradients and $\nabla_X$ and $\nabla_\Theta$ use cartesian and spherical coordinates respectively.

With those definitions made it can be shown that DEP forces require an energy gradient proportional to $\nabla_X |E_{in}|^2$ inside NPs whereby $$F = Re[\epsilon_L \nu \bar{\bar{\chi}} \nabla_X |E_{in}|^2]/2 \tag{1}$$

(see Eq. 306). However, DEP torques require a field-direction change inside of each NP (i.e here is the field direction change is $\bar{\bar{\chi}} E_{in}$), and it is later shown that $$T = Re[\epsilon_L \nu(\bar{\bar{\chi}} E_{in}) \times E_{in}^*]/2 \tag{2}$$

(see Eq. 312). Moreover, the electric susceptibility has two special (extreme) cases in the symmetry coordinates of the NPs $$\bar{\bar{\chi}} = \begin{cases} N\bar{\bar{\alpha}} & \text{Low NP volume fraction} \\ (N\bar{\bar{\alpha}})[\bar{\bar{I}} - \bar{\bar{M}}(N\bar{\bar{\alpha}})]^{-1} & \text{High NP volume fraction} \end{cases} \tag{3}$$

where $\bar{\bar{\alpha}}$ is a NP's polarizability, N is the NP concentration, $\bar{\bar{M}}$ is a geometric factor called the depolarization factor that is based on the shape of NPs. These two regimes can provide significantly different kinds of electrokinetics: with and without torques respectively.

Additionally, sums of forces and torques using different DEP frequencies may lower the required source voltages and/or current sources in some cases so that $$F_{tot} = \sum_j F(r, \omega_j) \text{ and } T_{tot} = \sum_j T(r, \omega_j). \tag{4}$$

For example, forces are proportional to the voltage squared, therefore three sinusoidal voltages sources each of $V_0/\sqrt{3}$ and different frequencies $\{\omega_1, \omega_2, \omega_3\}$ can provide the same force/torque on a NP as a single voltage source $V_0^2$ at $\omega_0$ because $(V_0/\sqrt{3})^2 + (V_0/\sqrt{3})^2 + (V_0/\sqrt{3})^2 = V_0^2$, which is the original excitation.

Translation diffusion then links total force $F_{tot}$ to its PDF $$\partial_t f_F - D_E \nabla_X^2 f_F = -\nabla_X \cdot [\gamma_F f_F F_{tot}] \tag{5}$$

(see Eq. 378) and orientation diffusion links total torque $T_{tot}$ to its PDF $$\partial_t f_T - D_T \nabla_\Theta^2 f_T = -\nabla_\Theta \cdot [\gamma_T f_T T_{tot}]. \tag{6}$$

(see Eq. 379). The NP volume fraction $v_P$ is then given in terms of a force PDF and a uniform background volume fraction $v_0$:

$$v_P(r, t, \omega_j) = v_0 f_F(r, t, \omega_j) \tag{7}$$

Additionally, an average NP rotation tensor $\bar{\bar{\xi}}$ is given by averaging rotations using the torque PDF $$\bar{\bar{\xi}}(r, t, \omega_j) = \iint \bar{\bar{W}}(\theta, \phi) f_T(r, t, \theta, \phi, \omega_j) d\theta d\phi. \tag{8}$$

Finally, a RI Tensor $\bar{\bar{n}}_A(r, t, \omega_j, \lambda)$ is given in terms of $v_P$ and $\bar{\bar{\xi}}$ $$\bar{\bar{n}}_A \approx n_L \bar{\bar{I}} + [\bar{\bar{n}}_P(\xi) - n_L \bar{\bar{I}}] \bar{\bar{\sigma}}_P(\xi) v_P \tag{9}$$

where $\bar{\bar{\sigma}}_P(\xi)$ is the tensor shape fraction that depends on the geometric profile of a NP as seen from different directions—see Eqs. 270-273. Note that the two quantities that are controllable by electronics are $v_P$ and $\bar{\bar{\xi}}$, for translation and orientation respectively. Thus, DEP forces and torques (Eqs. 1, 2, & 4) on NPs cause the colloid's state to change via two or more Fokker-Planck diffusion equations (Eqs. 5 & 6) that connect volume fraction $v_p$ and a particle orientations $\bar{\bar{\xi}}$ (Eqs. 7 & 8) to the RI (Eq.) and diffusion.

Note that the NPs need not be solid. For example a class of colloids that are soft are emulsions. When a particle forming an emulsion is subjected to DEP forces it may deform so that NP shape is also subject to change and described by the tensor shape fraction $\bar{\bar{\sigma}}_P$. Therefore, another diffusion equation forced by the Maxwell stress tensor controls another diffusion process.

In general the average RI tensor $\bar{\bar{n}}_A$ provides the information needed for programming light propagation by a scattering process—e.g. even bending light. Typically, the liquid has a scalar RI $n_L$, but this also need not be the case in general wherein $\bar{n}_L$ may be used. Thus, by this survey of PSO equations, forced NP diffusion for NP translation, rotation, orientation, deformation, and combinations thereof can control refractive index—which is the single most important quantity for optics and the control of light.

For the avoidance of doubt, "light" means visible and non-visible forms of electromagnetic radiation, such as: x-rays, ultraviolet, infrared, visible from about 380 nm to 700 nm, sub-millimeter wave (sometimes called T-wave) and other bands of the electromagnetic radiation spectrum. Translational and orientational DEP are closely related and often are configured to work together to produce the desired RI and light scattering.

Examples of RI synthesis using spherical NPs and translation only are shown in FIG. 1, where DEP forces on 40 nm diameter NPs energized by 1 kV sine wave or equivalently a 1 V/$\sqrt{Hz}$ noise at 1 MHz bandwidth, are by order of magnitude: 100 million times greater than gravity forces, 1 million times greater than the DEP forces on liquid molecules surrounding NPs, and 1000 times greater than thermal forces at 300 K near electrodes having a 10 μm period and 50% duty cycle; with forces decaying to about 100 times greater then thermal at the other side of the colloid sheet 10 μm away.

FIG. 1A shows a cross sectional view of a 10 μm thick colloid layer with electrodes at y=0 (black rectangles) and iso-contours of the magnitude of the electric field. DEP forces are in the y-direction because the gradient of the electric field magnitude is substantially in the y-direction and normal to the iso-contours. FIG. 1B shows solutions of the translational Fokker-Planck equation in time and in response to a unit step in a harmonic electric field using 0.1 kV amplitude sinusoidal excitation without the advantage of using a noise signal to reduce voltage amplitude to about 1 V/Hz. Initially the NP volume fraction is 10%, corresponding to the FIG. 1D NP distribution. Then after a period of time the colloid settles to a steady-state where about half the colloid region is near 0% volume fraction and the other half is near 20% volume fraction, corresponding to the NP distribution in FIG. 1E. Next, FIG. 1C shows the normalized real and imaginary parts of the electric susceptibility $\bar{\chi}(\omega)$ for a spherical NP colloid. Historically these are the Clausius-Mossotti factors $\{K_R, K_I\}$ and $\omega_0=10$ MHz are determined by the permittivity and conductivity of the NPs and liquid comprisesing the colloid. By choosing the excitation frequency at $w_0/10$ (point a) NPs are pushed away from the electrodes and by choosing the DEP excitation frequency at $10\omega_0$ (point b) the NPs are pulled towards the electrodes. This can be used to make an optical switch. FIG. 1D shows the colloid layer with NPs dispersed uniformly throughout. Light passes through without deviation because the RI of the colloid (1.55), i.e. $n_A=n_L+(n_P-n_L)v_P=1.40+(2.9-1.4)(0.1)=1.55$, is matched to the surrounding glass (1.55). This corresponds to the initial conditions of FIG. 1B. In FIG. 1E a sinusoidal excitation at $\omega=10\omega_0$ with alternating polarity between electrodes excites the colloid to retract NPs from the boundary of the glass and colloid. This leaves a RI of 1.40 in the colloid at the optical boundary with RI of 1.55 so that Total Internal Reflection (TIR) reflects the incident ray. In this particular example the maximum NP speed, when using 100 V amplitude voltages, is estimated to be about 1 μm·ms$^{-1}$. Therefore, by switching the DEP frequency between $\omega_0/10$ and $10\omega_0$, an optical switch is formed, with an estimated switching speed of about 1 ms. Alternately, at 1 kV amplitude (this can be reduced to a modest 1 V/$\sqrt{Hz}$ noise signal at 1 MHz noise bandwidth) NP velocity is estimated to be about 100 μm·ms$^{-1}$, with optical switching speeds on the order of 10 ns. Higher amplitude fields and/or larger voltage bandwidths can improve this speed significantly. Finally, in FIG. 1F an electrically large (non-diffractive) light-steering grating is shown as an example of what may be possible with more electrodes to better generate a spatially periodic grating by Fourier superposition of fields and by controlling frequencies, magnitudes, and phases to synthesize a desired 3-dimensional RI distribution. Translational DEP RI synthesis are also possible using torques and orientation of NPs and this is the topic of the remainder of the majority of this disclosure.

The Scope of Dielectrophoresis

The name dielectrophoresis (DEP) is composed of three morphemes di-, which comes from the latin and means "apart from;"-electro-, which comes of the Greek word amber and relates to phenomena associated with electrons that may be rubbed off thereof by the triboelectric effect; and -phoresis, which comes from the Greek language and means "to carry around." Thus, dielectrophoresis means that which is apart from a single electron or charge and which provides a means to move or carry around. It should be noted that the morpheme di- can also come from the Greek, and when it does it means a quantity of two, which is cognate with the prefix bi-. Finally, the prefix di- also has a second meaning in the Greek, which is "through and in different directions." Thus, DEP is a phenomena that does not apply to materials with a built-in single charge (like ions), but which does allow pairs of induced charges (i.e. an electric dipole moment) to assist in carrying and manipulating matter (a particle) through other media—e.g. a liquid, gas, etc.

The meaning of dielectrophoresis continues to evolve. Variations of dielectrophoresis include: standing wave dielectrophoresis (sDEP), traveling wave dielectrophoresis (tDEP or twDEP), negative dielectrophoresis (nDEP) where particles translate opposite to the gradient of the electric field, positive dielectrophoresis (pDEP) where particles translate in the direction of the gradient of the electric field, rotational dielectrophoresis (rDEP), electro rotation (ROT or EROT), orientational dielectrophoresis (oDEP), and others.

This proliferation of terms over time is an indication of a healthy and growing field where new insights are constantly developing. Thus, the word "dielectrophoresis" from the 1970's does not hold the same nuanced meaning as "dielectrophoresis" in the 2020's. Originally, dielectrophoresis was developed by Herb Pohl and his graduate students at Oklahoma State University (USA) around 1966 and was originally associated with translation of a particle (e.g. a blood cell) due to a nonuniform electric field. However, now around 2020 it can also include rotation, orientation, and deformation of a particle. With so many potential types of dielectrophoresis it often makes sense to talk about a generalized dielectrophoresis (gDEP) that includes all possible phenomena. When the specific form of dielectrophoresis is not obvious from the context of the writing then the casual term dielectrophoresis (DEP) will mean gDEP in this document. The reader is cautioned that different authors may introduce their own notation for the different types of gDEP modes of operation.

System of Units

For the avoidance of doubt all equations herein, including Maxwell's equations and electromagnetic quantities in general, are provided in the international system of units (SI) unless stated otherwise.

Phasor Math

For the avoidance of doubt phasor representations of mathematical quantities always assume that $\omega$ is the radian frequency and t is the time so that the time phasor factor is $e^{i\omega t}$, where $i=\sqrt{-1}$ is the physicist's typical convention so that the use of the letter j (often used by engineers for the complex unit) is reserved for electric and other types of particle currents.

Operators

For the avoidance of doubt the multiplication of a matrix $\overline{\overline{A}}$ by a vector x may be written either as $\overline{\overline{A}} \cdot x$ or as $\overline{\overline{A}} x$, because at times one representation may be more intuitive than the other. Note that while $x \cdot y = y \cdot x$, it is also true that $\overline{\overline{A}} \cdot x \neq x \cdot \overline{\overline{A}}$. Many other combinations of tensor products are also possible and the use (or lack of use) of an explicit dot product in the equations will also be based on context and this author's subjective sense of what's needed for clarity.

Time, Frequency, and Spatial-Frequency Domains

For the avoidance of doubt, note that the time domain is represented by script variables and the frequency (phasor) domain is represented by roman characters. For example, the electric field in the time domain is $\mathcal{E}(r, t)$ and in the frequency domain it is given by $E(r, \omega)$. In those cases where the spatial frequency domain is also needed it can be determined from context. Thus if the spatial frequency domain is also used then the electric field is written as $E(k, t)$, where k is the vector wavenumber. The one exception to this rule is a particle's volume v.

At Least Two Frequency Bands

For the avoidance of doubt, for optical applications there are two temporal frequency bands: the Dielectrophoresis (DEP) frequencies that are often (but not necessarily) in the range of 1 KHz to 1 GHz and the optical frequency 430 THz-750 THz (terrahertz) controlled by NPs. The primary characteristic is that these frequency domains are so far apart that a material's constitutive parameters are often much different and set by different material resonances and/or oscillation modes. To distinguish the two domains the symbol $\omega$ is used to describe a DEP excitation frequency and symbol $\lambda$ is used to describe the optical wave length. For example, the average RI of a DEP controlled colloid is given by $n_A = n_A(r, t, v_S, \lambda, \omega, T)$. Even in the Terahertz-wave (T-Wave, millimeter-wave) region where applications utilize micro particles instead of nanoparticles, there is still a large difference between the DEP electrokinetic frequency and the control of the optical or T-Wave energy.

At Least Three Coordinate Systems Per Particle

For the avoidance of doubt, note that there are at least three coordinate systems for a particle. First is the observer coordinate system. Second is the geometric eigen symmetry basis of the nanoparticle. Third is the eigen symmetry basis of the crystallographic system comprising the material in the particle. Additional coordinate systems are needed for each additional layer or other geometric shape or crystal added. Therefore, the orientation of a crystal structure, a particle geometry, and the observer system can be specified independently. For example, a uniaxial crystal in a prolate spheroidal particle can be aligned so that the index ellipsoid of the RI of the crystal is aligned or perpendicular to the major axis of the prolate spheroid to induce specific optical scattering properties. The observer system has no primes, e.g. $\overline{\overline{A}}_R$. The symmetry basis of the particle has one prime to represent it, e.g. $\overline{\overline{A}}_R'$. The symmetry basis of the crystal arrangement making up the material in the particle has two primes to represent it, e.g. $\overline{\overline{A}}_R''$. Primes are not used in this document to represent real and imaginary parts.

Real and Imaginary Parts of a Quantity

The real and imaginary parts of a quantity are represented by a subscript of R and I respectively. For example the real and imaginary parts of the tensor Clausius-Mossotti factor in the eigen symmetry basis of a particle are $\overline{\overline{K}}_R'$ and $\overline{\overline{K}}_I'$ respectively, where the double bars above a variable indicate tensor quantity.

Electromagnetic Scale

For the avoidance of doubt, Maxwell's equations are modified to ensure that the speed of light between particles is not necessarily taken as the speed of light in vacuum, as is done conventionally. Rather, it is assumed that if a discussion involves a liquid between NPs then the "background" speed of light is that in the liquid not the vacuum. This will save countless pages of mathematical analysis and make the underlying physics much more understandable. Thus, if D is the electric displacement, E the electric field intensity, P the polarization density and $\epsilon_0$ is the permittivity of free-space, then instead of writing $D=\epsilon_0 E + P$ we write $D=\epsilon_{med} E + P$, where $\epsilon_0 \to \epsilon_0 \epsilon_r \equiv \epsilon_{med}$, and $\epsilon_r$ is dielectric constant of the medium outside a particle. We can set the value of $\epsilon_{med}$ as needed to make our work efficient. This may be for a value consistent for vacuum $\epsilon_0$ or something else, such as the liquid surrounding a NP wherein we would set the medium permittivity to the liquid permittivity $\epsilon_{med} = \epsilon_L$. If no choice has yet been made then the generic value of $\epsilon_{med}$ is used. More will be said later about this topic as needed. In summary, PSO covers many orders of physical magnitude. From atomic scale to kilometer scale for applications. Thus, it is practical to only worry about vacuum light propagation only when needed. For example, it is quite irrelevant that there is a vacuum between molecules in a liquid if one is only interested in macroscopic light-matter interactions in a liquid. At other times the vacuum between the molecules might be important, e.g. RI derived from the polarizability.

Constitutive Equations in the Temporal Frequency Domain

Maxwell's equations in SI units are $$\nabla \times \mathcal{E}(r, t) = -\frac{\partial \mathcal{B}(r, t)}{\partial t} \tag{10}$$

$$\nabla \times \mathcal{H}(r, t) = +\frac{\partial \mathcal{D}(r, t)}{\partial t} + \mathcal{T}_f(r, t) \tag{11}$$

$$\nabla \cdot \mathcal{D}(r, t) = \rho_f(r, t) \tag{12}$$

$$\nabla \cdot \mathcal{B}(r, t) = 0 \tag{13}$$

and the constitutive relations are $$\mathcal{D}_{(r,t)} = \epsilon(r,t) \mathcal{E}_{(r,t)} \tag{14}$$

$$\mathcal{B}_{(r,t)} = \mu(r,t) \mathcal{H}_{(r,t)} \tag{15}$$

$$\mathcal{T}_{f(r,t)} = \sigma(r,t) \mathcal{E}_{(r,t)}. \tag{16}$$

The electromagnetic quantities above include the electric field intensity $\mathcal{E}$ [V/m], the electric field density $\mathcal{D}$ [C/m$^2$], the magnetic field intensity $\mathcal{H}$ [A/m], the magnetic field density $\mathcal{B}$ Wb/m$^2$], the free electric current density $\mathcal{J}_f$[A/m$^2$], the free electric charge density $\rho_f$[C/m$^3$], the permittivity $\epsilon$[F/m], the permeability $\mu$[H/m] and the conductivity $\sigma$[S/m]. If we assume that quantities are harmonic then we can decompose the space and time functions of fields and charges into functional products in phasor space and material properties into functions of space and frequency, which are to be calculated or assumed as the situation requires, so that in the frequency domain we have $$\mathcal{D}_{(r,t)} \to D(r)e^{i\omega t} \tag{17}$$

$$\mathcal{E}_{(r,t)} \to E(r)e^{i\omega t} \tag{18}$$

$$\mathcal{B}_{(r,t)} \to B(r)e^{i\omega t} \tag{19}$$

$$\mathcal{H}_{(r,t)} \to H(r)e^{i\omega t} \tag{20}$$

$$\rho_f(r,t) \to \rho_f(r)e^{i\omega t} \tag{21}$$

$$\sigma(r,t) \to \sigma(r,\omega) \tag{22}$$

$$\epsilon(r,t) \to \epsilon(r,\omega) \tag{23}$$

$$\mu(r,t) \to \mu(r,\omega), \tag{24}$$

where quantities like E(r) are in general complex-valued quantities unless noted otherwise and $i=\sqrt{-1}$. Alternately, we can write that $\mathcal{E}(r, t) = \text{Re}[E(r)e^{i\omega t}]$.

Either way we can rewrite Maxwell's equations as $$\nabla \times E(r) = -i\omega\tilde{\mu}(r,\omega)H(r) \tag{25}$$

$$\nabla \times H(r) = +i\omega\tilde{\epsilon}(r,\omega)E(r) \tag{26}$$

$$\nabla \cdot \{\tilde{\epsilon}(r,\omega)E(r)\} = 0 \tag{27}$$

$$\nabla \cdot \{\tilde{\mu}(r,\omega)H(r)\} = 0 \tag{28}$$

where the third and fourth equations above follow from taking the divergence of the first and second equations and using the vector identity $\nabla \cdot (\nabla \times A) = 0$, where A is an arbitrary vector over space coordinates. Furthermore, we find that on using the constitutive relation $\mathcal{J}_f = \sigma_f \mathcal{E}$ that Eq. 11 takes the form of Eq. 26 when $$\begin{aligned}\tilde{\epsilon}(r,\omega) &= \epsilon(r,\omega) - i\frac{\sigma_f(r,\omega)}{\omega} & (29)\\ &= \{\epsilon_R(r,\omega) - i\epsilon_I(r,\omega)\} - i\frac{\sigma_f(r,\omega)}{\omega} & (30)\\ &= \epsilon_R(r,\omega) - i\left\{\epsilon_I(r,\omega) + \frac{\sigma_f(r,\omega)}{\omega}\right\} & (31)\end{aligned}$$

The above equations are provided to establish notation and sign conventions such as the phasor sign convention given by $e^{i\omega t}$ and to explicitly show how the effective permittivity is a function of frequency $\omega$.

Point Charges

Consider an electrically neutral NP adrift in a liquid and subject to a non-uniform input electric field $\mathcal{E}_{in}(r, t)$ at a point r and at time t. The NP responds to the electric field in the fluid medium and reconfigures its bound electric charges so that the NP becomes polarized, while still remaining neutral. There exists an average point charge that can be used to represent the charge distribution. This charge is the spatial average of the positive (or negative) charges so that $$q(t) = \frac{1}{\mathcal{V}} \int_{NP} \rho(r, t) d^3 r \tag{32}$$

where r is the position of the differential elements of the charge distribution, t is time, q(t) is the magnitude of the time varying point charge, $\mathcal{V}$ is the volume of the NP, and $\rho$(r, t) is the time varying magnitude of the positive (or negative) spatial charge density in units of charge per unit volume, which is derived from an exact solution of Maxwell's equations.

Polarizability and the Central Theme

PSO utilizes electromagnetic (EM) energy of one form to control EM energy of another form through suspended particles. For example, the particles may be nanoparticles (NPs) or microparticles (MPs). The suspending medium may be a liquid, a gas, vacuum, magnetic fields, or other. The EM radiation may be low frequency RF energy or high frequency optical energy. The particles are controlled in position, orientation, and deformation by EM fields to subsequently control optical and other forms of EM radiation through a controlled and coordinated light scattering process. For a liquid medium with NPs therein we create a dynamic Fluidic Meta Material (FMM).

Furthermore, as will be derived later in this document, there are two relations that are at the heart of manipulating an optical particle by forces and torques. In particular, the force F and torque T are given by $$F = p_{par} \cdot \nabla E_{in} \tag{33}$$

$$T = p_{par} \times E_{in} \tag{34}$$

where $E_{in}$ is the input electric field and $p_{par}$ is the resulting induced dipole moment of the particle. Thus, much of this document is about calculating $p_{ind}$ for different types of optical particles under various conditions and then coordinating the resulting forces and torques to create a desired optical effect.

Different Types of Materials

The macroscopic phenomena of RI, and generalized DEP work together to make PSO functional. These processes are a result of the tensor polarizability $\overline{\alpha}$ of materials, which links the atomic, molecular, and NP scales to the macroscopic scale. Thus, the polarizability $\overline{\alpha}$ is central to understanding and designing PSO based systems.

The polarizability of a material is a result of several processes including electron cloud displacements relative to atomic nuclei, atomic displacements relative to other atoms, and permanent built-in dipole moments in molecules due to chemical bonding from unbalanced chemical electronegativity. Polarizability $\overline{\alpha}$ is also a result of the shape of NPs, which is expressed by a depolarization factor, and the direction of the input electric field. These factors influence the spatial distribution of surface charges surrounding each NP. Further complicating a material's net polarizability are various types of atomic and molecular long-range interactions forming: pure crystals, polycrystallines, mixtures of ordered crystals and amorphous materials, and pure amorphous materials. See FIG. 2, which shows several different types of long range order in a material. (A) shows completely random cylindrical molecules (from a distance) that create an amorphous isotropic material, (B) shows a polycrystalline material that, on average, is isotropic, (C) shows a crystalline material that is anisotropic (except for cubic crystals), (D) shows cylindrical molecules that are all oriented along the long axis in the y-direction and otherwise placed randomly, and (E) shows cylindrical molecules that are all oriented along the short axis in the y-direction and otherwise placed randomly. Given the many details of a complex-structured colloid, a unifying model for PSO brings together the many disparate ideas and will give the reader a greater understanding, which is needed to learn this topic. This material is discussed in detail shortly and then connected to light scattering, RI, DEP, and ultimately to devices and hardware.

Active and Passive Transformations of Particles and Fields

The forces, torques, and stresses on a NP are described in terms of the local fields of the eigen symmetry basis of each NP. Thus, a passive coordinate transformation is needed to map the applied electric fields in the observer's reference frame into each particle's eigen symmetry basis without the particles physically moving. Afterwards, the changing positions, orientations, and shapes of NPs are described in the observer's coordinate system using an active coordinate transformation of each NP in response to the locally applied fields. Thus, both passive and active coordinate transformations are in principle needed repeatedly to show how a system evolves in time.

Obviously, it is not practical to track the individual positions, orientations, and shapes of potentially trillions of particles in a colloid. Therefore, probability distribution functions are often used to track averages and standard deviations from the average in each differential volume element of the colloid. For example, if the orientation of NPs in a differential volume element of the colloid are uniformly distributed over $4\pi$ steradians then any NP orientation is a good starting place for calculations. Alternately, if the average orientation of NPs in a differential volume element of the colloid is mostly in a specific direction then, that orientation can be used as the starting point of analysis. Therefore, in this document the NPs are assumed to have known probability distribution functions of position, orientation, and shape at time t=0, to overcome the difficulty of separately setting the state of so many separate NPs. Any errors this incurs during the time the colloid is changing state is not important because it is usually the case that the steady-state probability distributions are what is important in optics and this will be well know from the stochastic analysis.

Cavity Electric Fields

When considering the electromagnetic fields within a medium it is typical to make approximations to avoid all the details of the actual fields. Otherwise, the complexity of all the fields between atoms and molecules would become overwhelming. For example, consider a dielectric between two conducting capacitor plates separated by a distance d and energized with a voltage difference V, an average electric field is often taken as V/d. However, this zero order approximation goes too far, i.e. it is too simplistic, when the individual behavior of particles is desired even in a simple uniform electric field. This is because each particle is also influenced by the fields of its neighbors, and this includes the shapes of particles. This is especially important in a dense material comprising solids and liquids.

To gain access to the electric fields of the neighboring particles, first consider a neutral medium that has no built-in dipole moments, e.g. a beaker of silicone oil. First, impose an input electric field $E_{in}$ in the medium to induce dipoles within the medium. Second, a small volume of the medium is mathematically removed by "freezing" all dipoles and removing particles to form a small cavity. It should be clear that $$E_{in} = E_{par} + E_{cav} \tag{35}$$

where the fields from the particles removed is $E_{par}$ and the fields from the cavity formed is $E_{cav}$. To extend this line of reasoning to a mixture such as a colloid, comprising a solid particle and surrounding liquid we imagine a third step of replacing the resulting vacuum cavity with the original liquid (less any induced dipoles). Then the cavity fields are in a cavity with a liquid background.

The electric fields of $E_{cav}$ and its relation to the shape of the particle is now developed gradually by considering some simple examples comprising different cavity shapes as shown in FIG. 3 and calculating the cavity electric field $E_{cav}$ assuming only induced dipoles and backfilling the cavity with the medium surrounding the cavity. Note that in the examples associated with FIG. 3 it is assumed that the eigen symmetry basis (coordinates) of a particle is the same as the observers coordinates so that x=x', y=y', and z=z', this will simplify notation initially.

Example A corresponds to FIG. 3A, which shows a thin cavity between two dielectrics. The cavity is parallel to the xz-plane and its thickness is in the y-direction, where the coordinates are the particle's symmetry coordinates. For a z-directed input electric field $E_{in}=E_{in}\hat{z}$, where $\hat{z}$ is a z-directed unit vector we can apply the integral form of Stokes' law $\oint_C E_{in} \cdot dl = 0$ along a contour, which is shown in FIG. 3A. The contour is parallel to the yz-plane with one part of the contour inside the cavity and one part of the contour outside the cavity. Therefore, $E_{in} \cdot \hat{z} dl + E_{cav} \cdot (-\hat{z}) dl = 0$ so that $E_{cav} = E_{in}$. Which we can write as $E_{cav} = E_{in} - (0) P_{cav}/\epsilon_{med}$ to highlight its relation to the polarization density. Therefore, in this particle's symmetry basis we find that $M_{xx}=0$. Also, by symmetry we find that $M_{zz}=0$. To find the induced electric field in the y-direction Gauss's law may be used. In particular, by Gauss's law $\int_A E_{in} \cdot dA = Q_{tot}$, where A/2 is the area of each gap surface within the bounding box, and Q is the magnitude of the charge on each surface. Therefore, $\sigma_1 = Q/(2A)$ on one surface and $\sigma_2 = -Q/(2A)$ on the other surface. The magnitude of the total polarization density in the cavity is (Q/A), whereby $P_{cav} = -(Q/A)\hat{y}$ is in the direction from negative to positive induced charges and the induced electric field in the cavity is $(-P_{cav}/\epsilon_{med})$. Thus, if the input field in the cavity is in the y-direction then $E_{cav} = E_{in} - (1) P_{cav}/\epsilon_{med}$. In anticipation of generalizing this result we can write $$E_{cav} = E_{in} - \frac{1}{\epsilon_{med}} \underbrace{\begin{Bmatrix} 0 & 0 & 0 \\ 0 & 1 & 0 \\ 0 & 0 & 0 \end{Bmatrix}}_{\overline{\overline{M}}} \underbrace{\begin{bmatrix} P_{cav,x} \\ P_{cav,y} \\ P_{cav,z} \end{bmatrix}}_{P_{cav}}. \tag{36}$$

Where $\overline{\overline{M}}$ is the tensor depolarization that is given in the symmetry basis of the cavity. In most calculations this will be transformed to a more appropriate coordinate system as explained later.

Example B corresponds to FIG. 3B, and is very similar to the prior example, except that now the total surface area within the bounding box is 2 $(A_x+A_y)$ so that $$E_{cav} = E_{in} - \frac{1}{\epsilon_{med}} \underbrace{\begin{bmatrix} A_x/(A_x+A_y) & 0 & 0 \\ 0 & A_x/(A_x+A_y) & 0 \\ 0 & 0 & 0 \end{bmatrix}}_{\bar{\bar{M}}} \underbrace{\begin{bmatrix} P_{cav,x} \\ P_{cav,y} \\ P_{cav,z} \end{bmatrix}}_{P_{cav}}. \quad (37)$$

Example C corresponds to FIG. 3C for an infinite cylinder. In the z direction the analysis is very similar to that in Example A where Stokes law along a contour is used and we find that a z-directed input field is equal to the cavity field. However, an input field in either the x or y directions must provide the same local field inside the cylinder. For example, if $E_{in}=E_{in}\hat{x}$ then induced polarization charges on the cavity are positive for x>0 and negative for x<0, as shown in the figure. Let $\phi$ be the azimuth angle measured from the positive x-axis towards the positive y-axis, then the distance between each charge is $d=d_0 \cos \phi$ and the charge is $q(\phi)=q_0 \cos \phi$; where $d_0$ is the diameter and $q_0$ is the maximum charge separated. Therefore, the dipole moment is $p=q \, d\hat{x}=(p_0\hat{x})\cos^2 \phi$. Therefore, the average dipole moment is $$\langle p \rangle = \frac{1}{\pi}\int_{\pi/2}^{3\pi/2} p_0 \cos^2\phi \, d\phi = \frac{(p_0\hat{x})}{2}. \quad (38)$$

so that $P=N(p_0\hat{x})/2$ and the induced electric field is $P/\epsilon_{med}$. Similar equations exist for the y, therefore $$E_{cav} = E_{in} - \frac{1}{\epsilon_{med}} \underbrace{\begin{Bmatrix} 1/2 & 0 & 0 \\ 0 & 1/2 & 0 \\ 0 & 0 & 0 \end{Bmatrix}}_{\bar{\bar{M}}} \underbrace{\begin{bmatrix} P_{cav,x} \\ P_{cav,y} \\ P_{cav,z} \end{bmatrix}}_{P_{cav}}. \quad (39)$$

Example D corresponds to FIG. 3D for a spherical cavity. This is similar to the previous example, but using spherical coordinates instead of cylindrical. Now, we take θ as the polar angle and $\phi$ as the azimuth angle, then if $E_{in}=E_{in}\hat{z}$ we have the separation between charges of $d_\theta=d_0 \cos \theta$ and the charges on the sphere $q_\theta=q_0 \cos \theta$ so that $p_\theta=p_0 \cos^2 \theta \, \hat{z}$. Therefore, $$\langle p \rangle = \frac{1}{4\pi}\int_{\phi=0}^{2\pi}\int_{\theta=0}^{\pi} p_0 \cos^2\phi \sin\theta \, d\phi d\theta = \frac{(p_0\hat{z})}{3}. \quad (40)$$

The other symmetry axes have a similar calculation. Therefore, exploiting the symmetry of a sphere $$E_{cav} = E_{in} - \frac{1}{\epsilon_{med}} \underbrace{\begin{Bmatrix} 1/3 & 0 & 0 \\ 0 & 1/3 & 0 \\ 0 & 0 & 1/3 \end{Bmatrix}}_{\bar{\bar{M}}} \underbrace{\begin{bmatrix} P_{cav,x} \\ P_{cav,y} \\ P_{cav,z} \end{bmatrix}}_{P_{cav}}. \quad (41)$$

Therefore, generalizing $$E_{in} = E_{cav} + \frac{\bar{\bar{M}} \cdot P_{cav}}{\epsilon_{med}} \quad (42)$$

so by Eq. 35 the second term should be $E_{par}$, however in the particle $P_{par}+P_{cav}=0$ therefore $$E_{in} = E_{cav} - \frac{\bar{\bar{M}} \cdot P_{par}}{\epsilon_{med}} \quad (43)$$

therefore, in summary $$E_{in} = E_{par} + E_{cav} \quad (44)$$

$$E_{par} = -\frac{\bar{\bar{M}} \cdot P_{par}}{\epsilon_{med}} \quad (45)$$

where $\bar{\bar{M}}$ is the tensor depolarization factor in an arbitrary coordinate basis. For the avoidance of doubt note that by dividing by $\epsilon_{med}$ we have backfilled the cavity with a medium that is not necessarily vacuum as was already discuss. Also, see Eqs. 147-150.

In the examples presented so far, the depolarization $\bar{\bar{M}}$ was constructed in a coordinate basis providing a simple diagonal matrix for its representation. Going forward, more care is applied and the diagonal representation will carry a single prime. So for example what has been called $\bar{\bar{M}}$ above, i.e. a diagonal matrix basis, is more formally represented as $\bar{\bar{M}}'$ in the eigen symmetry basis of the particle. This convention is to be applied going forward in this document, unless stated otherwise.

Additionally, in the observer's coordinates, we will write $\bar{\bar{M}}$, i.e. without a prime, as the representation of the depolarization tensor. This coordinate transformation transforms the particle into the appropriate direction in the observer's coordinate system and is developed by considering the eigen-value problems $\bar{\bar{M}}\omega_j=M_{jj}'\omega_j$ for each coordinate j. We then find $$[\bar{\bar{M}}w_1', \bar{\bar{M}}w_2', \bar{\bar{M}}w_3']=[M_{11}'w_1', M_{22}'w_3', M_{33}'w_1'] \quad (46)$$

and therefore $$\bar{\bar{M}}[w_1', w_2', w_3'] = [w_1', w_2', w_3']\begin{bmatrix} M_{11}' & 0 & 0 \\ 0 & M_{22}' & 0 \\ 0 & 0 & M_{33}' \end{bmatrix} \quad (47)$$

where the diagonal matrix is the depolarization tensor $\bar{\bar{M}}'$ in the symmetry basis. Let the eigen-vector matrix, formed by (eigenvector column vectors) be called $\bar{\bar{W}}=[\omega_1', \omega_2', \omega_3']]$ then $\bar{\bar{M}}\bar{\bar{W}}=\bar{\bar{W}}\bar{\bar{M}}'$ and the resulting similarity transformation converts depolarization in the eigen symmetry basis to the observer's basis by $$\bar{\bar{M}}=\bar{\bar{W}}\bar{\bar{M}}'\bar{\bar{W}}^{-1}. \quad (48)$$

Both active and passive transformations are sometimes needed in PSO. For example, an active rotation of a particle by an angle of: ψ about the z' axis as a twist, θ about the y' axis as the spherical polar angle, and $\phi$ about the z' axis again as the spherical azimuth angle, then $$\bar{\bar{W}} = \begin{bmatrix} \cos\theta\cos\psi\cos\phi - \sin\psi\sin\phi & -\cos\theta\sin\psi\cos\phi - \cos\psi\sin\phi & \sin\theta\cos\phi \\ \cos\theta\cos\psi\sin\phi - \sin\psi\cos\phi & \cos\psi\cos\phi - \cos\theta\sin\psi\sin\phi & \sin\theta\sin\phi \\ -\sin\theta\cos\psi & \sin\theta\sin\psi & \cos\theta \end{bmatrix} \quad (49)$$

and $\bar{\bar{W}}$ is a unitary rotation matrix so that its inverse is also its transpose $\bar{\bar{W}}^{-1} = \bar{\bar{W}}T$. Therefore, the induced field in the cavity is given by $$E_{par} = -\frac{\bar{\bar{M}} \cdot P_{par}}{\epsilon_{med}} \quad (50)$$

$$\bar{\bar{M}} = \bar{\bar{W}}\bar{\bar{M}}'\bar{\bar{W}}^{-1}. \quad (51)$$

where $\bar{\bar{M}}$ is the tensor depolarization factor, in the observer's coordinates, that accounts for the particle's shape. Additionally, the trace of $\bar{\bar{M}}$ is unity, is proved later (see Eq. 167) to be $$M_{xx} + M_{yy} + M_{zz} = 1. \quad (52)$$

Note that the trace of a matrix is the sum of its eigenvalues, and therefore must be invariant with respect to a change of basis.

Some Important Definitions

The cavity field may be thought of as inducing the polarization of the particle and vice versa, whereby $$p_{par} = \epsilon_{med}\bar{\bar{\alpha}} E_{cav} \quad (53)$$

$$p_{par} = Np_{par} \quad (54)$$

$$p_{par} = \epsilon_{med}\bar{\bar{\chi}} E_{in} \quad (55)$$

where $\bar{\bar{\alpha}}$ is the tensor polarizability that connects a particle's dipole moment $p_{par}$ to the cavity field $E_{cav}$ and where $\bar{\bar{\chi}}$ is the tensor electric susceptibility that connects the polarization density $P_{par}$ to the input field $E_{in}$, $\epsilon_{med}$ is the permittivity if the medium surrounding the particle—i.e. vacuum, liquid, etc. Note that different authors may or may not include $\epsilon_{med}$ in the definitions above so the reader must always check. The quantity N is discussed in the next sub-section.

Particle Density Factors

The particle density N is the number of particles of a particular type in a given volume. If $V_{par}$ is the volume of a single particle and $V_{med} = V_{uc}$ is the volume of the surrounding medium contained in a effective unit cell where only one particle exists on average then $$N = \frac{\text{\# of particles}}{\text{Vol. unit cell}} = \frac{1}{V} \quad (56)$$

where the total volume in the unit cell is $V = V_{par} + V_{med}$. However, the volume fraction of the particle in the unit cell is $$v_{par} = \frac{V_{par}}{V} \quad (57)$$

therefore, $$N = \frac{v_{par}}{V_{par}}. \quad (58)$$

If we define the maximum particle density as $$N_{max} = \frac{1}{V_{par}} \quad (59)$$

then we arrive at the relation $$N = N_{max} v_{par} \quad (60)$$

where $0 \leq v_{par} \leq 1$, where typically $v_{par}$ is typically much less than unity. For example, a random packing of spheres will generally have a density of about 64% and regular face centered cubic packing of spheres will have a maximum packing of about 74%. The maximum packing of non-spherical spheroids is still an open question in mathematics, but currently appears to be around 75%. In principle, it is anticipated that $0 < v_{par} < 2/3$ for many NP geometries of interest and even less of a range in practice. One possible exception of interest is cubic or cubic-like NPs where $v_{par} = 1$ is theoretically possible, but currently much more difficult to manufacture than spheroidal NPs—e.g. spheres, prolate spheroids, and oblate spheroids. Finally, for historical reasons in much of this document $V_{par} = V$ when discussing NPs subject to DEP electrokinetics.

Complex Tensor Electric Susceptibility

It is critically important to find a relation between the dipole moment and the input electric field because induced forces, torques, and stresses on particles are directly related to the dipole moment of a particle. By plugging Eq. 53 into Eq. 54 we find that $$P_{par} = \epsilon_{med} N \bar{\bar{\alpha}} E_{cav} \quad (61)$$

which shows that to first order that the polarization density is proportional to the local field within the particle and that the direction of the polarization density may not be in the direction of the local field. This relation is an extension of the case for scalar polarizability and has proved quite accurate for most practical applications where non-linear effects are not observed. Next, observe that by using Eqs. 43 we have that $$E_{in} = E_{cav} + E_{par} \quad (62)$$

$$= E_{cav} - \frac{\bar{\bar{M}} \cdot P_{par}}{\epsilon_{med}}$$

$$= E_{cav} - \frac{\epsilon_{med}\bar{\bar{M}} \cdot N\bar{\bar{\alpha}}E_{cav}}{\epsilon_{med}}$$

$$= \left[\bar{\bar{I}} - N\bar{\bar{M}}\bar{\bar{\alpha}}\right]E_{cav}$$

Therefore, $$E_{cav} = [\bar{\bar{I}} - \bar{\bar{M}}(N\bar{\bar{\alpha}})]^{-1} E_{in} \quad (63)$$

and from Eq. 53 we have $$p_{par} = \epsilon_{med}\bar{\bar{\alpha}}[\bar{\bar{I}} - \bar{\bar{M}}(N\bar{\bar{\alpha}})]^{-1} E_{in} \quad (64)$$

However, for a single NP of volume $\mathcal{V}$ we have that $N=1/\mathcal{V}$ so that $$p_{par} = \epsilon_{med} \mathcal{V} (N\bar{\bar{\alpha}})[\bar{\bar{I}}-\bar{\bar{M}}(N\bar{\bar{\alpha}})]^{-1} E_{in}, \tag{65}$$

and on dividing both sides by the particle's volume we get the induced polarization density of the single particle $$P_{par} = \epsilon_{med} \underbrace{\left(N\bar{\bar{\alpha}}\right) = \left[\bar{\bar{I}} - \bar{\bar{M}}\left(N\bar{\bar{\alpha}}\right)\right]^{-1}}_{\text{Electric Susceptibility } \bar{\bar{\chi}}} E_{in}. \tag{66}$$

This equation is really just Eq. 55. Equations 65-66 are very important equations because they relate the input electric field to the induced dipole moment. Given its importance, let's write the unitless complex-valued susceptibility tensor as $$\bar{\bar{\chi}} = \bar{\bar{\chi}}_R + i\bar{\bar{\chi}}_I \tag{67}$$

$$= \left(N\bar{\bar{\alpha}}\right)\left[\bar{\bar{I}} - \bar{\bar{M}}\left(N\bar{\bar{\alpha}}\right)\right]^{-1} \tag{68}$$

where the real part is $\bar{\bar{\chi}}_R$ and the imaginary part is $\bar{\bar{\chi}}_I$. The electric susceptibility has real and imaginary parts because it is frequency dependent due to the non-zero conductivity of the materials in the NP and in the surrounding medium. Note that when there is a very small difference between the dielectric constant of the medium $\epsilon_{med}$ and the material comprising the particle $\bar{\bar{\epsilon}}_{par}$ then the factor in square brackets is very close to the identity matrix $\bar{\bar{I}}$ and the CM factor is simply $N\bar{\bar{\alpha}}$. For example this is the case for blood cells in a liquid plasma. However, for many crystals, e.g. $TiO_2$, there is a large dielectric contrast compared to a surrounding liquid and the entire expression as provided in Eq. 68 must be used. In summary $$p_{par} = \epsilon_{med} \mathcal{V} \bar{\bar{\chi}} E_{in} \tag{69}$$

$$P_{par} = \epsilon_{med} \bar{\bar{\chi}} E_{in} \tag{70}$$

$$\bar{\bar{\chi}} = (N\bar{\bar{\alpha}})[\bar{\bar{I}}-\bar{\bar{M}}(N\bar{\bar{\alpha}})]^{-1}. \tag{71}$$

Complex Tensor Polarizability

Next, equate the polarization density from Eq. 70 and 71 to the polarization density from $$D_{in} = \epsilon_{med} E_{in} + P_{par} = \bar{\bar{\epsilon}}_{par} E_{in} \tag{72}$$

whereby $$P_{par} = \epsilon_{med} \bar{\bar{\chi}} E_{in} = (\bar{\bar{\epsilon}}_{par} - \bar{\bar{I}}\epsilon_{med}) E_{in} \tag{73}$$

so that $$\epsilon_{med}(N\bar{\bar{\alpha}})[\bar{\bar{I}}-\bar{\bar{M}}(N\bar{\bar{\alpha}})]^{-1} = \bar{\bar{\epsilon}}_{par} - \bar{\bar{I}}\epsilon_{med} \tag{74}$$

and therefore, $$N\bar{\bar{\alpha}} = [\bar{\bar{\epsilon}}_{par} \bar{\bar{M}} + \epsilon_{med}(\bar{\bar{I}}-\bar{\bar{M}})]^{-1}(\bar{\bar{\epsilon}}_{par} - \bar{\bar{I}}\epsilon_{med}). \tag{75}$$

This is an important relation that gives the polarizability $\bar{\bar{\alpha}}$ in terms of the depolarization factor $\bar{\bar{M}}$, the permittivity of the surrounding medium $\bar{\bar{\epsilon}}_{med}$, and the tensor permittivity of the medium comprising the particle $\bar{\bar{\epsilon}}_{par}$. It should be pointed out that the built-in charges of a crystal manifest themselves in $\bar{\bar{\epsilon}}_{par}$ and can be derived independently of the geometric considerations of the depolarization factor $\bar{\bar{M}}$.

Equation 75 will often be used in the particle's eigen symmetry basis. Thus, more specifically we can write it as $$N\bar{\bar{\alpha}}' = [\bar{\bar{\epsilon}}_{par}'\bar{\bar{M}}' + \epsilon_{med}(\bar{\bar{I}}-\bar{\bar{M}}')]^{-1}(\bar{\bar{\epsilon}}_{par}' - \bar{\bar{I}}\epsilon_{med}). \tag{76}$$

Clausius-Mossotti & Lorentz-Lorenz Factors

Historically, the scalar electric susceptibility has been written with a factor that is without units and normalized to a range of ±1 for the spherical particle. That factor is called the Clausius-Mossotti (CM) factor in the context of DEP and it called the Lorentz-Lorenz (LL) factor in the context of optics. The objective of this section is to extend the definition of the CM factor and LL factor for anisotropic particle media.

Consider Eq. 71 and multiply through by $\bar{\bar{M}}'$, the result is called the CM tensor in the particle's eigen symmetry basis, and is given by $$\bar{\bar{K}}' = \bar{\bar{M}}'\bar{\bar{\chi}}' = \bar{\bar{M}}'(N\bar{\bar{\alpha}}')[\bar{\bar{I}}-\bar{\bar{M}}'(N\bar{\bar{\alpha}}')]^{-1}, \tag{77}$$

and in the observer's basis $$\bar{\bar{K}} = \bar{\bar{W}}\bar{\bar{K}}'\bar{\bar{W}}^{-1}. \tag{78}$$

where each of the diagonal entries in $\bar{\bar{M}}'$ is a value between zero and one. For example for a sphere $\bar{\bar{M}}' = \bar{\bar{I}}/3$.

When the elements of $\bar{\bar{I}}-\bar{\bar{M}}'$ ($N\bar{\bar{\alpha}}'$)≈$\bar{\bar{I}}$ then Eq. 77, e.g. a biological cell and the surrounding liquid have on a small difference in permittivity and conductivity, then $$\bar{\bar{K}}' = \bar{\bar{M}}'\bar{\bar{\chi}}' \approx \bar{\bar{M}}'(N\bar{\bar{\alpha}}') \tag{79}$$

Ellipsoidal-Hyperbolic Coordinates

Figure 4A:
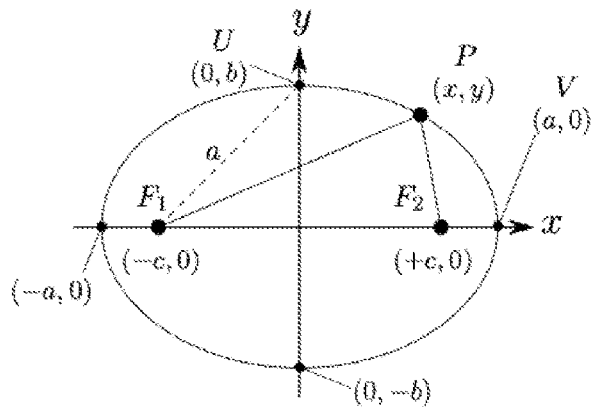
FIG. 4A shows an ellipse that is used in defining a two dimensional elliptic-hyperbolic coordinate system.
Figure 4B:
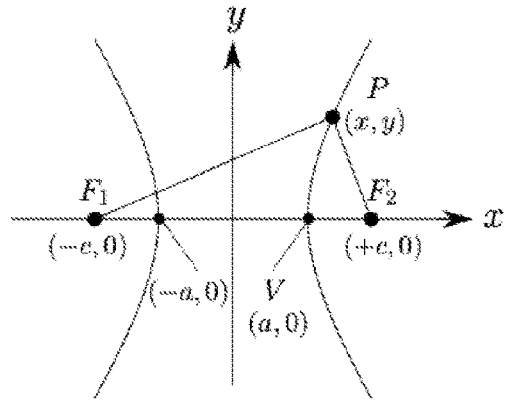
FIG. 4B shows a hyperbola that is used in defining a two dimensional elliptic-hyperbolic coordinate system.
Figure 4C:
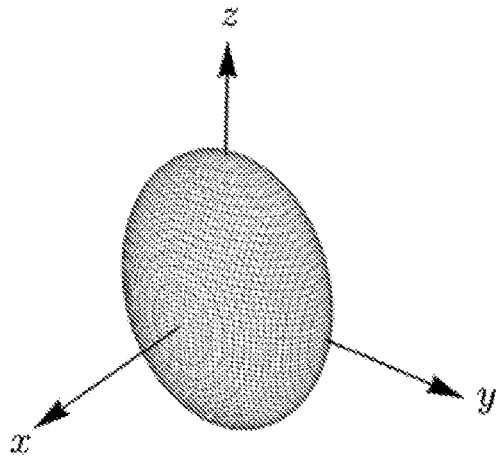
FIG. 4C shows an ellipsoid that is used in defining a three dimensional elliptic-hyperbolic coordinate system.
Figure 4D:
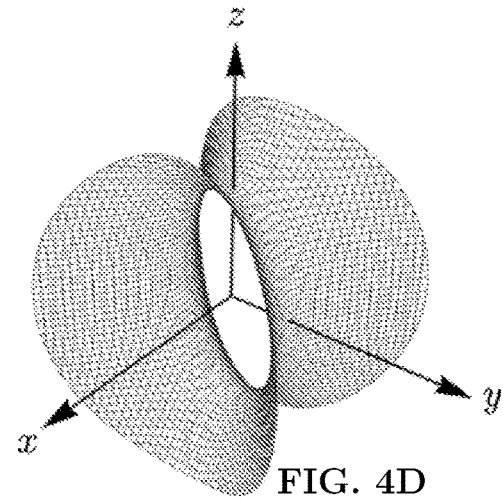
FIG. 4D shows a hyperboloid of one sheet that is used in defining a three dimensional elliptic-hyperbolic coordinate system.
Figure 4E:
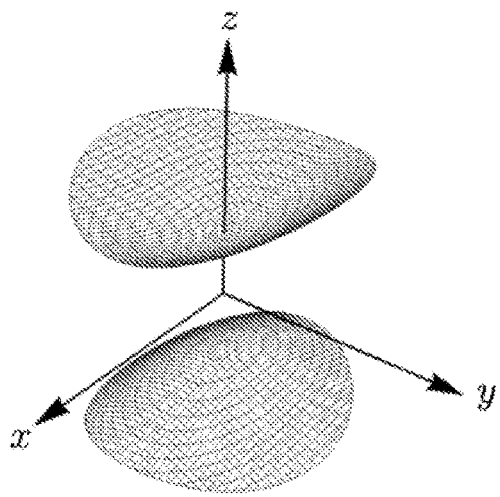
FIG. 4E shows a hyperboloid of two sheets that is used in defining a three dimensional elliptic-hyperbolic coordinate system.
Figure 4F:
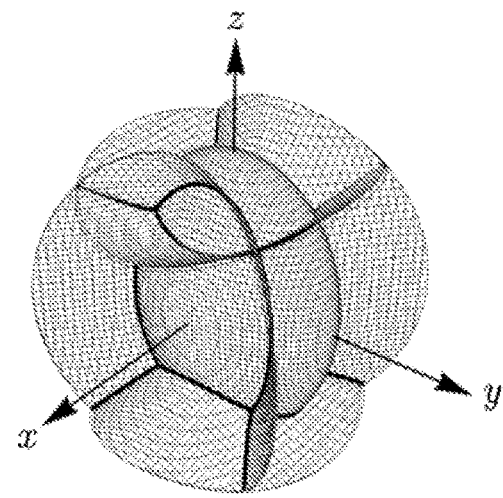
FIG. 4F shows an ellipsoid, a hyperboloid of one sheet, and a hyperboloid of two sheets together so that the resulting three dimensional coordinate system is shown as the curves of intersection at single points.

The spheroidal shape, an example of which is shown in FIG. 4C, is exceptional in its geometric ability to represent many NPs including prolate spheroids, oblate spheroids, spheres, cylinders, and triaxial spheroids. Let's look at two dimensions before three dimensions for a better understanding while using less math.

Therefore, consider FIG. 4A, which shows a generic ellipse. The ellipse has major principle axis of length $2a$, a minor principle axis of length $2b$, and distance between foci of length $2c$. The ellipse is defined by the property that the sum of the distance from two foci to the curve is a constant $\kappa_1$. That is $\overline{F_1P} + \overline{F_2P} = \kappa_1$. However, we can use the special case of point P coinciding with point V, so that $\kappa_1 = \overline{F_1P} + \overline{F_1P} = (a+c)+(a-c) = 2a$. Having found $\kappa_1 = 2a$ we can write $\sqrt{(c+x)^2+y^2} + \sqrt{(c-x)^2+y^2} = 2a$ so that after a bit of algebra $$x^2/a^2 + y^2/a^2 - c^2 = 1 \text{ where } a > c \tag{80}$$

where we define $b^2 = a^2 - c^2$, which is consistent with the Pythagorus theorem. A similar situation exists for a hyperbolic curve in FIG. 4B, where $\overline{F_1P} - \overline{F_2P} = \kappa_2$ and for point P=V we find that $\kappa_2 = \overline{F_1P} - \overline{F_2P} = (c+a)-(c-a) = 2a$. Therefore, $\sqrt{(c+x)^2+y^2} - \sqrt{(c-x)^2+y^2} = 2a$ and $$\frac{x^2}{a^2} - \frac{y^2}{c^2 - a^2} = 1 \text{ where } a < c \tag{81}$$

where we define $b^2 = a^2 - c^2$. A couple of important observations are in order at this point. First, both equations can be condensed into one equation system taking the form $$\frac{x^2}{a^2} + \frac{y^2}{b^2} = 1 \tag{82}$$

$$b^2 = a^2 - c^2 \tag{83}$$

where the sign of the second term in Eq. 82 determines if an ellipse or a hyperbola is represented by Eq 82. Second, for an ellipse and hyperbola we can write $$c^2 = a^2 - b^2 \tag{84}$$
$$= \underbrace{[a^2 + f(\xi)]}_{A^2} - \underbrace{[b^2 + f(\xi)]}_{B^2},$$

where $f(\xi)$ is an arbitrary function of a new coordinate $\xi$. Thus we can find another major axis A and another minor axis B such that C=c is conserved and the focal points are unchanged and confocal for both the ellipse and hyperbola. All that is required is to add to the squared lengths of the major and minor axes the same arbitrary function $f(\xi)$. The simplest example of such a function is $f(\xi)=\xi$. Therefore, following this line of reasoning a family of two-dimensional elliptic-hyperbolic coordinates requires two equations parameterized by two new coordinates $\{\xi, \eta\}$.

If $0<b<a$ then the principle axis of the ellipse and hyperbola are x-directed, as shown in FIGS. 4A-B and $$x\text{-Ellipse}: \frac{x^2}{a^2+\xi} + \frac{y^2}{b^2+\xi} = 1 \quad (a^2+\xi)>0 \ \& \ (b^2+\xi)>0 \tag{85}$$

$$x\text{-Hyperbola}: \frac{x^2}{a^2+\eta} + \frac{y^2}{b^2+\eta} = 1 \quad (a^2+\eta)>0 \ \& \ (b^2+\eta)<0. \tag{86}$$

Alternately, if $0<a<b$ then the principle axis of the ellipse and hyperbola are y-directed and $$y\text{-Ellipse}: \frac{x^2}{a^2+\xi} + \frac{y^2}{b^2+\xi} = 1 \quad (a^2+\xi)>0 \ \& \ (b^2+\xi)>0 \tag{87}$$

$$y\text{-Hyperbola}: \frac{x^2}{a^2+\eta} + \frac{y^2}{b^2+\eta} = 1 \quad (a^2+\eta)>0 \ \& \ (b^2+\eta)>0. \tag{88}$$

Furthermore, by solving for x and y we obtain $$x = \pm\sqrt{\frac{(a^2+\xi)(\eta+a^2)}{b^2-a^2}} \tag{89}$$

$$y = \pm\sqrt{\frac{(b^2+\eta)(b^2+\xi)}{b^2-a^2}}, \tag{90}$$

where only the positive (+) solutions are chosen in the first quadrant and the 4-fold symmetry of the coordinate system is exploited.

The above discussion is now extended to three dimensions as shown in FIG. 4C-F. In particular, consider three defining equations of the confocal ellipsoidal coordinate system Assuming: $0 < a < b < c < \infty$ \hfill (91)

Ellipsoide: $\frac{x^2}{a^2+\xi} + \frac{y^2}{b^2+\xi} + \frac{z^2}{c^2+\xi} = 1 \quad \{\xi:(a^2+\xi)>0\}$ \hfill (92)

Hyperbola of 1-Sheet: $\frac{x^2}{a^2+\eta} + \frac{y^2}{b^2+\eta} + \frac{z^2}{c^2+\eta} \quad \{\eta:(b^2+\eta)<0\}$ \hfill (93)

Hyperbola of 2-Sheets: $\frac{x^2}{a^2+\zeta} + \frac{y^2}{b^2+\zeta} + \frac{z^2}{c^2+\zeta} = 1 \quad \{\zeta:(c^2+\zeta)<0\}$ \hfill (94)

which is an asymmetric prolate spheroid with the longest axis along the z-axis, as shown in FIG. 4C, then $$x = \pm\sqrt{\frac{(a^2+\xi)(a^2+\eta)(a^2+\zeta)}{(b^2-a^2)(c^2-a^2)}} \tag{95}$$

$$y = \pm\sqrt{\frac{(b^2+\xi)(b^2+\eta)(b^2+\zeta)}{(a^2-b^2)(c^2-b^2)}} \tag{96}$$

$$z = \pm\sqrt{\frac{(c^2+\xi)(c^2+\eta)(c^2+\zeta)}{(a^2-c^2)(b^2-c^2)}} \tag{97}$$

where only the positive (+) solutions are chosen in the first octant and the 8-fold symmetry of the coordinate system is exploited. The covariant basis vectors are obtained from the position vector $$r(\xi,\eta,\zeta) = x(\xi,\eta,\zeta)\hat{x} + y(\xi,\eta,\zeta)\hat{y} + z(\xi,\eta,\zeta)\hat{z} \tag{98}$$

so that the covariant basis vectors are $$e_\xi = \frac{\partial r}{\partial \xi}, \ e_\eta = \frac{\partial r}{\partial \eta}, \ e_\zeta = \frac{\partial r}{\partial \zeta} \tag{99}$$

and the metric tensor $\bar{\bar{G}} = [e_i \cdot e_j]$ shows that the basis vectors are orthogonal, but not normalized as seen here $$\bar{\bar{G}} = \begin{bmatrix} \frac{(\xi-\zeta)(\xi-\eta)}{4(a^2+\xi)(b^2+\xi)(c^2+\xi)} & 0 & 0 \\ 0 & \frac{(\eta-\zeta)(\eta-\xi)}{4(a^2+\eta)(b^2+\eta)(c^2+\eta)} & 0 \\ 0 & 0 & \frac{(\zeta-\eta)(\zeta-\xi)}{4(a^2+\zeta)(b^2+\zeta)(c^2+\zeta)} \end{bmatrix}. \tag{100}$$

Next, define $$R_\sigma = \sqrt{(a^2+\sigma)(b^2+\sigma)(c^2+\sigma)} \tag{101}$$

then the Lamé coefficients are defined as $h_k = g_{kk}$ $$h_\xi = \frac{\sqrt{(\xi-\zeta)(\xi-\eta)}}{2R_\xi} \tag{102}$$

$$h_\eta = \frac{\sqrt{(\eta-\zeta)(\eta-\xi)}}{2R_\eta} \tag{103}$$

$$h_\zeta = \frac{\sqrt{(\zeta-\eta)(\zeta-\xi)}}{2R_\zeta} \tag{104}$$

and the line element in terms of the Lamé coefficients is $$(ds)^2 = h_\xi(d\xi)^2 + h_\eta(d\eta)^2 + h_\zeta(d\zeta)^2. \tag{105}$$

Additionally, the gradient, divergence, and Laplacian can now be written in terms of the Lamé coefficients as follows $$\nabla\Phi = \hat{e}_\xi \frac{\partial \Phi}{h_\xi \partial \xi} + \hat{e}_\eta \frac{\partial \Phi}{h_\eta \partial \eta} + \hat{e}_\zeta \frac{\partial \Phi}{h_\zeta \partial \zeta} \tag{106}$$

$$\nabla \cdot A = \frac{1}{h_\xi h_\eta h_\zeta}\left[\frac{\partial}{\partial \xi}(h_\eta h_\zeta A_\xi) + \frac{\partial}{\partial \eta}(h_\zeta h_\xi A_\eta) + \frac{\partial}{\partial \zeta}(h_\xi h_\eta A_\zeta)\right] \tag{107}$$

$$\nabla^2 \Phi = \frac{1}{h_\xi h_\eta h_\zeta} \tag{108}$$

$$\left[\frac{\partial}{\partial \xi}\left(\frac{h_\eta h_\zeta}{h_\xi}\frac{\partial \Phi}{\partial \xi}\right) + \frac{\partial}{\partial \eta}\left(\frac{h_\zeta h_\xi}{h_\eta}\frac{\partial \Phi}{\partial \eta}\right) + \frac{\partial}{\partial \zeta}\left(\frac{h_\xi h_\eta}{h_\zeta}\frac{\partial \Phi}{\partial \zeta}\right)\right]$$

where $\hat{e}_\xi = e_\xi/|e_\xi|$, $\hat{e}_\eta = e_\eta/|e_\eta|$, and $\hat{e}_\zeta = e_\zeta/|e_\zeta|$. Finally, of particular interest is the resulting Laplacian in terms of $\{\xi, \eta, \zeta\}$ explicitly $$\nabla^2 \Phi = \frac{4}{(\xi-\eta)(\xi-\zeta)(\eta-\zeta)}\left[(\eta-\zeta)R_\xi \frac{\partial}{\partial \xi}\left(R_\xi \frac{\partial \Phi}{\partial \xi}\right) + \right. \tag{109}$$

$$\left. (\zeta-\xi)R_\eta \frac{\partial}{\partial \eta}\left(R_\eta \frac{\partial \Phi}{\partial \eta}\right) + (\xi-\eta)R_\zeta \frac{\partial}{\partial \zeta}\left(R_\zeta \frac{\partial \Phi}{\partial \zeta}\right)\right],$$

which is needed in determining the depolarization tensor for an ellipsoidal NP.

The Spheroidal Conductor

In preparation for developing the depolarization tensor of a spheroidal dielectric it is instructive to first solve for the electric potential in the space surrounding a conductive triaxial spheroid. In particular, assume that a NP is orientated and aligned in its primed symmetry basis. Then we can write the electric potential by leveraging Eqs. 95-97

$$\phi_{in,x'} = -E_{in,x'} x' = -E_{in,x'} \sqrt{\frac{(a^2+\xi)(a^2+\eta)(a^2+\zeta)}{(b^2-a^2)(c^2-a^2)}} \tag{110}$$

$$\phi_{in,y'} = -E_{in,y'} y' = -E_{in,y'} \sqrt{\frac{(b^2+\xi)(b^2+\eta)(b^2+\zeta)}{(a^2-b^2)(c^2-b^2)}} \tag{111}$$

$$\phi_{in,z'} = -E_{in,z'} z' = -E_{in,z'} \sqrt{\frac{(c^2+\xi)(c^2+\eta)(c^2+\zeta)}{(a^2-c^2)(b^2-c^2)}}. \tag{112}$$

Clearly, in cartesian coordinates Laplace's equation $\nabla^2 \Phi = 0$ is satisfied separately for each of the above equations. It is also satisfied in the ellipsoidal-hyperbolic coordinates. Thus, it is easy to see that the solutions are separable in $\{\xi, \eta, \zeta\}$. For example, in the x'-direction $$\phi_{in,x'} = \underbrace{\frac{-E_{in}}{\sqrt{(b^2-a^2)(c^2-a^2)}}}_{C_{a1}} \underbrace{\sqrt{a^2+\xi}}_{F_a(\xi)} \underbrace{\sqrt{a^2+\eta}}_{F_a(\eta)} \underbrace{\sqrt{a^2+\zeta}}_{F_a(\zeta)} \tag{113}$$

and similar equations hold in the y' and z' directions. Therefore, if $F_\mu(\sigma) = \sqrt{\mu^2 + \sigma}$ then $$\phi_{in,x} = C_{a1} F_a(\xi) F_a(\eta) F_a(\zeta) \tag{114}$$

$$\phi_{in,y} = C_{b1} F_b(\xi) F_b(\eta) F_b(\zeta) \tag{115}$$

$$\phi_{in,z} = C_{c1} F_c(\xi) F_c(\eta) F_c(\zeta) \tag{116}$$

However, while the potential on the surface of the conducting spheroid is zero, at infinity it is not zero according to Eqs 113-112. Thus, there must be another term to the solution that regularizes the solution at infinity, i.e. when $\xi \to \infty$, so that the solution $\phi' 0$ as $\xi \to \infty$. This is consistent with Laplace's equation being a second order equation with two independent solutions. For example, in the x'-direction let $F_a(\xi) \to G_a(\xi)$ to regularize the electric potential at infinity, but leave the functionality otherwise unchanged. Then the particle's potential in the medium surrounding the particle must take the form $$\phi_{med,x} = C_{a2} G_a(\xi) F_a(\eta) F_a(\zeta), \tag{117}$$

which in combination with Eq. 101 and Eq. 109 can be used to solve Laplace's equation $\nabla^2 \phi_{med,x} = 0$, whereby $$R_\xi \frac{d}{d\xi}\left[R_\xi \frac{dG_a(\xi)}{d\xi}\right] - \left(\frac{b^2+c^2}{4} - \frac{\xi}{2}\right) G_a(\xi) = 0 \tag{118}$$

This is a $2^{nd}$ order ordinary differential equation that has one known solution $G_{a1} = F_a(\xi)$ and one unknown solution $G_{a2}(\xi)$, so that the complete solution is a superposition of $G_a(\xi) = C_{a1} G_{a1}(\xi) + C_{a2} G_{a2}(\xi)$.

By way of review, the physicist and mathematician Jean l Rond d'Alembert (1717-1783) developed the method of reduction of order, whereby an equation having canonical form $$\frac{d^2 y}{dx^2} + p(x)\frac{dy}{dx} + q(x)y = 0, \tag{119}$$

having a solution $y = y(x) = C_1 y_1(x) + C_2 y_2(x)$ can be solved if only $y_1 = y_1(x)$ is known. To find $y_2 = y_2(x)$ assume a product solution of the form $y_2 = v(x) y_1(x)$. Then on plugging this into Eq. 119 we find that $$\frac{d^2 v}{dx^2} + \left(p + \frac{2}{y_1}\frac{dy_1}{dx}\right)\frac{dv}{dx} = 0 \tag{120}$$

which does not have a term in v and is therefore trivial to solve by quadrature. To see this observe that if $u = dv/dx$ the above equation is reduced in order and becomes $$\frac{du}{dx} + \left(p + \frac{2}{y_1}\frac{dy_1}{dx}\right)u = 0. \quad (121)$$

Thus, on solving for the second solution to the original problem we find that $$y_2(x) = y_1(x)\int \frac{e^{-\int p(x)dx}}{y_1^2(x)}dx. \quad (122)$$

Therefore, for the current problem we have that $$p(\xi) = \frac{1}{R_\xi}\frac{dR_\xi}{d\xi} = \frac{d}{d\xi}\ln R_\xi \quad (123)$$

and $$G_{a2}(\xi) = G_{a1}(\xi)\int \frac{e^{\int p(\xi)d\xi}}{G_{a1}^2(\xi)}d\xi = F_a(\xi)\int \frac{d\xi}{F_a^2(\xi)R_\xi}. \quad (124)$$

Thus, the two solutions to Eq. 118 are $$G_{a1}(\xi) = \sqrt{a^2 + \xi} \quad (125)$$

$$G_{a2}(\xi) = \sqrt{a^2 + \xi}\int_\xi^\infty \frac{d\sigma}{(a^2+\sigma)R_\xi} \quad (126)$$

where $R_\xi$ is given by Eq. 101. Similar equations for the other principle directions are obtained by swapping a with b or c as needed. Also, $\sigma$ is a dummy integration variable and the limits of integration are chosen to regularize the solution at infinity. Now, taking these results and plugging back into Eq. 117 we find $$\phi_{med,x'} = C_{a2}F_a(\xi)F_a(\eta)F_a(\zeta)\int_\xi^\infty \frac{d\xi}{(a^2+\sigma)R_\sigma} = \frac{\phi_{in,x'}}{C_{a1}}\int_\xi^\infty \frac{d\xi}{(a^2+\sigma)R_\sigma} \quad (127)$$

The total electric potential is then $$\phi_{x'} = \phi_{in,x'} + \phi_{med,x'} = \phi_{in,x'}\left[1 + \frac{C_{a2}}{C_{a1}}\int_\xi^\infty \frac{d\sigma}{(a^2+\sigma)R_\sigma}\right]. \quad (128)$$

To determine the ratio of constants note that the surface potential $\phi_{sur}$ must satisfy $$\phi_{sur,x'} = \phi_{in,x'}\left[1 + \frac{C_{a2}}{C_{a1}}\int_0^\infty \frac{d\sigma}{(a^2+\sigma)R_\sigma}\right], \quad (129)$$

so on solving for $C_{a2}/C_{a1}$ and inserting into Eq. 128 we obtain $$\phi_{x'} = \phi_{in,x'} + (\phi_{sur,x'} - \phi_{in,x'})\frac{\int_\xi^\infty \frac{d\sigma}{(a^2+\sigma)R_\sigma}}{\int_0^\infty \frac{d\sigma}{(a^2+\sigma)R_\sigma}} \quad (130)$$

where the integrals in this equation are elliptic. The surface potential $\phi_{sur,x'}$ is obtained from the charge it holds and the capacitance of the spheroid, which is not calculated here. Analogous equations exist for the y' and z' directions by changing $a^2$ to $b^2$ and $c^2$ respectively as well as the value of the input potential.

Spheroidal Depolarization of a Dielectric

Consider a dielectric NP that is isotropic in its material properties and formed as a prolate spheroid. Let us further assume that the NP only supports bound charges in the form of polarized dipole moments and has no free charges. The NP is then subject to the continuity boundary conditions: (1) the electric potential, and (2) the normal component of the displacement field in the absence of free charges.

To start let's assume that the input electric field is in the x' direction so the results of the prior section can be used. Additionally, let the electric potential of the medium outside the NP be $\phi_{med} = \phi_{med}(\xi, \eta, \zeta)$ and the electric potential inside the particle be $\phi_{par} = \phi_{par}(\xi, \eta, \zeta)$, then in terms of $F_\mu$ from the previous section, we have for $\xi \geq 0$, i.e. at both the surface itself and outside the surface of the NP that $$\phi_{med}(\xi, \eta, \zeta) = \quad (131)$$
$$C_1 F_a(\xi)F_b(\eta)F_c(\zeta) + C_2 F_a(\xi)F_b(\eta)F_c(\zeta)\int_\xi^\infty \frac{d\sigma}{(a^2+\sigma)R_\sigma}$$

where the first term tends to infinity at an infinite distance from the NP and zero at the NP origin; and the second term compensates by tending to zero at infinity and a finite value at the NP surface. Also, inside the NP ($-a^2 < \xi \leq 0$)

$$\phi_{par}(\xi,\eta,\zeta) = C_3 F_a(\xi)F_b(\eta)F_c(\zeta) \quad (132)$$

which only tends to zero at the origin of the NP. Therefore, at the NP boundary itself, i.e. when $\xi = 0$, the continuity of the electric potential and normal component of the displacement field requires $$\phi_{par}(0, \eta, \zeta) = \phi_{med}(0, \eta, \zeta) \quad (133)$$

$$\frac{\epsilon_{par}}{h_\xi}\frac{\partial \phi_{par}}{\partial \xi}(0, \eta, \zeta) = \frac{\epsilon_{med}}{h_\xi}\frac{\partial \phi_{med}}{\partial \xi}(0, \eta, \zeta) \quad (134)$$

Reducing Eq. 133 we get $$C_3 = C_1 + C_2 \int_0^\infty \frac{d\sigma}{(\sigma+a^2)R_\sigma} \quad (135)$$

where $R_\sigma$ is given by Eq. 101. Also, on reducing Eq. 134 we have that $$\epsilon_{par}C_3 \frac{dF_a(\xi)}{d\xi} = \epsilon_{med}\frac{d}{d\xi}\left[C_1 F_a(\xi) + C_2 F_a(\xi)\int_\xi^\infty \frac{d\sigma}{(\sigma+a^2)R_\sigma}\right] \quad (136)$$

where $F_\mu(\sigma)=\sqrt{\mu^2+\sigma}$ so that $F(0)=a$ and $F_a'(0)=1/(2a)$. Additionally, $$\frac{d}{d\xi}\int_{\xi=0}^{\infty}\frac{d\sigma}{(\sigma+a^2)R_\sigma}=\frac{-1}{a^3bc} \quad (137)$$

then on using the chain rule on Eq. 136 and the facts just stated we arrive at $$C_3\epsilon_{par}=\epsilon_{med}\left[C_1-\frac{C_2}{abc}+C_2\int_0^\infty\frac{d\sigma}{(\sigma+a^2)R_\sigma}\right]. \quad (138)$$

Finally, when we combine Eq. 135 with Eq. 138 we obtain $$C_2=\frac{abc}{2}\left[\frac{\epsilon_{med}-\epsilon_{par}}{\epsilon_{med}}\right]C_3. \quad (139)$$

Now to find the potential inside the NP take Eq. 135 and plug into $C_3$ in Eq. 132. Then take $C_2$ in Eq. 139 and plug that into the resulting equation. Finally, take the definition of $C_1$ from Eq. 113 and use it to reduce the resulting equation. Then we find $$C_3=\frac{C_1}{1+\left(\frac{\epsilon_{par}-\epsilon_{med}}{\epsilon_{med}}\right)\frac{abc}{2}\int_0^\infty\frac{d\sigma}{(\sigma+a^2)R_\sigma}} \quad (140)$$

Finally, take the definition of $C_1$ from Eq. 113 and exploit it to reduce the resulting equation even further, whereby $$\phi_{par,x'}(\xi,\eta,\zeta)=\frac{-E_{in,x'}\left[\frac{F_a(\xi)F_b(\eta)F_c(\zeta)}{\sqrt{(b^2-a^2)(c^2-a^2)}}\right]}{1+\left(\frac{\epsilon_{par}-\epsilon_{med}}{\epsilon_{med}}\right)\frac{abc}{2}\int_0^\infty\frac{d\sigma}{(\sigma+a^2)R_\sigma}} \quad (141)$$

where the quantity in brackets is identified from Eq. 113 as x', therefore $$\phi_{par,x'}(x',y',z')=\frac{-E_{in,x'}x'}{1+\left(\frac{\epsilon_{par}-\epsilon_{med}}{\epsilon_{med}}\right)\frac{abc}{2}\int_0^\infty\frac{d\sigma}{(\sigma+a^2)R_\sigma}} \quad (142)$$

and the magnitude of the electric field inside the $\hat{x}'$ direction is deduced from the negative gradient whereby the electric field in the particle is $$E_{par}(x',y',z')=\frac{E_{in,x'}}{1+\left(\frac{\epsilon_{par}-\epsilon_{med}}{\epsilon_{med}}\right)\frac{abc}{2}\int_0^\infty\frac{d\sigma}{(\sigma+a^2)R_\sigma}}. \quad (143)$$

Now rearranging this equation yields $$E_{in,x'}=E_{par,x'}+E_{par,x'}\left(\frac{\epsilon_{par}-\epsilon_{med}}{\epsilon_{med}}\right)\frac{abc}{2}\int_0^\infty\frac{d\sigma}{(\sigma+a^2)R_\sigma}. \quad (144)$$

However, the displacement field is $D_{par}=\epsilon_{med}E_{par}+P_{par}=\epsilon_{par}E_{par}$ so that in the x' direction $$P_{par,x}=(\epsilon_{par}-\epsilon_{med})E_{par,x'} \quad (145)$$

and consequently $$E_{in,x'}=E_{par,x'}+\left(\frac{P_{par,x'}}{\epsilon_{med}}\right)\frac{abc}{2}\int_0^\infty\frac{d\sigma}{(\sigma+a^2)R_\sigma}. \quad (146)$$

However, $P_{par}+P_{cav}=0$ and recalling Eq. 101 the above relation can be written as $$E_{in,x'}=E_{par,x'}+E_{cav,x'} \quad (147)$$

$$E_{cav,x'}=-\frac{M_{x'x'}P_{cav,x'}}{\epsilon_{med}} \quad (148)$$

$$M_{x'x'}=\frac{abc}{2}\int_0^\infty\frac{d\sigma}{(\sigma+a^2)R_\sigma} \quad (149)$$

$$R_\sigma=\sqrt{(a^2+\sigma)(b^2+\sigma)(c^2+\sigma)}, \quad (150)$$

which should be compared to Eqs. 44-45.

Moreover, by starting with Eq. 143 and multiplying both sides by $(\epsilon_s-\epsilon_{med})$ and then using Eq. 145 we obtain $$P_{par,x'}=\frac{E_{in,x'}}{\frac{1}{\epsilon_{par}-\epsilon_{med}}+\frac{M_{x'x'}}{\epsilon_{med}}} \quad (151)$$

Obviously, we have been only been considering the case of a NP in the symmetry basis (eigen-basis) and at that only for an x' directed electric field excitation. By inspecting the equations for the x' direction we can generalize to the tensor form.

$$E_{cav}=E_{in}+\frac{1}{\epsilon_{med}}\underbrace{\begin{bmatrix}M_{x'x'} & 0 & 0\\ 0 & M_{y'y'} & 0\\ 0 & 0 & M_{z'z'}\end{bmatrix}}_{\bar{\bar{M}}'}\underbrace{\begin{bmatrix}P_{par,x}\\ P_{par,y}\\ P_{par,z}\end{bmatrix}}_{P_{par}} \quad (152)$$

$$M_{x'x'}=\frac{abc}{2}\int_0^\infty\frac{d\sigma}{(\sigma+a^2)\sqrt{(\sigma+a^2)(\sigma+b^2)(\sigma+c^2)}} \quad (153)$$

$$M_{y'y'}=\frac{abc}{2}\int_0^\infty\frac{d\sigma}{(\sigma+b^2)\sqrt{(\sigma+a^2)(\sigma+b^2)(\sigma+c^2)}} \quad (154)$$

$$M_{z'z'}=\frac{abc}{2}\int_0^\infty\frac{d\sigma}{(\sigma+c^2)\sqrt{(\sigma+a^2)(\sigma+b^2)(\sigma+c^2)}} \quad (155)$$

$$P_{par,x'}=\frac{E_{in,x'}}{\frac{1}{\epsilon_{par}-\epsilon_{med}}+\frac{M_{x'x'}}{\epsilon_{med}}} \quad (156)$$

$$P_{par,y'}=\frac{E_{in,y'}}{\frac{1}{\epsilon_{par}-\epsilon_{med}}+\frac{M_{y'y'}}{\epsilon_{med}}} \quad (157)$$

-continued $$P_{par,z'} = \frac{E_{in,z'}}{\frac{1}{\epsilon_{par} - \epsilon_{med}} + \frac{M_{z'z'}}{\epsilon_{med}}}$$ (158)

or in more compact notation $$P_{par} = \epsilon_m[\epsilon_{par}\overline{\overline{M}}' + \epsilon_{med}(\overline{\overline{I}} - \overline{\overline{M}}')]^{-1}(\epsilon_{par} - \epsilon_{med})E_{in}$$ (159)

where $$\overline{\overline{M}}' = \begin{bmatrix} M_{x'x'} & 0 & 0 \\ 0 & M_{y'y'} & 0 \\ 0 & 0 & M_{z'z'} \end{bmatrix}.$$ (160)

On comparison with Eq. 76 this can be written as $$P_{par} = \epsilon_{med}(N\overline{\overline{\alpha}}')E_{in}$$ (161)

where the particle itself comprises a material that is isotropic $\overline{\overline{\epsilon}}_{par} = \epsilon_{par}\overline{\overline{I}}$ and similar expression for the surrounding medium. Thus, all the anisotropy is from the particle geometry. This particular derivation of the polarization density $P_{par}$ from first principles assumed that the NPs are far enough away form each other that the dipole fields from one NP do not appreciable interact with the dipole fields of another NP. However, if the NPs are close together then dipole interactions would occur and we would have an expression such as from Eq. 66, so that in the eigen symmetry basis $$P_{par} = \epsilon_{med}\overline{\overline{\chi}}' E_{in},$$ (162)

where $$\overline{\overline{\chi}}' = (N\overline{\overline{\alpha}}')[\overline{\overline{I}} - \overline{\overline{M}}'(N\overline{\overline{\alpha}}')]^{-1}$$ (163)

In summary, $$P_{par} = \begin{cases} \epsilon_{med}(N\overline{\overline{\alpha}}')E_{in} & \text{NPs not too close together} \\ \epsilon_{med}(N\overline{\overline{\alpha}}')[\overline{\overline{I}} - \overline{\overline{M}}'(N\overline{\overline{\alpha}}')]^{-1} E_{in} & \text{NPs very close together} \end{cases}$$ (164)

It will be shown later that when the NPs are not too close together then frequency adjustable torques and frequency adjustable stability axis exist on colloid systems having ohmic losses to DEP fields. However, when NPs are close together then the torques go to zero, which is a phenomena that is called dipole shadowing. This must be accounted for in PSO designs by keeping the volume fraction of NP low enough to avoid the dipole shadowing yet high enough to control light efficiently. This distinction in torque processes is developed directly from Eq. 164 in detail in subsequent sub-sections.

Additional mathematical properties of the depolarization factors in the eigen-basis can be ascertained as well. For example, the trace of $\overline{\overline{M}}'$ is the same as the sum of the eigenvalues, which is a constant independent of the basis used. Therefore, we consider the sum $$M_{x'x'} + M_{y'y'} + M_{z'z'} =$$ (165)
$$\frac{abc}{2} \int_0^\infty \left[ \frac{1}{\sigma + a^2} + \frac{1}{\sigma + b^2} + \frac{1}{\sigma + c^2} \right] \frac{d\sigma}{\sqrt{(\sigma + a^2)(\sigma + b^2)(\sigma + c^2)}}$$

and take $u = R_\sigma^2 = (\sigma+a^2)(\sigma+b^2)(\sigma+c^2)$. It is easy to see that $$\frac{1}{u}\frac{du}{d\sigma} = \frac{1}{\sigma + a^2} + \frac{1}{\sigma + b^2} + \frac{1}{\sigma + c^2}$$ (166)

so that $$M_{x'x'} + M_{y'y'} + M_{z'z'} = \frac{abc}{2} \int_{a^2b^2c^2}^\infty \frac{du}{u^{3/2}} = 1$$ (167)

Thus, as earlier examples suggested, in any cartesian basis we have that the sum of the eigen values of a depolarizations matrix is unity because $$M_{x'x'} + M_{y'y'} + M_{z'z'} = 1.$$ (168)

Next, consider the evaluation of the integrals in Eqs. 153-155. Evaluation of these depolarization-factor integrals are now provided for several important cases. The first case is for prolate triaxial spheroids where in general $$M_{x'x'} = \left(\frac{abc}{2}\right) \frac{\left[\frac{-2b}{a} + \frac{2cE_3\left[\sin^{-1}\left[\frac{\sqrt{c^2 - a^2}}{c}\right], \frac{c^2 - b^2}{c^2 - a^2}\right]}{\sqrt{c^2 - a^2}}\right]}{c(a^2 - b^2)}$$ (169)

$$M_{y'y'} = \left(\frac{abc}{2}\right) \frac{\left[\frac{-2a}{b} + \frac{2cE_3\left[\sin^{-1}\left[\frac{\sqrt{c^2 - b^2}}{c}\right], \frac{c^2 - a^2}{c^2 - b^2}\right]}{\sqrt{c^2 - b^2}}\right]}{c(b^2 - a^2)}$$ (170)

$$M_{z'z'} = \left(\frac{abc}{2}\right) \frac{\left[\frac{-2b}{c} + \frac{2aE_3\left[\sin^{-1}\left[\frac{\sqrt{a^2 - c^2}}{a}\right], \frac{a^2 - b^2}{a^2 - c^2}\right]}{\sqrt{a^2 - c^2}}\right]}{a(c^2 - b^2)}$$ (171)

where $E_3$ is the elliptic function of the third kind, also called the elliptic-E function.

The second case for evaluating Eqs. 153-155 is for prolate and oblate spheroids defined by x' and y' axes having equal extent, i.e. a=b, we find that $M_{x'x'}=M_{y'y'}$ and if we define a new variable $\eta=c/a$ then the depolarization factors are $$M_{x'x'} = \frac{1}{2} - \frac{1}{2(1 - \eta^2)} + \frac{\eta\cos^{-1}\eta}{2(1 - \eta^2)^{3/2}}$$ (172)

$$M_{z'z'} = \frac{1}{1 - \eta^2} - \frac{\eta\cos^{-1}\eta}{(1 - \eta^2)^{3/2}}$$ (173)

$$2M_{x'x'} + M_{z'z'} = 1.$$ (174)

Finally, as a check of principles consider the case of a sphere where a=b=c then $M_{x'x'}=M_{y'y'}=M_{z'z'}$ and we find that $$M_{x'x'} = \frac{a^3}{2} \int_0^\infty \frac{d\sigma}{(\sigma + a^2)\sqrt{(\sigma + a^2)(\sigma + a^2)(\sigma + a^2)}} = \frac{1}{3}$$ (175)

Figure 5:
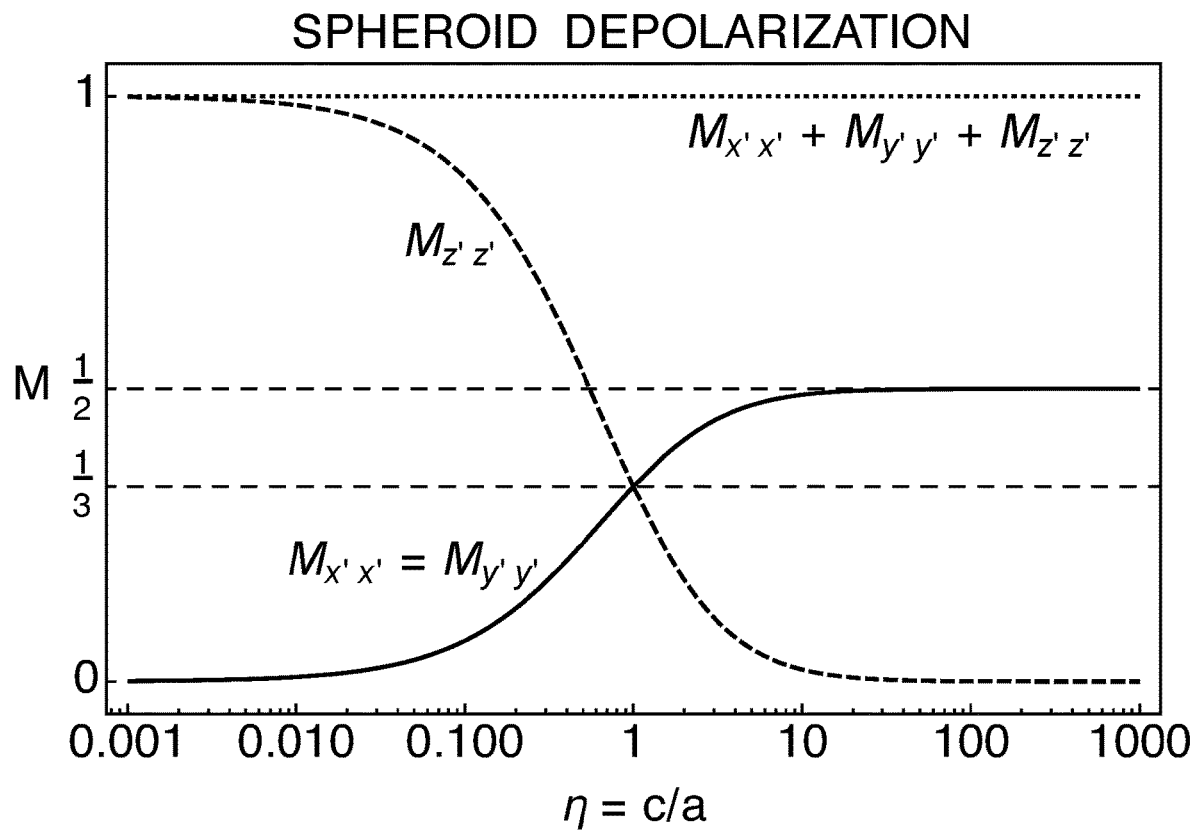
FIG. 5 shows the depolarization of a spheroid passing from oblate to sphere to prolate. The sphere occurs when $\eta=c/a=1$ and $M=1/3$. The oblate spheroid occurs when $0<\eta<1$ and $c<a=b$. The prolate spheroid occurs when $1<\eta<\infty$ and $a=><c$. This is critical to forming electric fields inside a particle that are not in the same direction to the external dielectrophoresis excitation field to allows non-zero torques on particles controlling light scattering.

Which is the same value of $M_{x'x'}$ as provided in the matrix of Eq. 41. The combined cases of the oblate spheroid, prolate spheroid, and sphere are provided in FIG. 5.

Therefore, if the input electric field is uniform and parallel in a medium $\epsilon_{med}$ then the electric field within a particle (or cavity) is also uniform, parallel, and independent of the orientation of the NP. Moreover $E_{in}$ is in general not parallel to $E_{par}$ or $E_{cav}$. This effect is due entirely to the shape of the NP and its homogeneous, isotropic, and linear medium. Moreover, it should be noted that while the expressions for the depolarization factors cover many practical situations there are other examples, such as multi-layer particles that are not covered in this solution. This in no way limits the general idea and in fact it is possible to develop expressions or empirical studies for such cases as well.

Note that in the limit of substantially oblate, prolate, and spherical spheroids (i.e. see FIG. 5) we have the approximations $$\overline{\overline{M}}'(\text{Oblate}) = \begin{bmatrix} 0 & 0 & 0 \\ 0 & 0 & 0 \\ 0 & 0 & 1 \end{bmatrix} \tag{176}$$

$$\overline{\overline{M}}'(\text{Prolate}) = \begin{bmatrix} \frac{1}{2} & 0 & 0 \\ 0 & \frac{1}{2} & 0 \\ 0 & 0 & 0 \end{bmatrix} \tag{177}$$

$$\overline{\overline{M}}'(\text{Sphere}) = \begin{bmatrix} \frac{1}{3} & 0 & 0 \\ 0 & \frac{1}{3} & 0 \\ 0 & 0 & \frac{1}{3} \end{bmatrix} \tag{178}$$

and the resulting expressions that use the tensor depolarization factor simplify substantially.

Connecting Depolarization to Particle and Cavity Fields

From Eqs. 42-45 and Eqs. 147-150 we have that $$E_{in} = E_{par} + E_{cav} \tag{179}$$

$$P_{par} + P_{cav} = 0 \tag{180}$$

$$E_{par} = -\frac{\overline{\overline{M}} \cdot P_{par}}{\epsilon_m} = \frac{\overline{\overline{M}} \cdot P_{cav}}{\epsilon_m} \tag{181}$$

$$E_{cav} = \frac{\overline{\overline{M}} \cdot P_{par}}{\epsilon_m} = -\frac{\overline{\overline{M}} \cdot P_{cav}}{\epsilon_m} \tag{182}$$

where it should be noted that a electrically neutral cavity and its corresponding neutral particle have the same surface with opposite signed charges. As the distance between a positive and negative charge in the particle is the same as that of the cavity then each elemental dipole moment of the cavity is of the same magnitude an opposite sign of the particle and $Np_{cav} = -Np_{par}$ so that Eq. 180 results. Thus, the four ways to connect $E_{par}$ and $E_{cav}$ to $P_{par}$ and $P_{cav}$ have been provided.

Polarizability and Susceptibility of Spheroids

The results of this sub-section are important because it connects the physical parameters of the system to the polarizability and susceptibility of spheroids, which are further connected to particle forces, torques, and stress. The relations developed below are used for actual calculations and to get a sense of how physical parameters impact the performance of both particle electrokinetics and optics. Of great importance is the frequency response of colloidal (and other) mixtures. For example, in subsequent sections a frequency response, with ohmic loss, is shown to orient a particle in any desired direction by means of harmonic electric field excitation, i.e. changing the frequency changes the direction of the stable direction of particles. This is a key capability for synthesizing optical systems. Note that the results of this sub-section assume that the constitutive parameters of permittivity and conductivity are a constant, i.e. not a function of frequency. Frequency is introduced directly via Maxwell's equations not a material model such as the Lorentz and Drude models of a dielectric and metal respectively. The starting point is with the polarizability from Eq. 76

$$N\overline{\overline{\alpha}}' = [\overline{\overline{\epsilon}}_{par}\overline{\overline{M}}' + \epsilon_{med}(\overline{\overline{I}} - \overline{\overline{M}}')]^{-1}(\overline{\overline{\epsilon}}_{par} - \overline{\overline{I}}\epsilon_{med}). \tag{183}$$

however, for an isotropic particle $\overline{\overline{\epsilon}}_{par}' = \overline{\overline{I}}\epsilon_{par}$ we obtain, $$N\overline{\overline{\alpha}}' = [\epsilon_{par}\overline{\overline{M}}' + \epsilon_{med}(\overline{\overline{I}} - \overline{\overline{M}}')]^{-1}(\epsilon_{par} - \epsilon_{med}). \tag{184}$$

It is seen that the anisotropic nature of $\overline{\overline{\alpha}}'$ is from the geometry of the particle if the particle's material is isotropic; and any anisotropic characteristic is then given in the geometric depolarization factor $\overline{\overline{M}}'$. The components of the depolarization factor are given by Eqs. 172-173 for the very practical symmetric spheroids, which are plotted in FIG. 5. Note that the restriction to isotropic materials is not necessary. If a crystal is used in the material making up particles then $\overline{\overline{\epsilon}}_{par}'$ would not in general be a diagonal matrix. It might of course still be possible to diagonalize the resulting expression for the polarizability and susceptibility, however the eigen basis would no longer have the same simple interpretation that it does in the isotropic case.

The electric susceptibility in the particle's eigen symmetry basis is then given by Eq. 71 as $$\overline{\overline{\chi}}' = (N\overline{\overline{\alpha}}')[\overline{\overline{I}} - \overline{\overline{M}}'(N\overline{\overline{\alpha}}')]^{-1}. \tag{185}$$

However, from Eq. 60 we know that $N = N_{max}v_{par}$. Some discretion is required in using this expression for N in all parts of Eq. 185. In particular, the force or torque on a single particle will exist independent of the size of the medium surrounding a particle, but $v_{par} \to 0$ as the medium surrounding the single particle increases in volume. As force and torque are proportional to $\overline{\overline{\chi}}'$ the forces and torques would be modeled as approaching zero when they are clearly not zero. To overcome this we make the following generalizing approximation $$\overline{\overline{\chi}}' \approx (N\overline{\overline{\alpha}}')\left[\overline{\overline{I}} - \left(\frac{v_{par}}{v_{max}}\right)\overline{\overline{M}}'(N\overline{\overline{\alpha}}')\right]^{-1}. \tag{186}$$

where as already discussed $v_{max} \approx 2/3$ is very roughly correct for random packed spheres and will be used as the baseline even for other NP shapes as well for a first order approximation.

Next observe that for the specific case of an isotropic particle medium the quantities $N\overline{\overline{\alpha}}'$, $\overline{\overline{\chi}}'$, and $\overline{\overline{K}}'$ are all diagonal matrices. This allows all the calculations can be simplified to scalar calculations. Starting with each term of the diagonal in Eq. 184, which takes the form $$N\alpha' = \frac{\epsilon_{par} - \epsilon_{med}}{\epsilon_{par}M' + (1 - M')\epsilon_{med}} \tag{187}$$

were $\alpha' \in \{\alpha_{x'x'}, \alpha_{y'y'}, \alpha_{z'z'}\}$ and $M' \in \{M_{x'x'}, M_{y'y'}, M_{z'z'}\}$. Now in general $$\epsilon = \epsilon_R - i\epsilon_I \quad (188)$$

$$\sigma = \sigma_R - i\sigma_I \quad (189)$$

however, the imaginary parts $\epsilon_I \approx 0$ and or $\sigma_I \approx 0$ therefore, from Eq. 31 and the assumption that the permittivity is far away from a material resonance, as discussed in the Lorentz model of a dielectric, we have medium and particle permittivities as $$\epsilon_{med} = \epsilon_{mR} - i\frac{\sigma_{mR}}{\omega} \quad (190)$$

$$\epsilon_{par} = \epsilon_{pR} - i\frac{\sigma_{pR}}{\omega}. \quad (191)$$

Using Eq. 186 and plugging in Eqs. 190-191 we obtain $$\chi' \approx \frac{K_\infty}{1 - \beta M' K_\infty} + \quad (192)$$

$$\frac{\frac{K_0}{1 - \beta M' K_\infty} - \frac{K_\infty}{1 - \beta M' K_\infty}}{1 + \xi^2 \mathcal{T}_{MW}^2 \omega^2} + i \frac{\left[\frac{K_\infty - K_0}{(1 - \beta M' K_0)^2}\right] \mathcal{T}_{MW} \omega}{1 + \xi^2 \mathcal{T}_{MW}^2 \omega^2}$$

where a new parameter $\beta$ called the compactness is introduced. In principle the compactness is a tensor and has components $\overline{\beta} = \{\beta_{x'x'}, \beta_{y'y'}, \beta_{z'z'}\}$, however to keep the modeling simple for now it is kept as a scalar consistent with a sphere. The resulting parameters of the electric susceptibility are then $$\beta = \frac{v_{par}}{v_{max}} \approx \left(\frac{3}{2}\right) v_{par} \quad (193)$$

$$K_0 = \frac{\sigma_{pR} - \sigma_{mR}}{M'\sigma_{pR} + (1 - M')\sigma_{mR}} \quad (194)$$

$$K_\infty = \frac{\epsilon_{pR} - \epsilon_{mR}}{M'\epsilon_{pR} + (1 - M')\epsilon_{mR}} \quad (195)$$

$$\mathcal{T}_{MW} = \frac{M'\epsilon_{pR} + (1 - M')\epsilon_{mR}}{M'\sigma_{pR} + (1 - M')\sigma_{mR}} \quad (196)$$

$$\xi = \frac{1 - K_\infty \beta M'}{1 - K_0 \beta M'} \quad (197)$$

$$\xi \mathcal{T}_{MW} = \frac{\epsilon_{mR}(1 - M'(1 - \beta)) + M'(1 - \beta)\epsilon_{pR}}{\sigma_{mR}(1 - M'(1 - \beta)) + M'(1 - \beta)\sigma_{pR}}. \quad (198)$$

The case when $\beta=0$, i.e. when neighboring particles are far away provides $$\chi' \approx N\alpha' = K_\infty + \underbrace{\frac{K_0 - K_\infty}{1 + \mathcal{T}_{MW}^2 \omega^2}}_{\chi'_R} + i\underbrace{\frac{[K_\infty - K_0]\mathcal{T}_{MW}\omega}{1 + \mathcal{T}_{MW}^2 \omega^2}}_{\chi'_I}. \quad (199)$$

which is a function of $M'$ through $K_0$, $K_\infty$, and $\tau_{MW}$. Next, the case when $\beta=1$ with neighboring particles close together provides $$\chi' \approx \underbrace{\frac{\epsilon_{pR} - \epsilon_{mR}}{\epsilon_{mR}}}_{\chi'_R} + \underbrace{\frac{\frac{\sigma_{pR}}{\sigma_{mR}} - \frac{\epsilon_{pR}}{\epsilon_{mR}}}{1 + \left(\frac{\epsilon_{mR}}{\sigma_{mR}}\right)^2 \omega^2}}_{\chi'_R} + i\underbrace{\frac{\left(\frac{\epsilon_{pR}\sigma_{mR} - \epsilon_{mR}\sigma_{pR}}{\sigma_{mR}^2}\right)\omega}{1 + \left(\frac{\epsilon_{mR}}{\sigma_{mR}}\right)^2 \omega^2}}_{\chi'_I}, \quad (200)$$

which is completely independent of the depolarization factor M'. Intermediate values of $\beta$ produce intermediate results and the concept of "close" also depends on the shape of the NPs so that that above is only an approximation. Thus, all the factors of M' cancel out when particles are close to neighbors, but not when they are far away. This is a critical insight into why particles that are close together experience polarization shadowing, which reduces and ultimately eliminates torques for very closely packed particles energized with electric fields of specific phase in each principle direction of a NP—described in a subsequent section. This sets up an optimal range for $v_{par}$ for maximum performance in controlling light scattering and DEP. This is discussed in greater detail in a subsequent sub-section.

Hybrid States of Matter

Thus, from the previous sub-section, colloids and suspensions of spheroidal (ellipsoidal) particles can form a hybrid state of matter. By changing the distance between particles by DEP the volume fraction changes the compactness parameter $\beta$ from zero when particles are far away from each other to unity when they are very close (touching). At $\beta=1$ the shape of the molecules becomes irrelevant as all the depolarization factors $\overline{M}'$ cancel out by dipole shadowing and particle rotation from DEP induced torques becomes impossible for electric fields having a zero phase difference between each of the principle directions. This results in a "liquid glass state" where particles cluster to form regions having similar orientation. Therefore, by electronically controllable DEP the state of matter that is somewhere between liquid and solid is controlled. The dipole shadowing effect can be used to lock-in or park a particular configuration of NP orientations so that angular drift is minimized or eliminated.

Combined Lorentz & Drude Model of a Material

In the previous section it was assumed that parameters like conductivity and permittivity are constants. This is not always the case near material resonances and the expressions for polarizability and susceptibility can become much more complex and offer an ever greater richness of phenomena. It is with this in mind that this section, which includes material that is typically considered well-known, is provided as a substantive reminder of the impact of material resonances.

The techniques of this section are applicable across the entire frequency range, i.e. from DEP frequencies to optical frequency bandwidths. That said, the material response at DEP frequencies also depends on the material response at optical frequencies. Therefore, understanding and calculating the permittivity in Eq. 75 for a DEP process requires an encompassing theory across all frequencies.

In this section a simple one-dimensional model is provided that corresponds to one of the eigen symmetry basis directions in a particle's tensor permittivity $\overline{\epsilon}$. There are several potential dipole sources. First, it has an electronic component that is due to an electron cloud being distorted around atoms that are under the influence of an external electric field. Second, molecules and charges therein can also distort chemical bonds when under the influence of an external electric field. Third, the distortions having both an external force and a restoring force can have multiple vibration modes, each of which contributes to the permittivity. Fourth, there are also thermal forces that give rise to a an average permittivity in a medium filled with polar molecules. Moreover, the crystal geometry comprising a Bravais lattice and a basis set of atoms impacts the character of the atom-to-atom and molecule to molecule interactions.

It is well known that one can model an oscillating charge using a simple Newtonian approach. The results are almost exactly the same result as that from quantum electrodynamics. Therefore, by way of review we can model an atom with a charge cloud by a spring model that includes a forcing function from a driving electric field, a restoring force modeled as a spring with spring constant, and a loss mechanism that is associated with interactions with neighboring atoms that can take away energy. In particular, if the displacement of an electron is $x=x(t)$ then $$m_e \frac{d^2 x(t)}{dt^2} + m_e \gamma \frac{dx(t)}{dt} + m_e \omega_0^2 x(t) = qE_{in} e^{i\omega t} \quad (201)$$

where the restoring forces has a "spring constant" of $m_e \omega_0^2$. Therefore, assuming that $x(t) = x_0 e^{i\omega t}$ we have $$x_0 = \frac{qE_{in}/m_e}{-\omega^2 + i\gamma\omega + \omega_0^2}. \quad (202)$$

and the polarization density is $P=Np=Nqx_0$, so that $$P = \frac{Nq^2 E_{in}/m_e}{\omega_0^2 - \omega^2 + i\gamma\omega}, \quad (203)$$

but $P = \epsilon_0 \bar{\chi} E_{in}$ therefore $$\chi = \frac{Nq^2/(m_e \epsilon_0)}{\omega_0^2 - \omega^2 + i\gamma\omega} \quad (204)$$

However, first $P=(\epsilon-\epsilon_0)E_{in}=\epsilon_0 \bar{\chi} E_{in}$ so the relative permittivity is $\epsilon_r = 1 + \bar{\chi}$; and second there are a multitude of resonances as already discussed. Finally, identifying the plasma frequency as $\omega_{pls} = Nq^2/(m_e \epsilon_0)$ then $$\epsilon_r = 1 + \sum_j \frac{\omega_{pls}^2}{\omega_{0,j}^2 - \omega^2 + i\gamma_j \omega}. \quad (205)$$

This equation can be further broken down into a real and imaginary part $\epsilon_r = \epsilon_R - i\epsilon_I$ where $$\epsilon_R = 1 + \sum_j \frac{\omega_{pls}^2 (\omega_{0,j}^2 - \omega^2)}{(\omega_{0,j}^2 - \omega^2)^2 + \gamma_j^2 \omega^2} \quad (206)$$

-continued $$\epsilon_I = \sum_j \frac{\omega_{pls}^2 (\gamma_j \omega)}{(\omega_{0,j}^2 - \omega^2)^2 + \gamma_j^2 \omega^2}. \quad (207)$$

Theses equations are valid for both dielectrics and metals. When a material is a metal simply set $\omega_0 = 0$. For example, setting $\omega_0 = 0$ Eq. 205 becomes $$\epsilon_r = 1 - \frac{\omega_{pls}^2}{\omega^2 - i\gamma\omega} \quad (208)$$

$$= 1 - \frac{\omega_{pls}^2/\omega}{\omega - i\gamma} \quad (209)$$

$$= 1 - \omega_{pls}^2 \mathcal{T}^2 \left( \frac{1 + i/(\omega\mathcal{T})}{1 + \omega^2 \mathcal{T}^2} \right) \quad (210)$$

where $\tau = 1/\gamma$ is the mean scattering time of the electrons. One important point being that through the permittivity of dielectrics and metals one can find the polarizability $\bar{\alpha}$ and susceptibility $\bar{\chi}$ so that a non-zero induced dipole moment $p_{ind}$ exists. Thus, via Eqs. 33-34 both DEP forces and torques exist for both dielectrics as well as metals. Moreover, both dielectrics and metals can scatter light and provide a means for controlling light in PSO.

Another important point being that the conductivity is also complex. Recall that $P=(\epsilon_r-1)\epsilon_0 E=Np$. Then in the frequency domain we can take the derivative by multiplying by $i\omega$ therefore the current is given by $$j = (i\omega)P \quad (211)$$

$$= i\omega \left( \frac{-\omega_{pls}^2/\omega}{\omega - i\gamma} \right) E_{in}$$

$$= \frac{\omega_{pls}^2 \mathcal{T} E_{in}}{1 - i\omega\mathcal{T}}$$

$$= \sigma E$$

where $\tau = 1/\gamma$. Therefore, the conductivity takes the form $$\sigma = \sigma_R - i\sigma_I \quad (212)$$

where $$\sigma_R = \frac{\omega_{pls}^2 \mathcal{T}}{1 + (\omega\tau)^2} \quad (213)$$

$$\sigma_I = \frac{\omega_p^{2}{}_S \mathcal{T}(\omega\mathcal{T})}{1 + (\omega\mathcal{T})^2} \quad (214)$$

The real part of the conductivity corresponds to a conductive current and the imaginary part corresponds to a displacement current.

Tensor Permittivity of a Particle

If we consider Eq. 205 as the general one-dimensional express for the relative permittivity in one of the eigen symmetry basis directions then we can extend the analysis to anisotropic media as follows. In the eigen symmetry basis (represented by double primes) of an underlying crystal forming a NP we can use equations like Eq. 205 along the diagonal of a permittivity tensor, whereby $$\overline{\overline{\epsilon}}_{par}'' = \begin{bmatrix} \epsilon_{11}'' & 0 & 0 \\ 0 & \epsilon_{22}'' & 0 \\ 0 & 0 & \epsilon_{33}'' \end{bmatrix}. \tag{215}$$

Physically this says that along the $v_1'$ direction the relative permittivity is $\epsilon_{11}''$. Along the $v_2'$ direction the relative permittivity is $\epsilon_{22}''$. Along the $v_3'$ direction the relative permittivity is $\epsilon_{33}''$. Notice that the directions have only a single prime on them because they are measured with respect to the primed system, that is the principle axis of the particle's shape. Said another way, the directions of crystal symmetry are measured relative to the coordinate used to specify the geometric principle axis of the particle, which itself comprises a crystal material with a different set of symmetry directions due to the crystallographic geometry.

Equation 215 can be transformed from the eigen symmetry basis of the crystal into the eigen symmetry basis of the particle by a transformation. We do this by considering the eigenvalue problems $$\overline{\overline{\epsilon}}_{par} v_1' = \epsilon_{11}'' v_1' \tag{216}$$

$$\overline{\overline{\epsilon}}_{par} v_2' = \epsilon_{22}'' v_2' \tag{217}$$

$$\overline{\overline{\epsilon}}_{par} v_3' = \epsilon_{33}'' v_3' \tag{218}$$

These three eigenvalue problems can be rearranged into a matrix format $$\overline{\overline{\epsilon}}_{par}[[v_1',v_2',v_3']] = [\epsilon_{11}''v_1', \epsilon_{22}''v_2', \epsilon_{33}''v_3'] \tag{219}$$

so that $$\overline{\overline{\epsilon}}_{par} \overline{\overline{V}}' = \overline{\overline{V}}' \overline{\overline{\epsilon}}_{par}'' \tag{220}$$

and finally $$\overline{\overline{\epsilon}}_{par}' = \overline{\overline{V}}' \overline{\overline{\epsilon}}_{par}'' (\overline{\overline{V}}')^{-1}. \tag{221}$$

This equation transfers the relative permittivity into the coordinate system of the symmetry basis of a particle. The matrix $\overline{\overline{\epsilon}}_{par}''$ is diagonal and therefore symmetric even when the individual entries along the diagonal are complex numbers. The similarity transformation will therefore result in a symmetric matrix $\overline{\overline{\epsilon}}_{par}'$. This is critical as it is consistent with electromagnetic reciprocity, which is a built-in feature of Maxwell's equations for reciprocal media. Additionally, the transformation matrix $\overline{\overline{V}}'$ corresponds to a passive transformation wherein the coordinates are changed, but the crystallographic symmetry directions $\{v_1', v_2', v_3'\}$ remain fixed in space. In this way, setting the vectors $\{v_1', v_2', v_3'\}$ fixes the crystallographic symmetry directions relative the particle in the primed system.

Tensor Permittivity as a State Function

The permittivity of a particle is a thermodynamic state function with independent variables of temperature, pressure, electric field, magnetic field, stress, strain, frequency and other parameters. Therefore, light scattering is affected by these thermodynamic signals and such thermodynamic processes are included herein without constraint. There are applications that can exploit these state variables.

The Average Polarizability

If there are several types of particles in the system then an average value of the polarizability can be found. For example, imagine that there are $w_1$ NPs of one kind, $w_2$ NPs of a second kind, and $w_3$ molecules of a liquid forming a colloid. Then the average polarizability is calculated as a weighted sum $$\langle \overline{\overline{\alpha}} \rangle = \frac{w_1 \overline{\overline{\alpha}}_1 + w_2 \overline{\overline{\alpha}}_2 + w_3 \overline{\overline{\alpha}}_3}{w_1 + w_2 + w_3}. \tag{222}$$

However, the ratio $w_1/(w_1+w_2+w_3)$ is simply the average number of particles, which can be given in terms of Eq. 60, which provides that $N = N_{max} v_{par} = N_1 v_1$ and similar for the other components of the sum. Therefore, $$\langle N\alpha \rangle = v_1(N_1 \overline{\overline{\alpha}}_1) + v_2(N_2 \overline{\overline{\alpha}}_2) + v_3(N_3 \overline{\overline{\alpha}}_3). \tag{223}$$

Equation 223 is a tensor form of the Lorentz-Lorenz mixing equation. Generalizing to different colloid properties $X_j$ with values $\xi_j$ is done by introducing a continuous joint probability distribution so that $$\langle N\overline{\overline{\alpha}} \rangle = \iint \ldots \int f_{X_1, X_2, \ldots, X_\sigma}(\xi_1, \xi_2, \ldots \xi_\sigma)(N\overline{\overline{\alpha}}) d\xi_1 d\xi_2 \ldots d\xi_\sigma \tag{224}$$

where $f_{X_1, X_2, \ldots}(\xi_1, \xi_2, \ldots, \xi_\sigma)$ is the joint probability distribution function for properties $\{X_1, X_2, \ldots, X_\sigma\}$. This equation is very useful for ascertaining the effective polarizability when a complex material has probability distributions of particle volume fractions, particle shapes, sizes, particle orientations, Bravais lattice orientation, and crystallographic basis. This mixing of particles in a medium provides a way to develop useful new colloid properties.

The Scalar Lorentz-Lorenz Equation

When many atoms are packed close together, as is the case in a glass or similar optical material, then the medium external to the atoms is vacuum and the background medium is vacuum so that $\epsilon = \epsilon_r \epsilon_0 = n^2 \epsilon_0$, where n is the RI of the optical material. If the atom is modeled as a sphere then we get the Lorentz-Lorenz expression from Eq. 175 and Eq. 184

$$\frac{N\alpha}{3} = \left[ \frac{n^2 - 1}{n^2 + 2} \right]. \tag{225}$$

The Scalar Lorentz-Lorenz Mixing Equation

To find what happens to the RI when two types of materials are mixed together in such a way as to assure that there is intimate contact with the atomic scale materials we use a two component form of Eq. 223 as well as Eq. 225, whereby $$\frac{n^2 - 1}{n^2 + 2} = v_1 \left( \frac{n_1^2 - 1}{n_1^2 + 2} \right) + v_2 \left( \frac{n_2^2 - 1}{n_2^2 + 2} \right) \tag{226}$$

which is the classical Lorentz-Lorenz mixing equation. This equation is valid for PSO because the liquid and the larger particles are in intimate contact at the atomic scale.

The Scalar Linear Mixing Equation

By expanding Eq. 226 in a Taylor expansion about n=1 we find that $$\frac{n^2-1}{n^2+2} = \frac{2(n-1)}{3} - \frac{1}{9}(n-1)^2 - \frac{4}{27}(n-1)^3 + \frac{11}{81}(n-1)^4 - \quad (227)$$

and similar equations for $n_1$ and $n_2$ so that on retaining only the first order terms and plugging into Eq. 226 we find $$n+v_1+v_2=1+v_1 n_1+v_2 n_2, \quad (228)$$

but the volume fractions add to unity $v_1+v_2=1$. Therefore $$n=v_1 n_1+v_2 n_2, \quad (229)$$

which is the linear mixing equation for a two-component optical mixture such as a simple colloid. It is valid when the constituent elements are atoms, molecules, and NPs that are much smaller than the wavelength of light. Additionally, because the volume fractions add to unity $v_1+v_2=1$ it is also true that for a colloid with $n_1=n_L$ as the liquid RI, and $n_2=n_P$ as the particle RI and similarly for the volume fractions then $$n=n_L+(n_P-n_L)v_P \quad (230)$$

so that the average RI of spherical particles is given in terms of the particle volume fraction as indicated.

The Tensor Linear Mixing Equations

Equation 230 only provides the RI in the case of spherical particles that are not made of an anisotropic material or shape. To include non-spherical particles and isotropic material we can utilize Eq. 76 for a simple colloid whereby $$\langle N\bar{\alpha}\rangle = v_L(N_L\bar{\alpha}_L) + v_P(N_P\bar{\alpha}_P) \quad (231)$$

where the volume fractions of the liquid $v_L$ and the particles $v_P$ satisfy $v_L+v_P=1$. However, for optics Eq. 231 must incorporate that light travels in a vacuum between the atomic and molecular particles of a liquid and solid. Therefore, at this spatial scale $\epsilon_{med}=\epsilon_0$. If we further assume that the material comprising a NP is made from an isotropic material, without an anistropic crystal structure, then $\bar{\epsilon}_{par}=\epsilon_0\epsilon_P\bar{I}$ so that in a NP's eigen symmetry basis we have that $$N\bar{\alpha}' = [\bar{\epsilon}'_{par}\bar{M}' + \epsilon_{med}(\bar{I}-\bar{M}')]^{-1}(\bar{\epsilon}'_{par}-\bar{I}\epsilon_{med})$$

$$= \begin{bmatrix} \frac{\epsilon_P-1}{\epsilon_P M_{x'x'} + (1-M_{x'x'})} & 0 & 0 \\ 0 & \frac{\epsilon_P-1}{\epsilon_P M_{y'y'} + (1-M_{y'y'})} & 0 \\ 0 & 0 & \frac{\epsilon_P-1}{\epsilon_P M_{z'z'} + (1-M_{z'z'})} \end{bmatrix}$$

and only particle shape influences light scattering. Thus, each diagonal term takes the form $$N\alpha'_{mm} = \frac{\epsilon_P-1}{\epsilon_P M_{m'm'} + (1-M_{m'm'})}. \quad (233)$$

For the sake of simplifying notation, let's temporarily set $M_{m'm'} \to M$ then each diagonal element of the eigen symmetry basis of Eq. 231 must satisfy $$\frac{n^2-1}{n^2 M+1-M} = \left(\frac{n_L^2-1}{n_L^2 M_L+1-M_L}\right)v_L + \left(\frac{n_P^2-1}{n_P^2 M_P+1-M_P}\right)v_P \quad (234)$$

where $n^2=\epsilon$, $n_L^2=\epsilon_P$, and $n_P^2=\epsilon_P$. However, on the left side of the equation both $\epsilon_P$ and M are unknown. Now observe to first order the following quantities $$\frac{n^2-1}{n^2 M+1-M} = 2(n-1)+ \quad (235)$$

$$\frac{n^2}{n^2 M+1-M} = 1+2(1-M)(n-1)+ \quad (236)$$

$$\frac{1}{n^2 M+1-M} = 1-2M(n-1)+ \quad (237)$$

and similar expressions for the $M_L$ and $M_P$ terms of Eq. 234. Note that to first order Eq. 235 has no terms that include M. This makes orientation analysis extremely difficult. To make a proper first order theory we must have additional insight on where the factors of M are in the linear theory. One mathematical insight is that Eq. 234 is actually two separate equations that have been added together and the first order factors of M cancel out. As Eq. 234 needs an additional constraint to solve for M as well as n simultaneously, we can enforce that $$\frac{n^2}{n^2 M+1-M} = \left(\frac{n_L^2}{n_L^2 M_L+1-M_L}\right)v_L + \left(\frac{n_P^2}{n_P^2 M_P+1-M_P}\right)v_P \quad (238)$$

$$\frac{1}{n^2 M+1-M} = \left(\frac{1}{n_L^2 M_L+1-M_L}\right)v_L + \left(\frac{1}{n_P^2 M_P+1-M_P}\right)v_P \quad (239)$$

which can be subtracted to again obtain Eq. 234. There are now two equations in two unknowns {n, M}. Expanding each term to first order in n by a Taylor expansion about n=1 and then using the fact that $v_L+v_P=1$, we find that Eqs. 238-239 become respectively $$[-M+M_L v_L]+\{-n(1-M)+(1-M_L)n_L v_L+(1-M_P)n_P v_P\}=0 \quad (240)$$

$$[-M+M_L v_L+M_P v_P]+\{Mn-M_L n_L v_L-M_P n_P v_P\}=0 \quad (241)$$

(232)

where the items in square brackets are set to zero to establish the average value of M in a way that is consistent with the intuitive sense of the average for M. Setting the curly bracket quantities to zero also results in the following expressions $$n_1 = \left(\frac{S_L}{S}\right)n_L v_L + \left(\frac{S_P}{S}\right)n_P v_P \quad (242)$$

-continued $$n_2 = \left(\frac{M_L}{M}\right)n_L v_L + \left(\frac{M_P}{M}\right)n_P v_P \tag{243}$$

$$M = M_L v_L + M_P v_P \tag{244}$$

$$S = S_L v_L + S_P v_P \tag{245}$$

$$\mu_L v_L + \mu_P v_P = 1 \tag{246}$$

$$\sigma_L v_L + \sigma_P v_P = 1 \tag{247}$$

$$v_L + v_P = 1 \tag{248}$$

$$S = 1 - M, S_L = 1 - M_L, S_P = 1 - M_P \tag{249}$$

$$\mu_L = \frac{M_L}{M}, \mu_P = \frac{M_P}{M} \tag{250}$$

$$\sigma_L = \frac{S_L}{S}, \sigma_P = \frac{S_P}{S} \tag{251}$$

$$v_L = \frac{V_L}{V}, v_P = \frac{V_P}{V} \tag{252}$$

where $n_1$ and $n_2$ effectively now is taken to correspond to two solutions of a quadratic equation in $n^2$. Notice that when all particles are spherical with depolarizations $M=M_L=M_P=1/3$ then the equations for the RI reduce to that of Eq. 229 as would be expected. Also, as is typical in physical analysis we usually reject one of the quadratic roots as being unphysical. In this case Eq. 243 is not a physically justifiable approximation to the solution of the exact equation Eq. 234. This is because its curvature and values with respect to independent variable $v_P$ are inconsistent with the numerical solution to Eq. 234, i.e. when taking $M=M_L v_L + M_P v_P$. It will be shown later that the RI is maximum when the light passes through the greatest amount of material of the particle. The rejected solution is the case that the RI is greatest when the light passes through the thinnest amount of particle material, which is not true and is rejected for that reason. However, for the purposes of this disclosure both solutions are generally retained as possible solutions in certain situations.

Note that the linear model given above can overestimate RI by as much as 12% at the worst case volume fractions of $v_P=50\%$ and overestimate RI by about 3% or less at more typical volume fractions of $v_P=12\%$ or less. For precision optics numerical solutions of Eq. 234 should be used or at least a second order Taylor expansion. However to understand qualitatively the underlying physics this linear model for $\bar{n}$ is quite good. Note that Eq. 245 is derived by subtracting Eq. 244 from Eq. 248 to obtain an expression for 1−M. The quantities M, which vary between 0≤M≤1 are called depolarizations factors, the quantities S which vary between 0≤S≤1 are called the shape factors. Thus, shape factors give rise to shape fractions such as σp which are analogous to volume fractions $v_P$. Again, by way of review the electrical depolarization factors $M_P$ in the eigen symmetry basis are given by Eqs. 172-173 for symmetrical prolate and oblate spheroids.

Using the definitions just provided we can write each diagonal element of the RI in the eigen symmetry basis of the particles, therefore from Eq. 242

$$n = n_L \sigma_L v_L + n_P \sigma_L v_P \tag{253}$$

$$\sigma_L v_L + \sigma_P v_P = 1 \tag{254}$$

so that each diagonal element of the RI in the eigen symmetry basis of a particle takes the form $$n = n_L + (n_P - n_L) v_P \sigma_P. \tag{255}$$

This equation establishes that volume fraction and shape fraction are very closely related and it is possible to trade off particle volume fraction $v_P$ with particle shape fraction $\sigma_P$. Said another way, particles need not be solid. It is completely possible to have a deformable particle that changes its shape by the electrokinetics of dielectrophoresis to scatter light. Thus, by at least one of particle translation, rotation, orientation, and material deformation light can be scattered from one or more particles to affect a particular optical effect.

Going forward in this document the addition of primes to indicate the eigen symmetry basis is again reestablished. Therefore, in the eigen symmetry basis we have that the RI of particles of different shape and isotropic bulk material is given to first order as $$\begin{bmatrix} n_{x'x'} & 0 & 0 \\ 0 & n_{y'y'} & 0 \\ 0 & 0 & n_{z'z'} \end{bmatrix} = n_L \bar{\bar{I}} + (n_P - n_L) v_P \bar{\bar{\sigma}}_P' = \begin{bmatrix} \sigma_{x'x'} & 0 & 0 \\ 0 & \sigma_{y'y'} & 0 \\ 0 & 0 & \sigma_{z'z'} \end{bmatrix} \tag{256}$$

or equivalently $$\bar{\bar{n}}' = n_L \bar{\bar{I}} + (n_P - n_L) v_P \bar{\bar{\sigma}}_P'. \tag{257}$$

Equations 242-252 can be rewritten in tensor form. Start by choosing the shape of the NPs, perhaps using Eqs. 172-173 or FIG. 5 for symmetric spheroids. Then form the depolarizations matrices for components of the colloid. For a liquid $$\bar{\bar{M}}_L' = \begin{bmatrix} M_{L,x'x'} & 0 & 0 \\ 0 & M_{L,y'y'} & 0 \\ 0 & 0 & M_{L,z'z'} \end{bmatrix} \tag{258}$$

and for one type of particle it is $$\bar{\bar{M}}_P' = \begin{bmatrix} M_{P,x'x'} & 0 & 0 \\ 0 & M_{P,y'y'} & 0 \\ 0 & 0 & M_{P,z'z'} \end{bmatrix}. \tag{259}$$

Next, determine the average tensor depolarization of the colloid in terms of the volume fractions of the liquid and particles, so that $$\bar{\bar{M}}' = \bar{\bar{M}}_L' v_L + \bar{\bar{M}}_P' v_P \tag{260}$$

where $v_L + v_P = 1$. Now calculate the shape factors $$\bar{\bar{S}}' = \bar{\bar{I}} - \bar{\bar{M}}' \tag{261}$$

$$\bar{\bar{S}}_L' = \bar{\bar{I}} - \bar{\bar{M}}_L' \tag{262}$$

$$\bar{\bar{S}}_P' = \bar{\bar{I}} - \bar{\bar{M}}_P' \tag{263}$$

and then form the shape fractions $$\bar{\bar{\sigma}}_L' = \bar{\bar{S}}_L' (\bar{\bar{S}}')^{-1} \tag{264}$$

$$\bar{\bar{\sigma}}_P' = \bar{\bar{S}}_P' (\bar{\bar{S}}')^{-1} \tag{265}$$

where $$\bar{\bar{\sigma}}_L' v_L + \bar{\bar{\sigma}}_P' v_P = \bar{\bar{I}} \tag{266}$$

$$v_L + v_P = 1. \tag{267}$$

It should be obvious that these equations can be extended to as many liquid and particle components as are needed to address a complex multi-component mixture. For example, $v_1+v_2+v_3=1$, etc.

Finally, the RI can be calculated. In general if the bulk material of the NPs is crystalline, i.e. not isotropic, and the liquid of the colloid is assumed to be isotropic, then we have $$\bar{\bar{n}}' = n_L \bar{\bar{I}} + (\bar{\bar{n}}_P' - n_L \bar{\bar{I}}) v_P \bar{\bar{\sigma}}_P' \tag{268}$$

where $\bar{\bar{n}}_P'$ is the tensor RI of the crystal in the particle-shape eigen symmetry basis and is typically not a diagonal matrix even in the particle's eigen symmetry basis. Also, if the NPs in a differential volume of a colloid are all exactly in the same orientation and "feel" the same torques then the reorientation process is described approximately to first order by $$\begin{aligned}\bar{\bar{n}} &= \bar{\bar{W}} \bar{\bar{n}}' \bar{\bar{W}}^{-1} \\ &= n_L \bar{\bar{I}} + \bar{\bar{W}}\left[(\bar{\bar{n}}_P' - n_L \bar{\bar{I}}) v_P \bar{\bar{\sigma}}_P'\right] \bar{\bar{W}}^{-1} \\ &= n_L \bar{\bar{I}} + \bar{\bar{W}}\left[(\bar{\bar{n}}_P' - n_L \bar{\bar{I}}) \bar{\bar{W}}^{-1} \bar{\bar{W}} \bar{\bar{\sigma}}_P'\right] \bar{\bar{W}}^{-1} v_P \\ &= n_L \bar{\bar{I}} + \left[\bar{\bar{W}} \bar{\bar{n}}_P' \bar{\bar{W}}^{-1} - n_L \bar{\bar{I}}\right] \bar{\bar{W}} \bar{\bar{\sigma}}_P' \bar{\bar{W}}^{-1} v_P \\ &= n_L \bar{\bar{I}} + \left[\bar{\bar{n}}_P - n_L \bar{\bar{I}}\right] \bar{\bar{\sigma}}_P v_P\end{aligned} \tag{269}$$

However, when the NPs are in random directions to start and are influenced by different electric fields from point-to-point then a probability density function must be used to calculate either the mean $\langle \bar{\bar{n}} \rangle$ or the mean rotation matrix $\langle \bar{\bar{W}} \rangle$. Therefore, $$\langle \bar{\bar{n}} \rangle \approx n_L \bar{\bar{I}} + [\bar{\bar{n}}_P - n_L \bar{\bar{I}}] \bar{\bar{\sigma}}_P v_P \tag{270}$$

$$\bar{\bar{n}}_P = \bar{\bar{\xi}} \bar{\bar{n}}_P' \bar{\bar{\xi}}^{-1} \tag{271}$$

$$\bar{\bar{\sigma}}_P = \bar{\bar{\xi}} \bar{\bar{n}}_P' \bar{\bar{\xi}}^{-1} \tag{272}$$

$$\bar{\bar{\xi}} = \iint \bar{\bar{W}}(\theta,\phi) f_T(r,t,\theta,\phi,\omega_j) d\theta d\phi \tag{273}$$

where $\bar{\bar{\xi}} = \bar{\bar{\xi}}(r, t, \omega_j)$. Also, the probability density function due to torques T on NPs is $f_T(r, t, \theta, \phi, \omega_j)$, which is clearly a function of position r, time t, and the DEP excitation frequencies $\omega_j$. See Eq. 8 in the introduction.

Numerical Examples of Geometric Refractive Index

The previous section introduced many concepts that may become more clear by means of numerical examples. In particular, it is instructive to calculate the tensor RI of a colloid under different conditions of particle geometry. Using Eqs. 242-252 for each term of the diagonal of the RI tensor is very instructive. Therefore, let's assume that:
1. The volume fraction of the NPs is initially $v_P=0.10$;
2. RI of a liquid silicone oil is $n_L=1.4$;
3. RI of titanium dioxide $TiO_2$ particles is $n_P=2.8$;
4. Liquid and particles are isotropic;
5. Liquid molecules are approximately spherical;
6. Prolate spheroids are 10× longer than diameter (e.g. Rutile $TiO_2$); and
7. Oblate spheroids are 10× thinner than diameter.

The volume fraction of the liquid is then $v_L = 1-v_P = 9/10$. The diagonal elements of the depolarization tensor for the ideal sphere, prolate spheroid, and oblate spheroid are read directly from the graph of FIG. 4, whereby for spherical particles of the liquid the depolarization tensor is $$\bar{\bar{M}}_L'(\text{Sphere}) = \begin{pmatrix} 1/3 & 0 & 0 \\ 0 & 1/3 & 0 \\ 0 & 0 & 1/3 \end{pmatrix}. \tag{274}$$

The depolarization tensor for ideal prolate spheroidal particles is $$\bar{\bar{M}}_P'(\text{Prolate}) = \begin{pmatrix} 1/2 & 0 & 0 \\ 0 & 1/2 & 0 \\ 0 & 0 & 0 \end{pmatrix}. \tag{275}$$

The depolarization tensor for ideal oblate spheroidal particles is $$\bar{\bar{M}}_P'(\text{Oblate}) = \begin{pmatrix} 0 & 0 & 0 \\ 0 & 0 & 0 \\ 0 & 0 & 1 \end{pmatrix}. \tag{276}$$

Additionally, the colloid has an average depolarization tensor of $$\bar{\bar{M}}'(\text{Prolate}) = v_L \bar{\bar{M}}_L' + v_P \bar{\bar{M}}_P'(\text{Prolate}) \approx \begin{pmatrix} 0.35 & 0 & 0 \\ 0 & 0.35 & 0 \\ 0 & 0 & 0.30 \end{pmatrix}. \tag{277}$$

The effective shape factor for the colloid particles is $$\bar{\bar{S}}'(\text{Prolate}) = \bar{\bar{I}} - \bar{\bar{M}}'(\text{Prolate}) \approx \begin{pmatrix} 0.65 & 0 & 0 \\ 0 & 0.65 & 0 \\ 0 & 0 & 0.70 \end{pmatrix}. \tag{278}$$

The shape factor for prolate spheroidal particles is $$\bar{\bar{S}}_P'(\text{Prolate}) = \bar{\bar{I}} - \bar{\bar{M}}_P'(\text{Prolate}) = \begin{pmatrix} 1/2 & 0 & 0 \\ 0 & 1/2 & 0 \\ 0 & 0 & 1 \end{pmatrix}. \tag{279}$$

Therefore, the shape fraction for the prolate spheroids is $$\bar{\bar{\sigma}}_P'(\text{Prolate}) = \bar{\bar{S}}_P'(\text{Prolate})\left[\bar{\bar{S}}'(\text{Prolate})\right]^{-1} \approx \begin{pmatrix} 0.77 & 0 & 0 \\ 0 & 0.77 & 0 \\ 0 & 0 & 1.43 \end{pmatrix}. \tag{280}$$

So that, finally, for the prolate spheroid the colloid having NP volume fraction of $$\bar{\bar{n}}'(\text{Prolate}) = n_L \bar{\bar{I}} + (n_P - n_L) v_P \bar{\bar{\sigma}}_P'(\text{Prolate}) \approx \begin{pmatrix} 1.51 & 0 & 0 \\ 0 & 1.51 & 0 \\ 0 & 0 & 1.60 \end{pmatrix}. \tag{281}$$

And a similar set of calculations for the oblate spheroid provides $$\bar{\bar{n}}'(\text{Oblate}) = n_L \bar{\bar{I}} + (n_p - n_L)v_P \bar{\bar{\sigma}}'_P(\text{Prolate}) \approx \begin{pmatrix} 1.6 & 0 & 0 \\ 0 & 1.6 & 0 \\ 0 & 0 & \boxed{1.40} \end{pmatrix}. \quad (282)$$

The values in Eqs. 280-282 provide significant physical insight into what is occurring. The basic RI rule for prolate spheroids in a colloid is that the colloid has its maximum RI in the direction of the longest axis of the NPs in each differential volume. The basic RI rule for oblate spheroids in a colloid is that the colloid has its minimum RI in the direction of the shortest axis of the NPs in each differential volume. So the direction of propagation where the RI is greatest occurs when the light has to pass through the greatest length of material of the NP, assuming the NP has a uniform RI that is greater then the surrounding liquid medium. In Eq. 282 the oblate spheroid's thinnest direction induces no RI and the background RI of the liquid is all that remains—corresponding to the boxed value. It turns out that the oblate spheroid can provide a full range of RI values, i.e. consistent with its volume fraction, just by orientation of the NP. This is a previously unrealized capability.

Had the rejected solution of Eq. 243 been used then Eq. 282 would have been $$\bar{\bar{n}}'(\text{Oblate}) = n_L \bar{\bar{I}} + (n_p - n_L)v_P \bar{\bar{\sigma}}'_P(\text{Oblate}) \approx \begin{pmatrix} 1.40 & 0 & 0 \\ 0 & 1.40 & 0 \\ 0 & 0 & \boxed{1.75} \end{pmatrix}. \quad (283)$$

The oblate spheroid associated with Eq. 282 and Eq. 283 has a short thickness in the z' direction and a 10× wider diameter. So light passing though the thickness of the oblate spheroid has much less of an opportunity to be slowed down in the higher RI of the particle. Thus the RI must be smaller in the z' direction. Clearly this only occurs in Eq. 282.

The Refractive Index Ellipsoid

An anisotropic crystal has different RI values along different principle axes because the crystal structure provides different tendencies for the electrons to extend to different distances from the atoms in those principle directions. This leads to different dipole moments, electric susceptibilities and RI values in the principle directions. This is different from what happens for NPs derived from isotropic-materials and formed into non-spherical spheroids. The average RI of the colloid is due to a time delay induced by the particles, therefore the more NP material that a ray of light has to pass through the slower the average light propagation—i.e. when the RI of the particle is greater than the liquid.

Moreover, the total energy stored in the electric field and magnetic field of the light field is conserved. Therefore $W = W_E + W_B = 2W_E = \text{const}$. Therefore, $W = E \cdot D = D \cdot (\epsilon_0 \bar{\bar{\epsilon}})^{-1} D$, so that in the eigen symmetry basis of a NP made from an isotropic material we have for the colloid $$\frac{D_x^2/(\epsilon_0 W)}{n_{x'x'}^2} + \frac{D_y^2/(\epsilon_0 W)}{n_{y'y'}^2} + \frac{D_z^2/(\epsilon_0 W)}{n_{z'z'}^2} = 1 \quad (284)$$

and convert to normalized coordinates $$\frac{s_x^2}{n_{x'x'}^2} + \frac{s_y^2}{n_{y'y'}^2} + \frac{s_z^2}{n_{z'z'}^2} = 1 \quad (285)$$

and therefore take $s_x = s_y = n(\theta)\sin\theta$ and $s_z = n(\theta)\cos\theta$, where $\theta$ is the angle from the optical axis, i.e. the z' axis. Therefore, for both prolate and oblate spheroids $n_{x'x'} = n_{y'y'} = n_o = n_a$ is the ordinary RI, and $n_{z'z'} = n_e = n_c$ is the extraordinary RI. The designations $n_a$ and $n_c$ help connect RI to geometry as they indicate the RI along the a and c axis respectively, where we note that a=b for symmetric prolate and oblate spheroids.

Hence, the RI for a colloid with all the NPs having the same $\theta$ in a differential volume is given by $$\frac{1}{n^2(\theta)} = \frac{\sin^2\theta}{n_a^2} + \frac{\cos^2\theta}{n_c^2} \quad (286)$$

where $n_a < n_c$ for prolate spheroids, $n_a > n_c$ for oblate spheroids, and $n_a = n_c$ for spheres. This can be extended to NPs with an underlying crystal anisotropy and geometric anisotropy. Thus, a colloid comprising NPs with non-spherical geometry exhibit different effective RI values in different directions, even though the underlying material that comprises the NPs is isotropic and homogeneous in the particles. Thus, by varying the volume fraction of particles $v_P$ as well as the orientation of particles $\bar{\bar{\sigma}}_P'$ the effective RI of $$\bar{\bar{n}}' = \begin{bmatrix} n_a & 0 & 0 \\ 0 & n_a & 0 \\ 0 & 0 & n_c \end{bmatrix} = n_L \bar{\bar{I}} + (n_P - n_L)v_P \bar{\bar{\sigma}}'_P \quad (287)$$

manifests itself not just in the effective RI of a NP, but in the effective RI of the colloid in a differential volume. Obviously, if all the particles are in random directions then an averaging process over all NPs needs to be undertaken to assess the effective RI as a single NP has insufficient information.

Assuming that $n_P > n_L$ then a wave moving along a trajectory having more high RI material will experience a slower average speed and a higher effective RI. For prolate spheroids, a lightwave moving along the c axis of many particles experiences a greater delay and a higher effective RI. For oblate spheroids, a lightwave moving along the a=b axis (or more generally radial axis) of many NPs experiences a greater delay and a higher effective RI. Thus, Eqs. 286-287 provides a useful way to calculate the RI in a particular direction and is of great utility to the optical scientist.

Forces and Torques on Particles

This section will focus only on the general equations for forces and torques that may be developed by an external field on a particle. In general, these forces and torques may be applied to isotropic, anisotropic, electrically lossless and electrically lossy particles. However, the effects for each type of particle can be different.

Time-Domain Force Equation

Let the position vector r point form the origin of the observer's frame of reference to a point that is midway between the effective positive and negative point charges forming a dipole, then the resulting force on a neutral NP is $$\mathcal{F}(r, t) = q(t-\tau)\varepsilon_{in}\left[r + \frac{d(t-\tau)}{2}, t\right] + \{-q(t-\tau)\}\varepsilon_{in}\left[r - \frac{d(t-\tau)}{2}, t\right] \quad (288)$$

where $\tau$ is a delay that characterizes the amount of time it takes for the charges to respond to the input field $\mathcal{E}_{in}(r, t)$. The expression above may be spatially Taylor expanded to $1^{st}$ order so that $$\mathcal{F}(r, t) = q(t-\tau)\left\{\varepsilon_{in}(r, t) + \nabla\varepsilon_{in}(r, t)\cdot\frac{d(t-\tau)}{2}\right\} - q(t-\tau)\left\{\varepsilon_{in}(r, t) - \nabla\varepsilon_{in}(r, t)\cdot\frac{d(t-\tau)}{2}\right\} \quad (289)$$

and therefore $\mathcal{F}(r, t) = q(t-\tau)d(t-\tau)\cdot\nabla\mathcal{E}_{in}(r, t)$. The time delayed and dipole moment at r is $p_{par}(t-\tau)=q(t-\tau)d(t-\tau)$. Also, to the extent that polarization of particles occurs at different r for different NPs in a colloid the force on a singe NP is then a function of position whereby $$\mathcal{F}_{(r,t)} = p_{par}(r,t-\tau)\cdot\nabla E_{in}(r,t). \quad (290)$$

Time-Domain Torque Equation

The resulting torque on a similarly disposed neutral NP is given in terms of the vector cross product ×, so that $$\mathcal{T}(r, t) = \frac{d(t-\tau)}{2} \times q(t-\tau)\varepsilon_{in}\left[r + \frac{d(t-\tau)}{2}, t\right] + \frac{-d(t-\tau)}{2}\times\{-q(t-\tau)\}\varepsilon_{in}\left[r + \frac{d(t-\tau)}{2}, t\right] \quad (291)$$

which on Taylor expansion, i.e. in a way very similar to that shown above for force, provides the torque as $$\mathcal{T}_{(r,t)} = p_{par}(r,t-\tau)\times\mathcal{E}_{in}(r,t). \quad (292)$$

Properties of the Time-Domain Equations

Based on the last two sections we see that the time-domain master equations for force and torque on a NP are $$\mathcal{F}_{(r,t)} = p_{par}(r,t-\tau)\cdot\nabla\mathcal{E}_{in}(r,t) \quad (293)$$

$$\mathcal{T}_{(r,t)} = p_{par}(r,t-\tau)\times\mathcal{E}_{in}(r,t). \quad (294)$$

These equations tell two important things. First, that a force-based translation of a NP within a fluid requires a non-uniform electric field; second, that torque based orientation of a NP requires an anisotropic NP structure, which ensures that the dipole moment is not in the same direction as the input field $\mathcal{E}_{in}$, otherwise the torque is zero. The anisotropic structure of the NP for orientation may come from NP shape, NP material composition, or both. Thus, a uniform electric field can rotate NPs, but it cannot translate the NP. A non-uniform electric field can both translate and orient a NP. Finally note that particle deformation of soft particles (e.g. emulsions) across a significant range of spheroidal shapes (e.g. from prolate to oblate spheroidal) requires an asymmetric force across the particles to initially change its shape from spherical and then sheer stresses due to torques to change its orientation. This requires a combination of applied fields. Other modes of deformation are possible. To make further progress, a general expression for $p(t-\tau)$ for typical particles of interest is developed in the next two sub-sections.

Frequency-Domain Force Equation

From Eq. 69 we know that there is a direct connection between the dipole moment and the input electric field. Therefore, the induced dipole moment can be written as $$p_{par}(r,t-\tau) = \epsilon_{med} V |\bar{\chi}(\omega)| \mathcal{E}_{in}(r,t-\tau(\omega)) \quad (295)$$

where $\epsilon_{med}$ is the dielectric constant of the medium surrounding the particle and $V$ is the volume of the particle. The induced time lag is $t=\tau(\omega)$ and the amplitude scaling is $|\bar{\chi}|=|\bar{\chi}(\omega)|$. Therefore, from Eq. 293

$$\mathcal{F}_{(r,t)} = \epsilon_{med} V |\bar{\chi}(\omega)| \mathcal{E}_{in}(r,t-\tau(\omega))\cdot\nabla\mathcal{E}_{in}(r,t). \quad (296)$$

However, in each coordinate direction $\sigma\in\{x, y, z\}$ a harmonic electric field has components $$\mathcal{E}_{in,\sigma}(r,t) = E_{in,\sigma}(r)\cos[\omega t - \phi_\sigma] = \cos\omega t[E_\sigma \cos\phi_\sigma] + \sin\omega t[E_\sigma \sin\phi_\sigma] \quad (297)$$

where $E_\sigma=E_\sigma(r, \omega)$ and $\phi_\sigma=\phi_\sigma(r, \omega)$. The components in square brackets are phasor components of $E_\sigma$, therefore $$\mathcal{E}_{in}(r,t) = \cos\omega t\, E_R + \sin\omega t\, E_I \quad (298)$$

where $E_R=\langle E_x \cos\phi_x, E_y \cos\phi_y, E_z \cos\phi_z\rangle$ and similarly it is found that $E_I=\langle E_x \sin\phi_x, E_y \sin\phi_y, E_z \sin\phi_z\rangle$. Therefore, by using Eq. 298

$$\mathcal{E}_{in}(r,t-\tau) = \cos\omega t[E_R \cos\omega\mathcal{T} - E_I \sin\omega\mathcal{T}] + \sin\omega t[E_R \sin\omega\mathcal{T} + E_I \cos\omega\mathcal{T}] \quad (299)$$

and if we identify $\psi(\omega)=\omega\tau(\omega)$ as the time-shift induced-phase then the real and imaginary parts of the electric susceptibility are $\bar{\chi}_R=|K(\omega)|\cos\psi(\omega)$ and $\bar{\chi}_I=|\bar{\chi}(\omega)|\sin\psi(\omega)$. Therefore $$|\bar{\chi}|\mathcal{E}_{in}(r,t-\tau) = [E_R\bar{\chi}_R - E_I\bar{\chi}_I]\cos\omega t + [E_R\bar{\chi}_I + E_I\bar{\chi}_R]\sin\omega t. \quad (300)$$

By utilizing Eq. 298 and 300 in Eq. 296 the instantaneous force on a NP becomes $$\frac{\mathcal{F}(r, t)}{\epsilon_{med}V} = |\chi|\varepsilon_{in}(r, t-\tau)\cdot\nabla\varepsilon_{in}(r, t) \\ = \cos^2\omega t[\chi_R E_R \cdot \nabla E_R - \chi_I E_I \cdot \nabla E_R] + \\ \sin^2\omega t[\chi_I E_R \cdot \nabla E_I + \chi_R E_I \cdot \nabla E_I] + \\ \sin\omega t\cos\omega t[\text{"Don't Care"}] \quad (301)$$

However, the average force is more useful in determining the effects of particle motion. The time average $\langle\cos^2\omega t\rangle = \langle\sin^2\omega t\rangle = 1/2$, however the time average $\langle\sin\omega t\sin\omega t\rangle = 0$. This explains why "Don't Care" is in the third term in Eq. 301. Therefore, we can write $$F = \frac{\epsilon_{med}V}{2} \quad (302)$$

$$[\{(\chi_R E_R)\cdot\nabla E_R + (\chi_R E_I)\cdot\nabla E_I\} + \{(\chi_I E_R)\cdot\nabla E_I - (\chi_I E_I)\cdot\nabla E_R\}]$$

However, if this force is along a eigen symmetry basis of the electric susceptibility then F is just the force $F_1$ along the first eigen basis direction and the complex scalar $\bar{\chi}=\bar{\chi}_R+i\bar{\chi}_I$ is just the first diagonal element in a complex-valued diagonal susceptibility tensor $\bar{\chi}$. Thus, by the principle of superposition of forces it is possible to add together the separate forces $F=F_1+F_2+F_3$ (and associated equations) due to each of the eigen symmetry directions of the electric susceptibility. Each equation is associated with a different diagonal position in the susceptibility tensor. This can subsequently be converted to any desired basis other than the eigen symmetry basis of the electric susceptibility. The general result is $$F = \frac{\epsilon_{med}\mathcal{V}}{2} \left[ \left\{ \left(\bar{\bar{\chi}}_R E_R\right) \cdot \nabla E_R + \left(\bar{\bar{\chi}}_R E_I\right) \cdot \nabla E_I \right\} + \left\{ \left(\bar{\bar{\chi}}_I E_R\right) \cdot \nabla E_I - \left(\bar{\bar{\chi}}_I E_I\right) \cdot \nabla E_R \right\} \right] \quad (303)$$

where $$E_{in} = E_R + i E_I \quad (304)$$

$$\bar{\bar{\chi}} = \bar{\bar{\chi}}_R + i\bar{\bar{\chi}}_I \quad (305)$$

Note that $E_R$ and $E_I$ need not be in the same direction. Of special interest is when they are orthogonal to each other so there is a circulating field. Moreover, in the interest of a compact expression for the force equation it should be noted that by using Eqs. 304 and 305 it is easy to rewrite Eq. 303 as $$F = \frac{\epsilon_{med}\mathcal{V}}{2} \text{Re}[\bar{\bar{\chi}} E_{in} \cdot \nabla E_{in}^*] \quad (306)$$

where Re[•] represents the real part of the expression in brackets and $E_{in}^*$ is the complex conjugate of the electric field intensity.

In the specific case when the susceptibility is a scalar (or if in its diagonal eigen symmetry basis) then in Eq. 302 we can identify $|E_{in}|^2 = E_R \cdot E_R + E_I \cdot E_I$ and noting the form $E_{in} \cdot \nabla E_{in} = \nabla |E_{in}|^2/2$ we obtain $$\left\langle \frac{F(r,t)}{\epsilon_{med}\mathcal{V}} \right\rangle = \frac{1}{2}\left[ \frac{\chi_R}{2}\nabla|E|^2 + \chi_I(E_R \cdot \nabla E_I - E_I \cdot \nabla E_R) \right] \quad (307)$$

However, we can use the identity $\nabla \times (E_I \times E_R) = E_R \cdot \nabla E_I - E_I \cdot \nabla E_R$ for solenoidal fields $\nabla \cdot E_R = \nabla \cdot E_I = 0$, which is the case when no free charges exist within a particle for both a good conductor and a good insulator. The result is the average quasielectrostatic pondermotive force $F = \langle \mathcal{F} \rangle$ on a particle:

$$F = \frac{\epsilon_{med}\mathcal{V}}{2}\left[ \frac{\chi_R}{2}\nabla|E_{in}|^2 + \chi_I \nabla \times (E_I \times E_R) \right]. \quad (308)$$

In the eigen symmetry basis of the electric susceptibility we have then that $$F' = \frac{\epsilon_{med}\mathcal{V}}{2}\left[ \frac{\chi_R'}{2}\nabla|E_{in}|^2 + \chi_I' \nabla \times (E_I' \times E_R') \right]. \quad (309)$$

which can be converted to the observer's frame of reference by $F = \overline{\overline{W}} F' \overline{\overline{W}}^{-1}$. Finally, as was noted earlier, the details of the physical parameters of size, shape, and composition are encapsulated in $\bar{\bar{\chi}}$.

Frequency-Domain Torque Equation

It is possible to leverage the development of the previous section. Therefore, consider Eq. 292 and evaluate it using Eqs 295, 298, 300, 304, and 305 so that the instantaneous torque on a NP becomes $$\frac{\mathcal{T}(r,t)}{\epsilon_{med}\mathcal{V}} = \bar{\bar{\chi}}\varepsilon_{in}(r, t-\tau) \times \varepsilon_{in}(r,t) \quad (310)$$

$$= \cos^2\omega t\left[\left(\bar{\bar{\chi}}_R E_R\right) \times E_R - \left(\bar{\bar{\chi}}_I E_I\right) \times E_R\right] +$$
$$\sin^2\omega t\left[\left(\bar{\bar{\chi}}_I E_R\right) \times E_I + \left(\bar{\bar{\chi}}_R E_I\right) \times E_I\right] +$$
$$\sin\omega t\cos\omega t[\text{"Don't Care"}]$$

which is similar to Eq. 301 for force, but with the dot product into the gradient operator replaced with a vector cross product. Next, we can again exploit the time averages $\langle \cos^2 \omega t \rangle = \langle \sin^2 \omega t \rangle = 1/2$ and $\langle \sin \omega t \sin \omega t \rangle = 0$. Therefore, the time average torque $\langle \mathcal{T} \rangle$ is $$T = \frac{\epsilon_{med}\mathcal{V}}{2} \left[ \left\{ \left(\bar{\bar{\chi}}_R E_R\right) \times E_R + \left(\bar{\bar{\chi}}_R E_I\right) \times E_I \right\} + \left\{ \left(\bar{\bar{\chi}}_I E_R\right) \times E_I - \left(\bar{\bar{\chi}}_I E_I\right) \times E_R \right\} \right] \quad (311)$$

Note that $[\bar{\bar{\chi}}_R E_R] \times E_R \neq \bar{\bar{\chi}}_R [E_R \times E_R] = 0$. Moreover, by using the definitions $E_{in} = E_R + iE_I$ and $\bar{\bar{\chi}} = \bar{\bar{\chi}}_R + i\bar{\bar{\chi}}_I$ then Eq. 311 can be rewritten as $$T = \frac{\epsilon_{med}\mathcal{V}}{2}\text{Re}[\bar{\bar{\chi}} E_{in} \times E_{in}^*] \quad (312)$$

where Re[•] represents the real part of the expression in brackets and $E^*$ is the complex conjugate of the electric field intensity. Note that the real and imaginary parts of the electric field E need not be in the same direction. Therefore, it is possible for the susceptibility to be a scalar as in $\bar{\bar{\chi}} = \bar{\bar{I}}\chi$ and still have a non-zero torque.

Electrorotation Using Quadrature Electric Fields

In this subsection, we consider the case of exciting a particle with quadrature electric fields, i.e. orthogonal fields that are $\pi/2$ radians out of phase. Consider an arbitrary shaped particle. Then from Eq. 69 and Eq. 312 and we have $$T = \frac{1}{2}\text{Re}[p_{par} \times E_{in}^*] \quad (313)$$

$$p_{par} = \epsilon_{med}\mathcal{V}\bar{\bar{\chi}} E_{in} \quad (314)$$

however, in terms of the real and imaginary parts of the electric susceptibility in the eigen symmetry basis $$\bar{\bar{\chi}}' = \bar{\bar{\chi}}'_R + i\bar{\bar{\chi}}'_I. \quad (315)$$

Let's assume that the particle has its center of mass at the origin so that a rotating electric field in the eigen symmetry basis is given by $$E = (E_x \hat{x} \pm iE_y \hat{y}). \quad (316)$$

The induced dipole moment in the eigen symmetry basis is then $$p_{par}' = \epsilon_{med}\mathcal{V}[(\bar{\bar{\chi}}'_R + i\bar{\bar{\chi}}'_I) \cdot (E_x \hat{x} + iE_y \hat{y})] \quad (317)$$

Therefore, we find that the torque is $$T = \frac{\epsilon_{med}\mathcal{V} E_{x'} E_{y'}}{2}[\chi_{I,x'x'} \pm \chi_{I,y'y'}]\hat{z}. \quad (318)$$

So by driving the NPs in quadrature from different orthogonal directions it is possible to induce a torque and pure rotation—this is called the Born-Lortes effect. Moreover, if the phase of the y' component leads by $\pi/2$ over the x' the torque is proportional to $[\bar{\bar{\chi}}_{I,x'x'}+\bar{\bar{\chi}}_{I,y'y'}]$. If the phase of the y' component lags by $\pi/2$ over the x' the torque is proportional to $[\bar{\bar{\chi}}_{I,x'x'}-\bar{\bar{\chi}}_{I,y'y'}]$. It is a straightforward matter to put the torque in terms of the constitutive parameters by using Eq. 192. This effect allows the particle to be rotated continuously about the z'-axis if $E_z=0$. Thus, with this type of rotation it is, in principle, possible to make a time crystal in a fluidic meta-material, with the properties of the crystal varying in time by the rotation of NPs. This is especially easy to see if the particles are non-spherical. Moreover, if the effect is utilized for a short time only it allows reorientation by rotation. Rotation over short times is equivalent to a reorientation process.

Frequency and Phase Selective Particle Orientation

In this section the general equations for determining a NP's stabilityaxis are developed. The starting point for analyzing a NP's stability axis is from Eq. 69 and Eq. 312, whereby $$p_{par} = \epsilon_{med} V \bar{\bar{\chi}} E_{in} \tag{319}$$

$$T = \frac{1}{2}\text{Re}[p_{par} \times E_{in}^*]. \tag{320}$$

Also, the elements of the diagonal form x' are obtained from Eq. 192

$$\chi' \approx \tag{321}$$

$$\frac{K_\infty}{1-\beta M' K_\infty} + \frac{\frac{K_0}{1-\beta M' K_0} - \frac{K_\infty}{1-\beta M' K_\infty}}{1+\xi^2 \tau_{MW}^2 \omega^2} + i\frac{\left[\frac{K_\infty - K_0}{(1-\beta M' K_0)^2}\right]\tau_{MW}\omega}{1+\xi^2 \tau_{MW}^2 \omega^2},$$

where we take $$\chi'_R = \frac{K_\infty}{1-\beta M' K_\infty} + \frac{\frac{K_0}{1-\beta M' K_0} - \frac{K_\infty}{1-\beta M' K_\infty}}{1+\xi^2 \tau_{MW}^2 \omega^2} \tag{322}$$

$$\chi'_I = \frac{\left[\frac{K_\infty - K_0}{(1-\beta M' K_0)^2}\right]\tau_{MW}\omega}{1+\xi^2 \tau_{MW}^2 \omega^2} \tag{323}$$

which comprises factors from Eqs. 193-198

$$\beta = \frac{v_{par}}{v_{max}} \approx \left(\frac{3}{2}\right) v_{par} \tag{324}$$

$$K_0 = \frac{\sigma_{pR} - \sigma_{mR}}{M'\sigma_{pR} + (1-M')\sigma_{mR}} \tag{325}$$

$$K_\infty = \frac{\epsilon_{pR} - \epsilon_{mR}}{M'\epsilon_{pR} + (1-M')\epsilon_{mR}} \tag{326}$$

$$\tau_{MW} = \frac{M'\epsilon_{pR} + (1-M')\epsilon_{mR}}{M'\sigma_{pR} + (1-M')\sigma_{mR}} \tag{327}$$

-continued $$\xi = \frac{1 - K_\infty \beta M'}{1 - K_0 \beta M'} \tag{328}$$

$$\xi \tau_{MW} = \frac{\epsilon_{mR}(1-M'(1-\beta)) + M'(1-\beta)\epsilon_{pR}}{\sigma_{mR}(1-M'(1-\beta)) + M'(1-\beta)\sigma_{pR}}. \tag{329}$$

For example, the eigen symmetry basis of a particle $\bar{\bar{\chi}}'$ is diagonal and the x'-component of the torque can be written in terms of a general field $$E_{in}' = E_x e^{i\phi_{x'}} \hat{x}' + E_y e^{i\phi_{y'}} \hat{y}' + E_z e^{i\phi_{z'}} \hat{z}' \tag{330}$$

$$\bar{\bar{\chi}}' = \bar{\bar{\chi}}'_R + i\bar{\bar{\chi}}'_I \tag{331}$$

We then find the components of the torque in the eigen symmetry basis as $$T_{x'} = \frac{\epsilon_{med}V}{2}E_{y'}E_{z'}\left[(\chi_{Ry'y'}-\chi_{Rz'z'})\cos(\phi_{y'}-\phi_{z'}) - (\chi_{Iy'y'}+\chi_{Iz'z'})\sin(\phi_{y'}-\phi_{z'})\right] \tag{332}$$

$$T_{y'} = \frac{\epsilon_{med}V}{2}E_{z'}E_{x'}\left[(\chi_{Rz'z'}-\chi_{Rx'x'})\cos(\phi_{z'}-\phi_{x'}) - (\chi_{Iz'z'}+\chi_{Ix'x'})\sin(\phi_{z'}-\phi_{x'})\right] \tag{333}$$

$$T_{z'} = \frac{\epsilon_{med}V}{2}E_{x'}E_{y'}\left[(\chi_{Rx'x'}-\chi_{Ry'y'})\cos(\phi_{x'}-\phi_{y'}) - (\chi_{Ix'x'}+\chi_{Iy'y'})\sin(\phi_{x'}-\phi_{y'})\right] \tag{334}$$

However, this is a complicated set of expressions, especially when electric field amplitudes and phases are transformed from the observer's frame of reference to the particle's frame of reference and the appropriate substitutions are made for the real and imaginary parts of the electric susceptibility in terms of the constitutive parameters.

Therefore to make some progress with analysis let us initially assume (assumption A1) that the eigen symmetry basis of the particle is the same as the observer's frame of reference. This means that x=x', y=y', and z=z'. Therefore, the amplitudes and phases of the electric field do not have to be transformed from the observer's frame of reference to the particle's frame of reference. Additionally, let's assume (assumption A2) that the applied electric field comes only from the z-direction, thus $E_x=E_y=0$, and $E_z>0$. This sets all torques identically to zero.

However, we can now assume that a small perturbation to the position of the electric fields is introduced so that in the particle's eigen symmetry basis is not aligned to the electric fields $\delta E_x>0$ and $\delta E_y>0$ (assumption A3), which can be used to examine the stability of the particle and find the stability axes. It is easy to see that $$\delta T_x \approx \tag{335}$$

$$\frac{\epsilon_{med}V}{2}\delta E_y E_z[(\chi_{Ryy}-\chi_{Rzx})\cos(\phi_y-\phi_z) - (\chi_{Iyy}+\chi_{Izz})\sin(\phi_y-\phi_z)]$$

$$\delta T_y \approx \tag{336}$$

$$\frac{\epsilon_{med}V}{2}E_z\delta E_x[(\chi_{Rzz}-\chi_{Rxx})\cos(\phi_z-\phi_x) - (\chi_{Izz}+\chi_{Ixx})\sin(\phi_z-\phi_x)]$$

$$\delta T_z \approx \tag{337}$$

$$\frac{\epsilon_{med}V}{2}\delta E_x\delta E_y[(\chi_{Rxx}-\chi_{Ryy})\cos(\phi_x-\phi_y) - (\chi_{Ixx}+\chi_{Iyy})\sin(\phi_x-\phi_y)]$$

and then assume that the phase differences are all zero (assumption A4) and then note that the second order fields can be set to zero in the usual way so that $$\delta T_x \propto \delta E_y E_z [\bar{\bar{X}}_{Ryy} - \bar{\bar{X}}_{Rzz}] \tag{338}$$

$$\delta T_y \propto E_z \delta E_x [\bar{\bar{X}}_{Rzz} - \bar{\bar{X}}_{Rxx}] \tag{339}$$

$$\delta T_z \propto 0 \tag{340}$$

Next, use Eqs. 322-323 and identify the real and imaginary parts of the electric susceptibility (only the real part is needed in this example analysis)

$$\chi_{Ryy} = \frac{K_{yy,\infty}}{1 - \beta M_{yy} K_{yy,\infty}} + \frac{\frac{K_{yy,0}}{1 - \beta M_{yy} K_{yy,0}} - \frac{K_{yy,\infty}}{1 - \beta M_{yy} K_{yy,\infty}}}{1 + \xi_{yy}^2 \tau_{yy,MW}^2 \omega^2} \tag{341}$$

and $$\chi_{Rzz} = \frac{K_{zz,\infty}}{1 - \beta M_{zz} K_{zz,\infty}} + \frac{\frac{K_{zz,0}}{1 - \beta M_{zz} K_{zz,0}} - \frac{K_{zz,\infty}}{1 - \beta M_{zz} K_{zz,\infty}}}{1 + \xi_{zz}^2 \tau_{zz,MW}^2 \omega^2} \tag{342}$$

and on further use of Eqs. 324-329 we obtain for the differential torques $$\delta T_x \propto \delta E_y E_z \left[ \underbrace{\frac{(M_{zz} - M_{yy})(1-\beta)(\epsilon_{mR} - \epsilon_{pR})}{g[\epsilon_{mR}, \epsilon_{pR}, M_{yy}, \beta] g[\epsilon_{mR}, \epsilon_{pR}, M_{zz}, \beta]}}_{Term\ A1} + \underbrace{\frac{\frac{\epsilon_{mR}\sigma_{pR} - \epsilon_{mR}\sigma_{pR}}{g[\epsilon_{mR}, \epsilon_{pR}, M_{yy}, \beta] g[\sigma_{mR}, \sigma_{pR}, M_{zz}, \beta]}}{1 + \left(\frac{g[\epsilon_{mR}, \epsilon_{pR}, M_{zz}, \beta]}{g[\sigma_{mR}, \sigma_{pR}, M_{zz}, \beta]}\right)^2 \omega^2}}_{Term\ A2} - \underbrace{\frac{\frac{\epsilon_{mR}\sigma_{pR} - \epsilon_{mR}\sigma_{pR}}{g[\epsilon_{mR}, \epsilon_{pR}, M_{yy}, \beta] g[\sigma_{mR}, \sigma_{pR}, M_{zz}, \beta]}}{1 + \left(\frac{g[\epsilon_{mR}, \epsilon_{pR}, M_{zz}, \beta]}{g[\sigma_{mR}, \sigma_{pR}, M_{zz}, \beta]}\right)^2 \omega^2}}_{Term\ A3} \right] \tag{343}$$

and a similar expression for $\delta T_x$, with appropriate exchanges of subscripts, is $$\delta T_y \propto \delta E_y E_z \left[ \underbrace{\frac{(M_{zz} - M_{yy})(1-\beta)(\epsilon_{mR} - \epsilon_{pR})}{g[\epsilon_{mR}, \epsilon_{pR}, M_{yy}, \beta] g[\epsilon_{mR}, \epsilon_{pR}, M_{zz}, \beta]}}_{Term\ B1} + \underbrace{\frac{\frac{\epsilon_{mR}\sigma_{pR} - \epsilon_{mR}\sigma_{pR}}{g[\epsilon_{mR}, \epsilon_{pR}, M_{yy}, \beta] g[\sigma_{mR}, \sigma_{pR}, M_{zz}, \beta]}}{1 + \left(\frac{g[\epsilon_{mR}, \epsilon_{pR}, M_{zz}, \beta]}{g[\sigma_{mR}, \sigma_{pR}, M_{zz}, \beta]}\right)^2 \omega^2}}_{Term\ B2} - \underbrace{\frac{\frac{\epsilon_{mR}\sigma_{pR} - \epsilon_{mR}\sigma_{pR}}{g[\epsilon_{mR}, \epsilon_{pR}, M_{yy}, \beta] g[\sigma_{mR}, \sigma_{pR}, M_{zz}, \beta]}}{1 + \left(\frac{g[\epsilon_{mR}, \epsilon_{pR}, M_{zz}, \beta]}{g[\sigma_{mR}, \sigma_{pR}, M_{zz}, \beta]}\right)^2 \omega^2}}_{Term\ B3} \right] \tag{344}$$

where the auxiliary function g is given by $$g[m, p, M, \beta] = pM(1-\beta) + m(1 - M(1-\beta)). \tag{345}$$

where m represents the medium quantity, p represents the particle quantity, M is the associated depolarization, and β is the compactness parameter. The resulting differential torques of Eqs. 343-344 have certain properties, which are described next.

Let's assume that a NP is a tri-axial spheroid with the principle axis {a, b, c} along the {x', y', z'} axes respectively and therefore also along the {x, y, z} axes respectively by assumption A1. The spheroid has principle lengths 0<a<b<c (assumption A5) so that depolarization factors are $0 < M_{z'z'} < M_{y'y'} < M_{x'x'} < 1$. Therefore, the torque directions along each axis {x', y', z'} are well-defined. Observe that the terms (A1, B1) are independent of the real part of the conductivity of the medium and particle {$\sigma_{mR}$, $\sigma_{pR}$}, but terms (A2, A3, B2, B3) are strong functions of the conductivities as can be seen by inspection according to Eqs. 343-344.

CASE 1: if the colloid is lossless so that the conductivities are zero, then only the terms (A1, B1) survive and these terms are independent of the DEP frequency of excitation ω. Alternately, if the conductivities are not zero, but the frequency of DEP excitation is large (ω→∞) then again only the (A1, B1) terms survive.

In the cases where only terms (A1, B1) survive we have set the initial conditions as $$a \text{ initially along axis } x = x' \tag{346}$$

$$b \text{ initially along axis } y = y' \tag{347}$$

$$c \text{ initially along axis } z = z' \tag{348}$$

$$0 < a < b < c \tag{349}$$

$$0 < M_{zz} < M_{yy} < M_{xx} < 1 \tag{350}$$

$$E_x = 0, E_y = 0, E_z > 0 \tag{351}$$

$$\delta E_x = 0, \delta E_y = 0, \delta E_z > 0 \tag{352}$$

$$\delta T_x \propto \delta E_y E_z (M_{zz} - M_{yy}) = 0 \tag{353}$$

$$\delta T_y \propto E_z \delta E_x (M_{xx} - M_{zz}) = 0 \tag{354}$$

$$\delta T_z = 0. \tag{355}$$

which provides a particle initially devoid of torque applied to it and with a specific orientation. Then a small perturbation of the electric field direction is made so that the electric field points into that region of space where x>0, y>0, and z>0. Then we find that $$E_x > 0, E_y > 0, E_z > 0 \tag{356}$$

$$\delta E_x > 0, \delta E_y > 0, \delta E_z > 0, \tag{357}$$

which results in $$\delta T_x \propto \delta E_y E_z (M_{zz} - M_{yy}) < 0 \quad (358)$$

$$\delta T_y \propto E_z \delta E_x (M_{xx} - M_{zz}) > 0 \quad (359)$$

$$\delta T_z \propto 0. \quad (360)$$

This drives the long axis of the spheroid towards the direction of the electric field. Once the particle aligns with the electric field again then all torques become zero and the system is stable once again. Said another way, the long axis of the prolate spheroid aligns with the direction of the electric field and tends to track the direction of the electric field. If, instead of aligning the long axis of the prolate spheroid with the electric field, a short axis of the field was aligned then initially, the system would have no torques, but as soon as the electric field was slightly redirected then the torques on the particle would be such as to rotate the particle's short axis away from the field and again try to align the particle's long axis with the electric field. A similar analysis for an oblate spheroid (i.e. a coin-like shape with 0<c<a<b) shows that the radial b-axis of an approximately coin-like particle aligns with the direction of the electric field. This is the opposite type of response that is provided from the nearly prolate spheroid.

In summary of case 1, when (1) the permittivity of the particle is greater than that of the surrounding medium and the DEP frequency is high; or if (2) the permittivity of the particle is greater than that of the surrounding medium, the colloid is lossless, and at any DEP frequency; then in both cases torques develop that tend to align the long-axis of each particle towards the direction of the electric field. For completeness, note that the long axis of a NP is also aligned with the electric field at ω=0.

CASE 2: if the colloid is not lossless and not necessarily at a high frequency then all terms (A1, A2, A3, B1, B2, B3) of Eqs. 343-344 survive. Then the total torques become a strong function of the DEP frequency ω and the sign of the torques can change from that discussed in case-1. This means that the stable axis is no longer restricted to the longer axis of the NP as being the stable axis. The reason for this is that each axis of the NP is associated with its own Maxwell-Wigner time constant and there are then multiple transitions where the frequency-dependent terms can change sign and either add to or subtract from the baseline torque of case 1. Moreover, each torque $T_{x'}$, $T_{y'}$ and $T_{z'}$ has a unique frequency where the torques must go to zero. For example, if $\phi_x = \phi_y = \phi_z = 0$ then Eqs. 332-334 become $$T_{x'} = \frac{\epsilon_{med} V}{2} E_{y'} E_{z'} (\chi_{Ry'y'} - \chi_{Rz'z'}) \quad (361)$$

$$T_{y'} = \frac{\epsilon_{med} V}{2} E_{z'} E_{x'} (\chi_{Rz'z'} - \chi_{Rx'x'}) \quad (362)$$

$$T_{z'} = \frac{\epsilon_{med} V}{2} E_{x'} E_{y'} (\chi_{Rx'x'} - \chi_{Ry'y'}) \quad (363)$$

But at equilibrium, the sum of the torques along each coordinate direction must sum to zero. For example the torque $T_x = 0$. Therefore, assuming that $E_y \neq 0$ and $E_z \neq 0$ then $(\bar{\chi}_{Ry'y'} - \bar{\chi}_{Rz'z'}) = 0$. This can be written as $$\left[ \frac{(M_{xx} - M_{zz})(1-\beta)(\epsilon_{mR} - \epsilon_{pR})}{g[\epsilon_{mR}, \epsilon_{pR}, M_{zz}, \beta] g[\epsilon_{mR}, \epsilon_{pR}, M_{xx}, \beta]} + \right. \quad (364)$$

-continued $$\frac{\frac{\epsilon_{mR}\sigma_{pR} - \epsilon_{pR}\sigma_{mR}}{g[\epsilon_{mR}, \epsilon_{pR}, M_{zz}, \beta]g[\sigma_{mR}, \sigma_{pR}, M_{zz}, \beta]}}{1 + \left(\frac{g[\epsilon_{mR}, \epsilon_{pR}, M_{zz}, \beta]}{g[\sigma_{mR}, \sigma_{pR}, M_{zz}, \beta]}\right)^2 \omega^2} -$$

$$\left. \frac{\frac{\epsilon_{mR}\sigma_{pR} - \epsilon_{pR}\sigma_{mR}}{g[\epsilon_{mR}, \epsilon_{pR}, M_{xx}, \beta]g[\sigma_{mR}, \sigma_{pR}, M_{xx}, \beta]}}{1 + \left(\frac{g[\epsilon_{mR}, \epsilon_{pR}, M_{xx}, \beta]}{g[\sigma_{mR}, \sigma_{pR}, M_{xx}, \beta]}\right)^2 \omega^2} \right] = 0$$

which is a biquadratic equation in ω that may have as many as four solutions. Moreover, it can be shown that the condition for a guarantee of frequency dependent change of stability axis in the above example ($\phi_z = \phi_y = \phi_y = 0$) is that at least one of the following relations hold $$\frac{\epsilon_{pR}}{\epsilon_{mR}} < 1 < \frac{\sigma_{pR}}{\sigma_{mR}} \quad (365)$$

$$\frac{\sigma_{pR}}{\sigma_{mR}} < 1 < \frac{\epsilon_{pR}}{\epsilon_{mR}} \quad (366)$$

If neither relation holds then a change of stability axis is not guaranteed, but is still possible. For a triaxial spheroid a well defined stability axis occurs when none of the principle torques $\{T_{x'}, T_{y'}, T_{z'}\}$ have the same sign. For example, $\{T_{x'}<0, T_{y'}>0, T_{z'}>0\}$ has a stable axis, but $\{T_{x'}>0, T_{y'}>0, T_{z'}>0\}$ does not. The four real-valued solutions (if they exist) are generically labeled as $\omega = \omega_{x'}$ here, for which $T_{x'} = 0$. It is possible to select a harmonic DEP frequency so that the torque is non-zero, i.e. immediately above and below $\omega_{x'}$ such that the sign of the torque reverses. Therefore, to control the direction of a particle's orientation about the x' axis simply apply a DEP harmonic electric field that oscillates at a frequency that is above or below $\omega_{x'}$. For example, the torque as a function of frequency $T_{x'}(\omega_{x'}) = 0$, $T_{x'}(\omega_{x'} + \delta\omega_{x'}) > 0$, and $T_{x'}(\omega_{x'} - \delta\omega_{x'}) < 0$. This analysis can be done for each axis of a NP in its eigen symmetry basis. Thus, knowing the zero-torque cross-over frequencies $\{\omega_{x'}, \omega_{y'}, \omega_{z'}\}$ and the stability axes allows the application of electric fields at appropriate frequencies to re-orient particles in a coordinated way.

As the principle of superposition applies it is possible to use several different frequency electric-field excitations simultaneously to induce different torques along each axis separately. In principle, it is therefore possible to adjust a plurality of DEP frequencies so that a NP orientation not aligned with a NP's principle axes becomes the stable axis of the NP.

For the avoidance of doubt, a change in stability axis when there is only one DEP frequency applied means that one of the eigen symmetry basis axis is changed to another of the eigen stability stable axis. Said another way, for the specific case of a triaxial spheroid one of the principle axes of the NP of length {a, b, c} changes to another one of the stable axes {a→b, b→c, c→a, b→a, c→b, a→c}. This behavior is also found in more complex NPs, such as NPs with shells, where there are more degrees of freedom and more transition frequencies.

From the point of view of controlling light, a change in stability axis means the effective RI changes as the optical radiation field sees a new orientation of the NP. Typically, capacitor-like transparent flat-plate electrodes can provide a uniform electric field and then the randomly oriented particles in a colloid between the plates will align to a specific orientation due to a uniform DEP excitation field at a specific frequency. Then the DEP frequency changes and the particles start to orient to a new direction in the uniform field between the plates. This is even true in the case where the particles are aligned with the electric field in an unstable but zero-torque orientation as even a minor perturbation of the particle will send the particle into a reorientation process. This reorientation process can continue until the new stability axis is reached. Alternately, to stop the orientation process before the new stability orientation is reached (1) the DEP electric field can be shut off, (2) the DEP electric field can be changed to a zero-torque crossover frequency $\{\omega_{x'}, \omega_{y'}, \omega_{z'}\}$, (3) the NPs can be locked in place by the breaking action of using DEP translation to increase the compactness $\beta$ (in case the volume fraction) so that dipole screening locks the orientation of each particle in place and (4) the DEP excitation can include additional frequency components so that a non-principle axis of a NP becomes the stable axis.

Method (4) of the prior paragraph has the interesting property that the stable non-principle axis is reached as the steady-state solution of the Fokker-Planck diffusion equation forced by a multi-frequency DEP excitation—see discussion associated with Eq. 379. This is important because it allows a non-synchronous perturbation of parked particles (e.g. NP perturbation by thermal Brownian movements) in a colloid that is energized by a field that can only come from a single unmovable direction in the observer's frame of reference.

For example, a prolate spheroid that is between transparent capacitor plates (having the observer's frame of reference) may be parked in a stable position with its long axis normal to the capacitor plates due to its prior DEP excitations. Thus, it is in a stable orientation having $E_x=0$ and $E_y=0$ and only $E_z \neq 0$. Then a new DEP field is applied (it has a fixed direction in the capacitor-like structure) with the hope of placing the NP in a particular orientation. However, it takes a time delay $\tau_1$ on particle-1 for a suitable nudge by the Brownian movements to start a reorientation of particle-1 with electric field perturbations $E_x=\delta E_{x'}$ and $E_y=\delta E_{y'}$. However, it might take a time delay $\tau_1$ for this to occur for particle-2, $\tau_3$ for particle-3, and so on. Thus, there is no need to be concerned about how long it takes for the initiation of the reorientation process when a steady-state end condition ensures that the desired orientation is achieved. This can be exploited to significantly simplify PSO optical systems in some applications.

Intermediate Summary

In the interest of condensing the material as much as possible the concepts of force, torque, induced dipole moment, electric susceptibility, polarizability, depolarization, and electric susceptibility are brought together below. From Eqs. 306, 312, 71 the equations governing the DEP process are $$F = \frac{\epsilon_{med} V}{2} \text{Re}[\overline{\overline{\chi}} E_{in} \cdot \nabla E_{in}^*] \tag{367}$$

$$T = \frac{\epsilon_{med} V}{2} \text{Re}[\overline{\overline{\chi}} E_{in} \times E_{in}^*] \tag{368}$$

$$\overline{\overline{\chi}} = (N\overline{\overline{\alpha}})[\overline{\overline{I}} - \overline{\overline{M}}(N\overline{\overline{\alpha}})]^{-1} \tag{369}$$

$$N\overline{\overline{\alpha}} = [\overline{\overline{\epsilon}}_{par}\overline{\overline{M}} + \epsilon_{med}(\overline{\overline{I}} - \overline{\overline{M}})]^{-1}(\overline{\overline{\epsilon}}_{par} - \overline{\overline{I}}\epsilon_{med}) \tag{370}$$

and from Eq. 270-273 the equations governing the optical process are $$\langle \overline{\overline{n}} \rangle \approx n_L \overline{\overline{I}} + [\overline{\overline{n}}_P = -n_L \overline{\overline{I}}] \overline{\overline{\sigma}}_P v_P \tag{371}$$

$$\overline{\overline{n}}_P = \overline{\overline{\xi}} \overline{\overline{n}}_P' \overline{\overline{\xi}}^{-1} \tag{372}$$

$$\overline{\overline{\sigma}}_P = \overline{\overline{\xi}} \overline{\overline{\sigma}}_P' \overline{\overline{\xi}}^{-1} \tag{373}$$

$$\overline{\overline{\xi}} = \int \int \overline{\overline{W}}(\theta, \phi) f_T(r, t, \theta, \phi, \omega_j) d\theta d\phi. \tag{374}$$

$$\overline{\overline{\sigma}}_P' = \begin{bmatrix} \frac{1 - M_{P,x'x'}}{1 - M_{L,x'x'}v_L - M_{P,x'x'}v_P} & 0 & 0 \\ 0 & \frac{1 - M_{P,y'y'}}{1 - M_{L,y'y'}v_L - M_{P,y'y'}v_P} & 0 \\ 0 & 0 & \frac{1 - M_{P,z'z'}}{1 - M_{L,x'z'}v_L - M_{P,z'z'}v_P} \end{bmatrix} \tag{375}$$

The next sections connect the forces and torques of DEP to the optical properties of the colloid by means of a diffusion processes.

Forced Translational Diffusion

Up to now we have been focused on the force and torque on a single particle. However, in this section and in the next section, colloids consisting of up to tens of thousands of NPs per cubic micron are considered. For example, if the NPs are spherical with a diameter of 30 nm then upwards of 30,000 NP may be in a cubic micron. More or less particles are possible depending on size, shape, composition, and the results of a forced diffusion process.

Consider a quasi electrostatic process where $E_R$ and $E_I$ are a function of position r, a non-optical excitation frequency $\omega$ derived from electrodes or other sources, and even time t for slow variations when the time is very much larger than $(2\pi/\omega)$. Thus, for a colloid we can write $F=F(r, t, \omega)$ and if the driving electric field has many frequency components then the total force is $\int F(r, t, \omega) d\omega$ and the resulting saturation drift velocity in the viscous liquid is $v(r,t)=\gamma \int F(r, t, \omega) d\omega$, where $\gamma=1/(6\pi\eta b)$ is the intrinsic mobility by Stokes Law and $\eta$ is the dynamic viscosity. The vector particle flux for a DEP process is then $j_{dep}(r, t)=u(r, t)v(r, t)$, where u is the number of particles per unit volume, i.e. particle concentration. Additionally, the thermally induced diffusion flux is $j_{dif}(r,t)=-D\nabla u(r, t)$, where D is the Stokes- Einstein diffusion coefficient. The total particle flux is then $j(r, t)=j_{dep}(r, t)+j_{dif}(r, t)$. The source-free continuity equation $\partial_t u + \nabla \cdot j = 0$ then gives $$\frac{\partial u}{\partial t} - D\nabla^2 u = -\nabla \cdot \left[ u\gamma \int_{-\infty}^{+\infty} F(r, t, \omega) d\omega \right]. \quad (376)$$

This is a Fokker-Planck type integro-differential equation describing forced diffusion. Moreover, as the particle volume fraction is $$\sigma_P(r,t) = \mathcal{V} u(r,t). \quad (377)$$

where $\mathcal{V}$ is the volume of a nanoparticle in an ideal single-sized mono-dispersed colloid.

Then by inserting Eq. 377 into Eq. 376, observing that $v_P = v_0 f_F$, where $f_F = f_F(r, t, \omega)$ is the probability mass function (PDF) for a force process, and $v_0$ is the average homogeneous volume fraction of the NPs in the colloid control volume then we can write the Fokker-Planck equation in terms of the PDF $f_F$. Additionally, in anticipation of extending the results here to torques we can write $\nabla \to \nabla_X$, to remind the reader that this is a translational coordinate system such as (but not limited to) cartesian coordinates $$\frac{\partial f_F}{\partial t} - D_F \nabla_X^2 f_F = -\nabla_X \cdot \left[ f_F \gamma_F \int_{-\infty}^{+\infty} F(r, t, \omega) d\omega \right] \quad (378)$$

where $D_F$ is the diffusion coefficient with a subscript of F to associate it with forced diffusion and similarly for $\gamma_F$. Thus, by controlling $f_F(r, t)$ and translational diffusion the refractive index is also controlled. See for example Eq. 5 of the introduction.

Forced Orientational Diffusion

A similar set of considerations leads to NP rotation and orientation diffusion in a spherical coordinate system, which is represented by $\nabla_\Theta$. Thus, the equation that governs rotational and orientational diffusion is given by $$\frac{\partial f_T}{\partial t} - D_T \nabla_\Theta^2 f_T = -\nabla_\Theta \cdot \left[ f_T \gamma_T \int_{-\infty}^{+\infty} T(r, t, \omega) d\omega \right] \quad (379)$$

where $f_T$ is the PDF for torques and rotational diffusion. See for example Eq. 6. Thus, by controlling $f_T(r, t)$ and orientational diffusion the refractive index is also controlled.

Light Scattering

This section, which focuses on how NP orientation and structure impact light scattering, is developed intuitively. More formal scattering theory is avoided here due to the exceptionally long length of the theoretical development. That said the results presented here can be derived from first principles via Maxwell's equations.

Light only scatters if there is a change in the dielectric constant ($\Delta\epsilon$). Moreover, this scattering might be large or small therefore the relative change in the RI is given by ($\Delta\epsilon/\epsilon_L$) and is the quantity of interest with respect to scattering amplitude. Generalizing to arbitrary NP shape and orientation a tensor $(\Delta\bar{\bar{\epsilon}}/\epsilon) = (\bar{\bar{\epsilon}}_P - \bar{\bar{I}}\epsilon_L)/\epsilon_L$ describes the scattering amplitude, where $\bar{\bar{\epsilon}}_L$ and $\bar{\bar{\epsilon}}_P$ are the liquid and solid NP dielectric constants, and $\bar{\bar{I}}$ is the identity matrix. For example, by using Eq. 268 and assuming that the NPs are isotropic we obtain in the eigen symmetry basis that $$\bar{\bar{\epsilon}}' = \bar{\bar{n}}'\bar{\bar{n}}' \quad (380)$$

$$= n_L^2 \bar{\bar{I}} + 2n_L(n_p - n_L)v_P \bar{\bar{\sigma}}'_P + (n_P - n_L)^2 v_P^2 (\bar{\bar{\sigma}}'_P)^2$$

and then after conversion to the observer's basis by $\bar{\bar{\epsilon}} = \bar{\bar{W}}\bar{\bar{\epsilon}}'\bar{\bar{W}}^{-1}$ we find that $$\frac{\Delta\bar{\bar{\epsilon}}}{\epsilon_L} = 2\left(\frac{n_p - n_L}{n_L}\right)v_P\bar{\bar{\sigma}}_P + \left(\frac{n_p - n_L}{n_L}\right)^2 v_P^2 \bar{\bar{\sigma}}_P^2 \quad (381)$$

$$\approx 2\left(\frac{n_p - n_L}{n_L}\right)v_P\bar{\bar{\sigma}}_P, \quad (382)$$

which varies as a function of space r and time t within the colloid.

Next, consider the phase of a light ray scattered from a NP. The phase of a single-wavelength of light $\lambda_1$ from its source to the NP is $(2\pi r_1/\lambda_1) = k_1 r_1$, where $r_1$ is the distance to the NP from the source. Similarly, $(2\pi r_2/\lambda_2) = k_2 r_2$, is the distance between the NP and observer. Note $\lambda_1$ and $\lambda_2$ may be different due to Doppler shifts from moving particles. Thus, NP translation imparts a phase change from source to NP to observer. If it is assumed that a light source and an observer are equidistant from a colloid control volume and electrically far from the scattering NP then $r = r_1 = r_2 \approx R$ and phase factor of $\text{Exp}[-i(k_2 - k_1) \cdot r']$ are introduced by a volume element of the colloid to the light field. Where $r'$ is the position of the scattering volume element. Assuming an input plane wave of $E_1 = E_1 \hat{m}_1 e^{-i(k_1 \cdot r - \omega_1 t)}$ and an output polarization analyzer in the direction $\hat{m}_2$. Then on applying Huygen's principle and summing over the scattering volume elements using expanding spherical wavelets modified by the induced phase from the local motion of NPs we get $$E_2 = C \underbrace{\frac{E_1 e^{-i(k_2 R - \omega_2 t)}}{4\pi R}}_{\text{Huygen's Prin.}} \int_{vol.} \overbrace{\underbrace{\left[\hat{m}_2 \cdot \frac{\Delta\bar{\bar{\epsilon}}(r', t)}{\epsilon_L} \cdot \hat{m}_1\right]}_{\text{Amplitude by NP Rotation}} \underbrace{e^{-i(k_2 - k_1) \cdot r'}}_{\text{Phase by NP Translation}}}^{\text{Phasor Modification of Spherical Wavelet in } d^3 r'} d^3 r' \quad (383)$$

The proportionality constant C can be shown to be $C = -k_2^2$ by a more rigorous analysis. Therefore the full result for the scattered electric field is rewritten as $$E_2 = -k_2^2 \frac{E_1 e^{-i(k_2 R - \omega_2 t)}}{4\pi R} \hat{m}_2 \cdot \underbrace{\left[\int_{vol.} \frac{\Delta\bar{\bar{\epsilon}}(r', t)}{\epsilon_L} e^{-iq \cdot r'} d^3 r'\right]}_{\text{Fourier Transformation of tensor } \Delta\bar{\bar{\epsilon}}} \cdot \hat{m}_1 \quad (384)$$

where $q = k_2 - k_1$. Also, by way of definition let's define the spatial Fourier Transform of the tensor $\Delta\bar{\bar{\epsilon}}$ and its projections onto $\hat{m}_1$ and $\hat{m}_1$ as $$\delta\bar{\bar{\epsilon}}(q,t) = \int_{vol.} \Delta\bar{\bar{\epsilon}}(r',t) e^{-iq \cdot r'} d^3 r' \quad (385)$$

$$\delta\epsilon_{1,2}(q,t) = \hat{m}_2 \cdot \delta\bar{\bar{\epsilon}}(q,t) \cdot \hat{m}_1 \quad (386)$$

This provides the compact form for the scattered electric field as $$E_2(q, t) = -k_2^2 \frac{E_1 e^{-i(k_2 R - \omega_2 t)}}{4\pi\epsilon_L R} \delta\epsilon_{1,2}(q, t). \tag{387}$$

Thus, the Fourier Transform of the spatial variation of the change in the dielectric constant tensor projected onto the input and output polarizations of each differential element of the colloid map the input electric fields to the output electric fields. Note that the magnitude of $q=k_2-k_1$ may be approximated for the case when Doppler shifts are small so we can write $q \cdot q = k_2^2 - 2k_1 \cdot k_2 + k_1^2 \approx 2k_1^2(1-\cos\theta) = 4k_1^2 \sin^2(\theta/2)$ when Doppler shifts of NPs are small and $k_1 \approx k_2$. Therefore, the Bragg condition for scattering from a random medium becomes $$q = 2k_1 \sin\left[\frac{\theta}{2}\right]. \tag{388}$$

In simple words, the colloid acts as a plurality of ordered scattering arrays that are randomly placed into the control volume.

Finally, the irradiance I at the observer's position is derived by exploiting the Wiener-Khinchin theorem, which states that the expected value of the autocorrelation function $R_{EE}$ of the electric field and the power spectral density $S_{EE}$ are Fourier Transform pairs. In particular, for a wide sense stationary signal $$I(\omega) = \frac{1}{2Z} S_{EE}(\omega) \tag{389}$$

$$S_{EE}(\omega) = \frac{1}{2\pi} \int_{-\infty}^{+\infty} R_{EE}(\tau) e^{-i\omega t} d\omega \tag{390}$$

$$R_{EE}(\tau) = \langle E^*(0) E(\tau) \rangle \tag{391}$$

$$= \lim_{t \to \infty} \frac{1}{T} \int_0^T E^*(t) E(t+\tau) dt$$

$$= \int_{-\infty}^{+\infty} S_{EE}(\omega) e^{+i\omega t} d\omega$$

where $Z = \sqrt{\mu_0/\epsilon_{eff}}$ ohms is the wave impedance. Thus, we see that there exists a scattering process, inclusive with a Bragg condition, Fourier optics kernel, and Huygen's principle via Eq. 387, and that is related to the linear tensor form of the RI and DEP via Eq. 382 and Eqs. 378-379.

Colloids with Memory

A particle that is translated, oriented, and deformed may have inherent memory of its state as it will tend to stay in its final position, orientation, and shape for some time, even under the influence of thermal Brownian movement because the viscosity of the medium may by high-enough to "pin" or "park" the particle into its position, orientation, and shape. This has a capacitor-like effect, where a relaxation of the state occurs over time when the system is not forced otherwise. This property can allow time division multiplexing of electrodes that impress DEP fields. Thus, a pixelated display-like arrangement of electrodes may be able to refresh the state of a thin optical device before the state of a particle has changed very much. Unlike a display that uses capacitance to hold the state of the pixel, the PSO device can use viscosity to perform very much the same function. Also as noted before it is possible to park the orientation of NPs by using a large compactness $\beta$ (via a large volume fraction) and dipole moment shadowing, which also provides a kind of memory.

Ray Trajectories in a Graded Refractive Index

As has been discussed, NP translation, orientation, rotation, and deformation will provide light scattering that is effectively (but not perfectly) the same as having an effective refractive index. In this section a Graded Refractive Index (GRIN) ray tracing is developed and in later sub-sections it is used to develop a general beam-steering and focusing panel.

Consider light that passes through a GRIN medium and write Maxwell's Equations Eqs. 10-16 with no light sources, whereby $$\nabla \times \mathcal{E} = -\mu \frac{\partial \mathcal{H}}{\partial t} \tag{392}$$

$$\nabla \cdot \mathcal{E} = 0 \tag{393}$$

and $$\nabla \times \mathcal{H} = +\epsilon \frac{\partial \mathcal{E}}{\partial t} \tag{394}$$

$$\nabla \cdot \mathcal{H} = 0. \tag{395}$$

Take Eqs. 392-393 and multiply through by $\sqrt{\epsilon/2}$. Also, take Eqs. 394-395 and multiply through by $i\sqrt{\mu/2}$, where $i=\sqrt{-1}$. Then we can add the curl and divergence equations together respectively to obtain $$\nabla \times \left( \frac{\sqrt{\epsilon}\mathcal{E} + i\sqrt{\mu}\mathcal{H}}{\sqrt{2}} \right) = -i\sqrt{\epsilon\mu} \frac{\partial}{\partial t}\left( \frac{\sqrt{\epsilon}\mathcal{E} + i\sqrt{\mu}\mathcal{H}}{\sqrt{2}} \right) \tag{396}$$

and $$\nabla \cdot \left( \frac{\sqrt{\epsilon}\mathcal{E} + i\sqrt{\mu}\mathcal{H}}{\sqrt{2}} \right) = 0, \tag{397}$$

where $\mathcal{E}$ and $\mathcal{H}$ are real-valued functions of space and time. Let us also define the complex vector electromagnetic amplitude as $$\psi = \frac{\sqrt{\epsilon}\mathcal{E} + i\sqrt{\mu}\mathcal{H}}{\sqrt{2}}. \tag{398}$$

and $$\mathcal{E} = \frac{\psi + \psi^*}{\sqrt{2\epsilon}} \tag{399}$$

$$\mathcal{H} = \frac{\psi - \psi^*}{\sqrt{2\epsilon}}, \tag{400}$$

where the asterisk indicates the complex conjugate operation. As a consequence $$\nabla \times \psi = i\sqrt{\epsilon\mu}\frac{\partial \psi}{\partial t} \quad (401)$$

$$\nabla \cdot \psi = 0. \quad (402)$$

However, because of the vector identity $\nabla\cdot(\nabla\times\psi)=0$ there is really only one equation as can be seen by taking the divergence of Eq. 401, therefore $$\nabla \times \psi = \frac{i}{c}\frac{\partial \psi}{\partial t}, \quad (403)$$

where $c=1/\sqrt{\epsilon\mu}$. On rearranging and multiplying through by $\hbar$ and using the fundamental quantum assumption $\Delta\varepsilon=\hbar\omega$ (where $\Delta\varepsilon$ is the change in energy in this context and is not to be confused with the electric field) and since $k=\omega/c$ we obtain $$\left[\frac{\Delta\mathcal{E}}{k}\nabla\times\right]\psi = i\hbar\frac{\partial \psi}{\partial t}, \quad (404)$$

which may be written in terms of an electromagnetic Hamiltonian operator $\hat{\mathcal{H}} = [\Delta E/k\nabla\times]$, which has units of energy, so that we obtain a vector form of Schrödinger's wave equation $$\hat{\mathcal{H}}\psi = i\hbar\frac{\partial \psi}{\partial t}, \quad (405)$$

where $\hat{\mathcal{H}}$ is Hermitian.

Consequently, Maxwell's equations are equivalent to a vector Schrödinger wave equation for wave propagation within a homogenous, isotropic and linear material and we can identify $\psi$ as a vector quantum probability amplitude for photons that also captures the polarization properties (spin angular momentum) of light. As such $\psi$ is subject to being constructed by similar rules as were used to construct the original Schrödinger equations. In particular, we can leverage the rules for combining probability amplitudes for photons and electrons, as developed by the physicist Richard P. Feynman (e.g. see "Quantum Mechanics and Integrals," by Feynman and Hibbs, ISBN: 64-25171) wherein we distill that:

Non-Interfering Paths: The probability amplitudes multiply. This corresponds to a particle traveling along one available path by means of subpath 1 AND subpath 2 AND subpath 3 AND etc., all stacked serially so that the value of the probability amplitude is Exp[i (phase of prob. wave 1)]×Exp[i (phase of prob. wave 2)]×Exp[i (phase of prob. wave 3)] . . . .

Interfering Paths: The probability amplitudes add. This corresponds to a particle traveling along path 1 OR along path 2 OR along path 3 OR etc., all stacked in parallel. The probability is then given by a sum of waves Exp[i (phase of prob. wave 1)]+Exp[i (phase of prob. wave 2)]+ . . .

The total probability of a particle moving along a particular path is then the magnitude square of the total probability amplitude.

With this in mind consider light that has transitioned from a first medium into a colloidal medium at an optical boundary and assume that this light has a phase of $$\phi = k\cdot r - \tilde{\omega}t \quad (406)$$

where k is the vector wavenumber, r is a point in space along the path of the light, $\tilde{\omega}$ is the radian frequency of the light (i.e. not the frequency of the harmonic excitation of electrodes) and t is the time. By Eq. 405 the phase of the electromagnetic wave is also the phase of the corresponding probability amplitude. Therefore, multiply Eq. 406 through by the reduced Planck constant $\hbar$ so that $$\hbar\phi = \hbar k\cdot r - \hbar\tilde{\omega}t \quad (407)$$

and use the fundamental quantum assumptions whereby the energy transition in an atom (or quantum dot etc. . . . ) is $\Delta\varepsilon=\hbar\tilde{\omega}$ and the vector momentum of the light is $p=\hbar k$. On taking the time derivative we then obtain the Legendre transformation $$\hbar\frac{\partial \phi}{\partial t} = p\cdot v - \Delta\mathcal{E}, \quad (408)$$

where v is the velocity. However, for the propagator of the probability amplitude to go from point 1 in space-time to point 2 in space-time along an $m^{th}$ arbitrary path requires $$\psi_{1,2}(m) = C(m)e^{i\frac{d\phi_{1,2}(m)}{dt}\delta t} \quad (409)$$

where $i=\sqrt{-1}$ and C(m) is a vector of proportionality to account for polarization effects on the $m^{th}$ path. To go from point-1 to point-2 to point-3 and so on to point-N we have by the rule for non-interfering paths that $$\psi_{1,N}(m) = C(m)\psi_{1,2}(m)\psi_{2,3}(m)\psi_{3,4}(m)\ldots\psi_{N-1,N}(m) \quad (410)$$

$$= C(m)e^{i\sum\frac{d\phi_{n,n+1}(m)}{dt}\delta t}$$

$$\to C(m)e^{\frac{i}{\hbar}\int_{t_a}^{t_b}(p\cdot v - \Delta\mathcal{E})dt}$$

where C(m) is the vector proportionally constant that is different for each path and polarization. Additionally, we must also consider all possible separate interfering paths along which the photons may also travel, therefore let m take on different values for different spatial paths so that we may write a Feynman path integral for the light path as follows $$\psi = \psi(1) + \psi(2) + \psi(3) + \ldots \quad (411)$$

$$= \lim_{m\to\infty} C\int\ldots\int e^{\frac{i}{\hbar}\int_{t_a}^{t_b}(p\cdot v - \Delta\mathcal{E})dt}dx_1\ldots dx_m\, dy_1\ldots dy_m\, dz_1\ldots dx_m \quad (412)$$

$$= C\int e^{\frac{i}{\hbar}\int_{t_a}^{t_b}(p\cdot v - \Delta\mathcal{E})dt}\mathcal{D}r. \quad (413)$$

Note that the exponential in the above equation takes on a broad range of complex values as the phasor rotates in response to the evolving wave. It can be shown that on a statistical average the phasor sum of the path integral is therefore zero. To avoid this and obtain a non-trivial solution we must require that the exponent is stationary about a specific path in space-time so that variations $\delta$ of the exponential integral must obey $$\delta \int_{t_a}^{t_b} (p \cdot v - \Delta \mathcal{E}) \, dt = 0. \tag{414}$$

or on recognizing that $p = p_0 n \tau$ and $v \, dt = dr = \tau \, ds$ where $\tau$ is the tangent vector to the path of the ray, n is the spatial distribution of the refractive index, ds is the element of arc length and $p_0 = \varepsilon_0/c$ is the quantum of photon momentum with a photon initially having energy $\varepsilon_0$ so that $p \cdot v \, dt = p_0 n \tau \cdot dr = p_0 n \dot{r} \cdot \dot{r} \, ds = p_0 n \, ds$, therefore $$\delta \int_{r_a}^{r_b} n(r) \, ds = c \, \delta \int_{t_a}^{t_b} \frac{\Delta \mathcal{E}}{\varepsilon_0} dt, \tag{415}$$

which we identify as a modified form of Fermat's Principle that can account for the effects of quantum transitions from atoms and colloidal quantum dots. For the simple case when $\Delta \varepsilon = 0$ we recover the usual Fermat's Principle from Eq. 415 so that $$\delta \int_{r_a}^{r_b} n(r) \sqrt{\dot{r} \cdot \dot{r}} \, ds = 0 \tag{416}$$

where $\dot{r} = dr/ds$ and we can identify the Lagrangian as $\mathcal{L} = n(r) \sqrt{\dot{r} \cdot \dot{r}}$ and the variational problem of Eq. 415 is solved by the Euler-Lagrange equations $$\frac{\partial \mathcal{L}}{\partial r} - \frac{d}{ds}\left(\frac{\partial \mathcal{L}}{\partial \dot{r}}\right) = 0. \tag{417}$$

However, $$\frac{\partial \mathcal{L}}{\partial r} = \sqrt{\dot{r} \cdot \dot{r}} \frac{\partial n(r)}{\partial r} = \frac{\partial n(r)}{\partial r} = \nabla n(r) \tag{418}$$

because $\sqrt{\dot{r} \cdot \dot{r}} = 1$. Additionally, $$\frac{\partial \mathcal{L}}{\partial \dot{r}} = n(r) \frac{\partial}{\partial \dot{r}} \sqrt{\dot{r} \cdot \dot{r}} = \frac{n(r)}{\sqrt{\dot{r} \cdot \dot{r}}} \dot{r} \cdot \frac{\partial \dot{r}}{\partial \dot{r}} = n(r) \dot{r} \cdot I = n(r) \dot{r} \tag{419}$$

where I is the identity matrix. We may therefore write Eq. 417 as $$\frac{d}{ds}[n(r) \dot{r}] = \nabla n(r) \tag{420}$$

or $$n(r) \ddot{r} + \dot{n}(r) \dot{r} = \nabla n(r). \tag{421}$$

This equation is extremely useful for deriving the trajectories of rays in a refractive index distribution. Equation 421 is now rewritten as $$\ddot{r} + \left[\frac{\dot{n}}{n(r)}\right] \dot{r} = \frac{\nabla n(r)}{n(r)}, \tag{422}$$

and equivalently as $$\ddot{r} + \frac{d}{ds}[\ln n(r)] \, \dot{r} = \nabla [\ln n(r)]. \tag{423}$$

Next, consider a situation where we specify the trajectory as a circle. While this may be quite restrictive it is a good first approximation for more elaborate ray trajectories, it is easy to parameterize as a function of arch length, and it is practical for engineering applications. Therefore, take the center of the circle at a point $r_0$ in some arbitrary xy-plane then $$r(s) = r_0 + \rho \left\langle \cos\left[2\pi \frac{s}{2\pi\rho}\right], \sin\left[2\pi \frac{s}{2\pi\rho}\right] \right\rangle \tag{424}$$

where s is the arch length and $\rho$ is the radius of curvature of the circle. Then we can easily calculate $\dot{r}$ and $\ddot{r}$ and plug them back into Eq. 423. Next, solve the resulting two equations in two unknowns $\partial_x \ln[n(r)]$ and $\partial_y \ln[n(r)]$ to find that $$\nabla [\ln n(r)] = \frac{-1}{\rho} \left\langle \cos\left[2\pi \frac{s}{2\pi\rho}\right], \sin\left[2\pi \frac{s}{2\pi\rho}\right] \right\rangle \tag{425}$$

which can be dotted into itself to yield the nonlinear partial differential equation $$\left(\frac{\partial \ln n(r)}{\partial x}\right)^2 + \left(\frac{\partial \ln n(r)}{\partial y}\right)^2 = \frac{1}{\rho^2}. \tag{426}$$

Next, form the product solution in the usual way so that $n(r) = n(x, y) = n_0 X(x) Y(y)$, where no is some constant RI.

$$\left(\frac{d \ln X(x)}{dx}\right)^2 + \left(\frac{d \ln Y(y)}{dy}\right)^2 = \frac{1}{\rho^2}. \tag{427}$$

Now, each term is only a function of one variable, and the above sum is a constant. Therefore, each term must be a constant. Therefore, set $$\frac{d \ln X(x)}{dx} = A \tag{428}$$

$$\frac{d \ln Y(y)}{dy} = B \tag{429}$$

and find by simple quadrature that $X(x) = e^{Ax}$ and $Y(y) = e^{By}$ so that the full solution is $$n(x, y) = n_0 e^{Ax + By} \tag{430}$$

$$A^2 + B^2 = \frac{1}{\rho^2}. \tag{431}$$

For example, we can choose $A = \cos \phi / \rho$ and $B = \sin \phi / \rho$ where $\phi$ is the angle of the gradient relative to the x axis, so that $$n(x,y) = n_0 e^{(x \cos \phi + y \sin \phi)/\rho} \tag{432}$$

Thus, there are an infinite number of non-symmetric RI distributions that provide a circular arc trajectory. These trajectories are parameterized by the constants {A, B}. From an engineering point of view, an exponentially increasing RI is not very practical as RI cannot increase forever. However, over a limited spatial extent this can be accomplished easily if the gradient is not too big. In fact, it is quite perfect for DEP induced optics, where at least one of electric fields decay exponentially away from an electrode array to set up a RI that has an exponential character in one direction, and where there is considerable ability to vary the RI by orientation of NPs in an orthogonal direction.

Nota bene, the reader should not get the idea that a constant gradient in one direction is sufficient to provide a ray trajectory that goes around and around in a circle. For example, Eq. 430 can always be written in new coordinates where the gradient is only along the new x axis. The reader should also not get the idea that this principle of ray control is only limited to two dimensions. In general, we can extend the theory developed so far into a third dimension so that $$\left(\frac{d\ln X(x)}{dx}\right)^2 + \left(\frac{d\ln Y(y)}{dy}\right)^2 + \left(\frac{d\ln Z(z)}{dz}\right)^2 = \frac{1}{\rho^2}. \quad (433)$$

with the solution $$n(x, y, z) = n_0 e^{Ax+By+Cz} \quad (434)$$

$$A^2 + B^2 + C^2 = \frac{1}{\rho^2}, \quad (435)$$

which describes a ray trajectory that has a radius of curvature of $\rho$ over a limited circular segment and in a plane. If the direction of the gradient is given in spherical coordinates then $$n(x,y,z) = n_0 e^{(\sin\theta\cos\phi x + \sin\theta\sin\phi y + \cos\theta z)/\rho}. \quad (436)$$

Therefore, it is possible to design different segments of an optical system with different constant gradients so that light is constantly moving along curved trajectories that are not necessarily in the same plane. More specifically, the gradient of the RI from Eq. 430 can be pointed in any direction. For example, let B=0 then A=1/$\rho$ and the gradient is in the x-direction. Alternately, if A=0 then B=1/$\rho$ and the gradient is in the y-direction. Note that (1) the NP volume fraction of $v_P$ decays exponentially away from a planar electrode array and induces a RI gradient that is exponential (just as needed) and that by using the shape fraction tensor $\bar{\sigma}_P{}'$ it is also possible to induce a RI gradient that is exponential (again, just as needed). In practice this is very straight forward and easy to implement. Thus, using different sets of electrodes printed on planar transparent surfaces it is possible to contain a colloid in a region between transparent plates and form circular segment trajectories of the rays and steer the input light to any desired output direction. For the avoidance of doubt, the phrase "circular trajectory" in this paragraph means a portion of a circle, or a circular arc or segment.

The solution for circular ray trajectories provided by Eq. 436 is not unique. There are others. For example, if we were plug into Eq. 427 the $X(x)=e^{-Ax^2}$ and $Y(y)=e^{-Ay^2}$ then $$4A^2(x^2 + y^2) = \frac{1}{\rho^2}, \quad (437)$$

where $(x^2+y^2)=\rho^2$ so that $A=1/(2\rho^2)$ and $$n(x,y) = n_0 e^{(x^2+y^2)/(2\rho^2)} \quad (438)$$

which is easily extended into three dimensions as $$n(x,y,z) = n_0 e^{(x^2+y^2+z^2)/(2\rho^2)}. \quad (439)$$

Equations 436 and 439 provide a very general way to steer light.

That said, in applications where there is an input transparent medium in contact with a GRIN medium the constantly changing RI at the boundary can send initially parallel light rays into many different directions that are not tangent to the desired circular trajectories in the GRIN medium. For example, imagine parallel light rays in a glass medium having a RI of $n_1$, these light rays then impinge on a flat boundary with a GRIN medium having n(x). By Snell's law $n_1 \sin\theta_1 = n(x) \sin\theta(x)$. As can be seen the light just inside of the GRIN medium has an angle $\theta(x)$ that varies as a function of the position along the surface x. It will not help to use a different direction of a gradient, e.g. Eq. 432, because all the ray trajectories in a medium with a linear exponential gradient are circles of the same radius of curvature $\rho$, which is a constant. What is needed is not a constant radius of curvature of the light trajectory, but rather a variable radius of curvature that is matched to the refracted rays at the boundary between the input homogeneous medium and the GRIN medium, and if needed also at the output from the GRIN medium to the external environment where there is again a homogeneous medium. This is accomplished in a subsequent section describing FIG. 8.

The One Degree of Freedom Exponential GRIN

In this section the "circular trajectory" of a RI having the form $$n(r) = n_0 e^{Ax} \quad (440)$$

is considered again. While, in the previous sub-section the trajectory was specified and the RI developed, in this sub-section the RI is specified and the trajectory developed. This will give new insights into the extent of the validity of the exponential RI distribution. In particular, using Eq. 440 in Eq. 423 then provides the following equations $$\dot{u} + Au^2 = A \quad (441)$$

$$\dot{v} + Auv = 0 \quad (442)$$

$$\dot{w} + Auw = 0 \quad (443)$$

where $$\dot{x} = u \quad (444)$$

$$\dot{y} = v \quad (445)$$

$$\dot{z} = w. \quad (446)$$

These equations can be integrated directly from which we obtain $$u(s) = \tanh(As + c_1) \quad (447)$$

$$v(s) = c_2 \text{sech}(As + c_1) \quad (448)$$

$$w(s) = c_3 \text{sech}(As + c_1) \quad (449)$$

$$x(s) = c_4 + \left(\frac{1}{A}\right)\ln[\cosh(As + c_1)] \quad (450)$$

$$y(s) = c_5 + \left(\frac{2c_2}{A}\right)\tan^{-1}\left[\tanh\left(\frac{As + c_1}{2}\right)\right] \quad (451)$$

$$z(s) = c_6 + \left(\frac{2c_3}{A}\right)\tan^{-1}\left[\tanh\left(\frac{As+c_1}{2}\right)\right] \quad (452)$$

where $\{c_1, c_2, c_3, c_4, c_5, c_6\}$ are constants of integration to be determined from the initial conditions of ray position and direction. If at s=0 the direction cosines of the propagation direction are $u_0=\cos\theta_u$, $v_0=\cos\theta_v$, and $w_0=\cos\theta_w$ then $$c_1 = \tanh^{-1}(u_0) \quad (453)$$

$$c_2 = v_0 \cosh(c_1) \quad (454)$$

$$c_3 = w_0 \cosh(c_1) \quad (455)$$

$$c_4 = x_0 - \left(\frac{1}{A}\right)\ln[\cosh(c_1)] \quad (456)$$

$$c_5 = y_0 - \left(\frac{2c_2}{A}\right)\tan^{-1}\left[\tanh\left(\frac{c_1}{2}\right)\right] \quad (457)$$

$$c_6 = z_0 - \left(\frac{2c_3}{\alpha}\right)\tan^{-1}\left[\tanh\left(\frac{c_1}{2}\right)\right]. \quad (458)$$

Note that nowhere in the above equations Eqs. 447-458 does one find the value for the refractive index at a coordinate point as a parameter. Only the spatial rate of change of the refractive index, i.e. through A, is included in the equations. This is an amazing property that allows nearly parallel rays of a laser beam, which have spatial extent via a beam diameter, to continue to track almost in parallel to each other through the GRIN system in the control volume.

Let's consider the special case, which may be generalized, where the initial ray is launched from a position $\langle x_0, y_0, z_0 \rangle$ direction into the z-direction so that $\langle u_0, v_0, w_0 \rangle = \langle 0, 0, 1 \rangle$, then we have that $$c_1 = 0 \quad (459)$$

$$c_2 = 0 \quad (460)$$

$$c_3 = 1 \quad (461)$$

$$c_4 = x_0 \quad (462)$$

$$c_5 = y_0 \quad (463)$$

$$c_6 = z_0 \quad (464)$$

and $$u(s) = \tanh(As) \quad (465)$$

$$v(s) = 0 \quad (466)$$

$$w(s) = \operatorname{sech}(As) \quad (467)$$

$$x(s) = x_0 + \left(\frac{1}{A}\right)\ln[\cosh(As)] \quad (468)$$

$$y(s) = y_0 \quad (469)$$

$$z(s) = z_0 + \left(\frac{2}{A}\right)\tan^{-1}\left[\tanh\left(\frac{As}{2}\right)\right]. \quad (470)$$

In the following analysis we shall obtain a function $z=z(x)$ that describes the ray trajectory. During these algebraic manipulations we will find that the following identities are useful $$\tanh\left(\frac{A}{2}\right) = \frac{\sinh A}{\cosh A + 1} \quad (471)$$

$$\sinh A = \frac{e^A - e^{-A}}{2} \quad (472)$$

$$\cosh A = \frac{e^A + e^{-A}}{2} \quad (473)$$

$$\cosh^2\left(\frac{A}{2}\right) = \frac{\cosh A + 1}{2} \quad (474)$$

$$\tan A = \frac{1}{i}\left(\frac{e^{iA} - e^{-iA}}{e^{iA} + e^{-iA}}\right) \quad (475)$$

$$\tanh A = \frac{e^A - e^{-A}}{e^A + e^{-A}} \quad (476)$$

$$e^{iA} = \cos A + i\sin A \quad (477)$$

$$\cos(2A) = 2\cos^2 A - 1 \quad (478)$$

$$\sin(2A) = 2\sin A \cos A \quad (479)$$

Therefore, we can write from Eq. 468 that $$\cos h(As) = e^{A(x-x_0)} \quad (480)$$

$$\sin h(As) = \sqrt{e^{2A(x-x_0)} - 1} \quad (481)$$

and from Eq. 470 and using Eqs. 471-473 and Eqs. 480-481 we obtain $$\tanh\left[\frac{As}{2}\right] = \tan\left[\frac{A(z-z_0)}{2}\right] = \frac{\sinh(As)}{\cosh(As)+1} = \frac{\sqrt{e^{2A(x-x_0)}-1}}{e^{A(x-x_0)}+1} \quad (482)$$

so that $$e^{2A(x-x_0)} - 1 = \left(e^{A(x-x_0)} + 1\right)^2 \tan^2\left[\frac{A(z-z_0)}{2}\right] \quad (483)$$

and from Eqs. 472-473

$$\sinh[A(x-x_0)] = 2\cosh^2\left[\frac{A(x-x_0)}{2}\right]\tan^2\left[\frac{A(z-z_0)}{2}\right]. \quad (484)$$

Now on using Eq. 474 and Eq. 471 a second time we get $$\tanh\left[\frac{A(x-x_0)}{2}\right] = \tan^2\left[\frac{A(z-z_0)}{2}\right]. \quad (485)$$

The next step is to use Eqs. 475-476 to obtain $$1 - 2e^{iA(z-z_0)}e^{-A(x-x_0)} + e^{2iA(z-z_0)} = 0) \quad (486)$$

and now expanding the terms in $(z-z_0)$ by Euler's identity of Eq. 477, independently setting the real and imaginary parts of the resulting equation to zero to enforce the right hand side of Eq. 486 and using the trigonometric identity of Eq. 478 or Eq. 479, and depending on if one choses to work with the real or imaginary part of Eq. 486 respectively, we always obtain in either case a form of the equation describing the ray's path through the GRIN medium as $$\cos[A(z-z_0)] = e^{-A(z-z_0)}, \quad (487)$$

where the electronically controllable DEP parameter A sets the radius of curvature of a light ray.

Equation 487 is most certainly not a circle. It is in fact a "U" shaped curve with one side having a shape of a near perfect circle and extending with the open end of the "U" pointing in the direction of the gradient vector of the RI. To show that the trajectory is circular over a portion of the total trajectory we first take the derivative of Eq. 487 with respect to x so that $$\frac{d}{dx}\cos[A(z-z_0)] = \frac{d}{dx}e^{-A(x-x_0)} \quad (488)$$

and $$\frac{dz}{dx} = \cot[A(z-z_0)]. \quad (489)$$

Therefore, to make some progress on the shape of the lens to minimize laser beam divergence for long-range accurate and precision beam steering observe that the function $$f(A)=\cos[A(z-z_0)]-e^{-A(x-x_0)}=0 \quad (490)$$

has a Taylor series expansion about A=0 so that $$A(x-x_0) - \frac{A^2}{2}\left[(x-x_0)^2 + (z-z_0)^2\right] + \frac{A^3}{6}(x-x_0)^3 + \ldots = 0. \quad (491)$$

Now take only the terms though second order in A as an approximation and complete the squares. This results in the equation $$(z-z_0)^2 + \left(x-x_0-\frac{1}{A}\right)^2 = \frac{1}{A^2} \quad (492)$$

which is an equation of a circle having a center at $(x_0+1/A, z_0)$ in the xz-plane and a radius of curvature $\rho=1/A$. Thus, it is clear that the circular trajectory is only over part of the total ray trajectory when the ray is not parallel to the gradient vector. This principle is more general than for just the RI distribution investigated in this subsection and is used extensively in the description of the invention.

EMBODIMENTS

The previous section provided the detailed physics underlying Particle Swarm Optics (PSO) in order to teach the reader basic principles of operation. In this section attention is placed on explanations of device components and systems. In particular, this disclosure provides a means to control at least one of position, orientation, and deformation of particles in a liquid medium so that light that scatters off of the particles can be used for practical purposes. These practical purposes include using scattering of light for redirecting light (i.e. focusing, defocusing, reflecting, refracting, diffracting, etc.), attenuating light, amplifying light, changing the spin angular momentum (polarization) and orbital angular momentum of light, and guiding light within light guides and waveguides. By changing the type of NPs used the functional capability can change.

Figure 6:
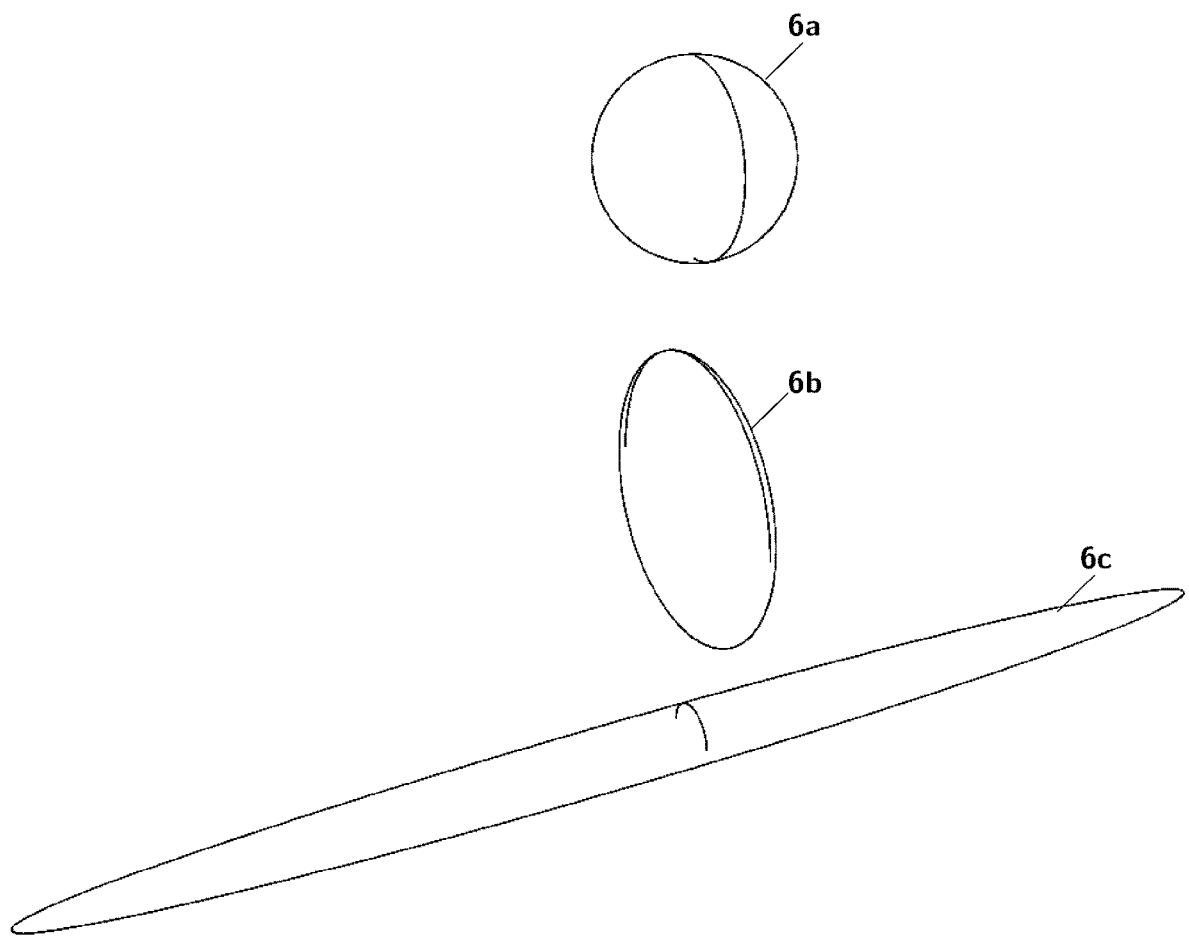
FIG. 6 shows spheroids of the same volume and different shape floating in a colloid to provide different DEP and optical properties.

FIG. 6 shows three representative particles comprising a spherical particle 6a, a oblate spheroidal particle 6b, and a prolate spheroidal particle 6c. The particles are drawn with an identical volume and have the same volume fraction when in isolation in a fixed volume region. If the particles are solid then each particle can be translated and rotated in a liquid medium. If the particles are soft, e.g. an emulsive particle, then it may also be distorted.

There are multiple ways to accomplish translation, rotation, and deformation. That said, this disclosure focuses on dielectrophoresis (DEP), which uses non-uniform electric fields to linearly stretch and translate a particle; and at least one of a non-uniform electric field and a uniform electric field to angularly-stretch, rotate and orientate a particle. For the avoidance of doubt in this document the concept of rotation typically means a continuous angular process and orientation typically means a transient angular process.

The particles of FIG. 6 may be dielectric, metallic, semi-conductors, hydrocarbon polymers, silicone polymers, hybrid materials, hard-materials, soft-materials, quantum dots, plasmonic dots, viruses, multi component Janus particles, non-magnetic, magnetic, diamagentic, paramagnetic, clusters of particles that are distinct yet physically attached to each other, and other types and combinations of particles. Typically, these particles are electrically neutral, though this is not a requirement. One of the great advantages of using DEP is that neutral particles can be controlled—unlike electrophoresis, which requires charged particles.

Figure 7A:
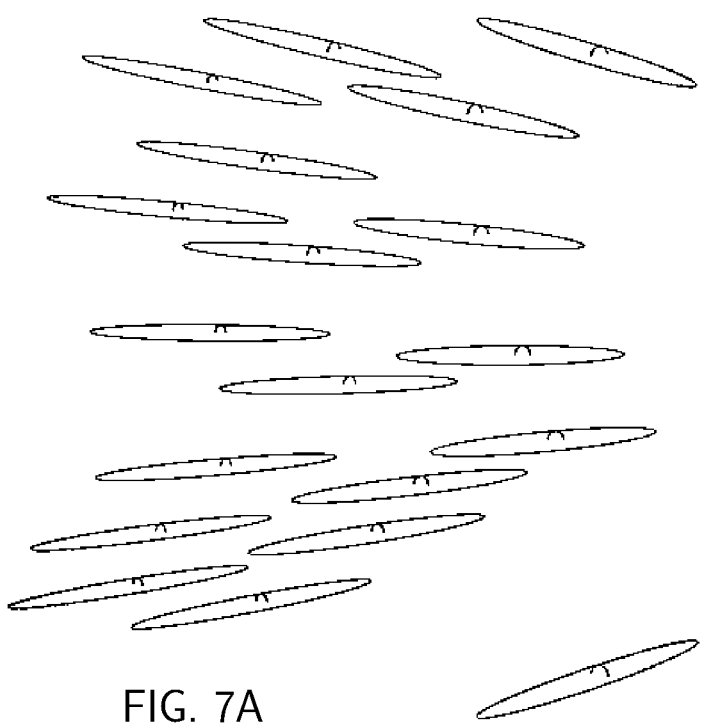
FIG. 7A shows a perspective of a plurality of randomly placed prolate spheroids aligned along their long axis.

The DEP process may be used to control position and orientation of many particles at once. The colloid or suspension may have a mixture of particles of different sizes, shapes, composition, and volume fraction. For example, in FIG. 7A a perspective of a plurality of randomly placed prolate spheroids aligned along their long axis is shown. This same group of particles is then seen from the side in FIG. 7B. Finally, in FIG. 7C the particles are all oriented along the short axis of the particle, which is in the direction normal to the page of the image. These images show that there can be both order and disorder in the orientation and placement of the particles. A similar image can be drawn for oblate spheroids.

Figure 7B:
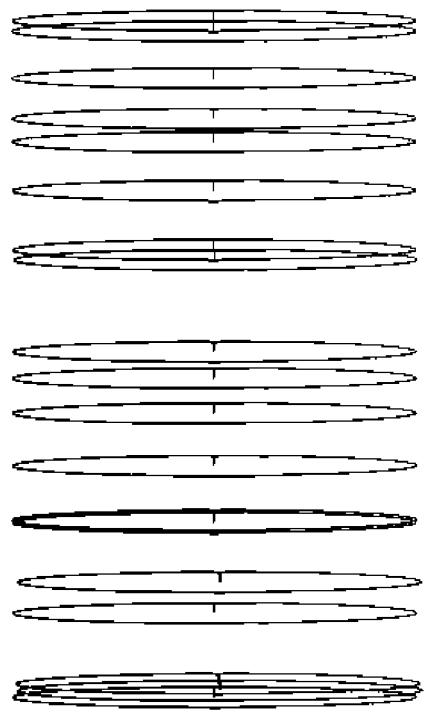
FIG. 7B shows a side view of randomly placed prolate spheroids aligned along their long axis.
Figure 7C:
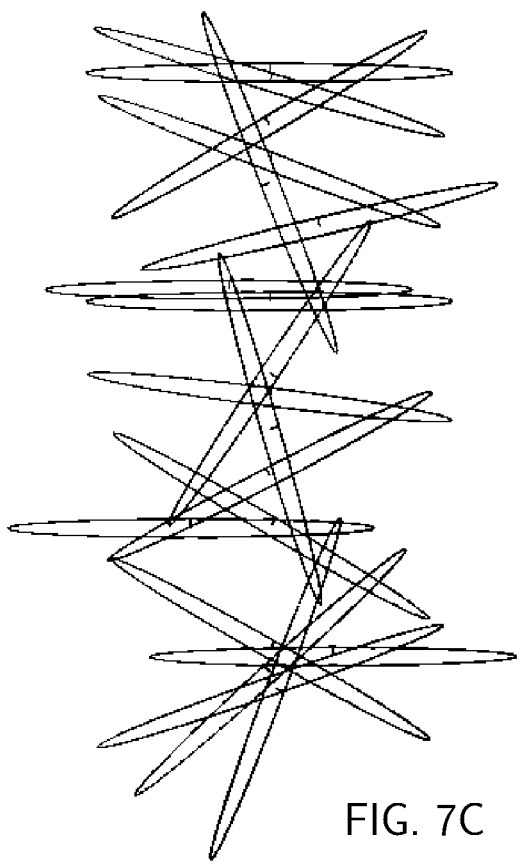
FIG. 7C shows a side view of randomly placed prolate spheroids aligned along their short axis.

In FIG. 7B, light passing from left to right would experience a greater refractive index than light that is propagating normal to the page in the same figure or in FIG. 7C. This was described in Eq. 286 and associated text. For oblate spheroids, light that passes along the coin's long radial direction experiences a greater RI than light that passes normal to the large surface of the oblate spheroid.

Figure 8:
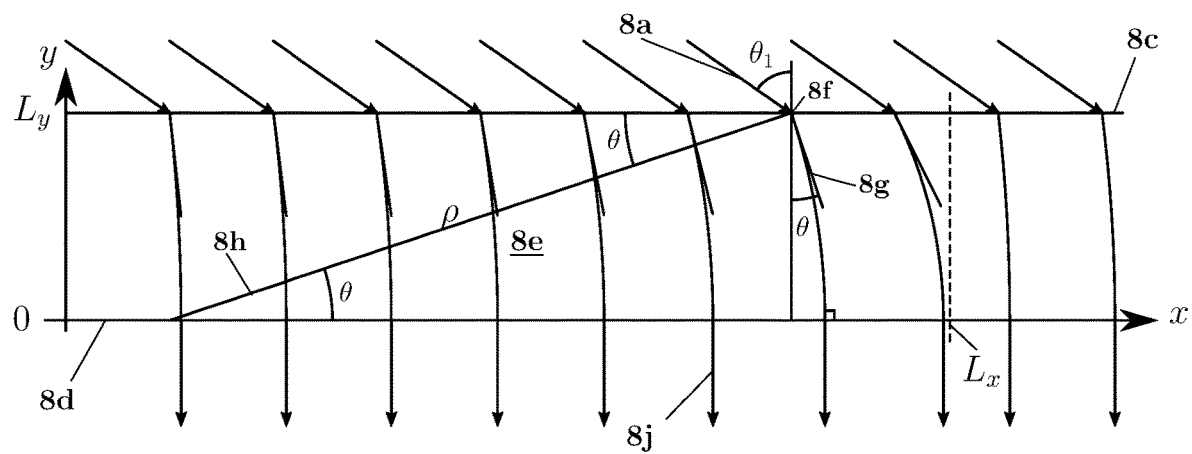
FIG. 8 shows the trajectories of light in a colloid layer that is used to properly match the boundary conditions of light propagating initially in a homogeneous medium and then in a graded refractive index so as to steer the light into a desired direction.

Next, in FIG. 8 it is demonstrated that it is possible to phase match waves in a homogeneous medium and a GRIN medium. In particular, a simple case of transforming light incident at any angle directly downward is considered. This is not possible with conventional refractive optics. In particular, parallel input light rays, such as input ray 8a, in a homogeneous input medium 8b having a RI of $n_1$ are incident on a first boundary 8c at an angle $\theta_1$ to a y-axis. The input rays are propagating in the xy-plane and strike a the first flat boundary at $y=L_y$. Between the first boundary 8c and a second boundary 8d (i.e. at y=0) there is located a controllable colloid 8e that can have its scattering properties and RI adjusted. Below the boundary at y=0 is another homogeneous medium which for simplicity also has a RI of $n_1$. Thus, what is described are two glass regions with parallel surfaces that sandwich a thin colloid layer in a colloid control region. This is the situation for when glass plates with suitable electrodes sandwich a thin colloid layer.

Input ray 8a is refracted at a first point 8f into the controllable colloid 8e. At the first point 8f, which is on the boundary between the input medium 8b and the controllable colloid 8e the RI of the colloid is $n(x, L_y)$, therefore by Snell's law $n_1 \sin \theta_1 = n(x, L_y) \sin \theta(x, L_y)$ where $\theta=\theta(x, L_y)$.

The first refracted ray 8g is perpendicular to the radius of curvature ρ, which shown as 8h. It is easy to see that $$\rho = \frac{L_y}{\sin\theta} = \frac{L_y n(x, L_y)}{n_1 \sin\theta_1} = \frac{L_y X(x) Y(y)}{n_1 \sin\theta_1} \quad (493)$$

Let's now rewrite Eq. 427

$$\left(\frac{d\ln X(x)}{dx}\right)^2 + \underbrace{\left(\frac{d\ln Y(y)}{dy}\right)^2}_{=0} = \frac{1}{\rho^2(x)} = \left(\frac{n_1 \sin\theta_1}{L_y X(x) Y(y)}\right)^2. \quad (494)$$

where it has been assumed that the RI only varies in the x-direction so that Y(y)=1—this is not necessary but it is convenient. Then $$X(x) \frac{d\ln X(x)}{dx} = \pm \frac{n_1 \sin\theta_1}{L_y} \quad (495)$$

which by direct quadrature has a solution $$X(x) = \pm \frac{n_1 \sin\theta_1}{L_y} x + C, \quad (496)$$

where C is the constant of integration. If we define a convention that takes the incident angle $\theta_1$ to the left of the normal as $\theta_1 > 0$ and the incident angle to the right of the normal as $\theta_1 < 0$ then the solution is $$n(x) = -\left(\frac{n_1 \sin\theta_1}{L_y}\right) x + n_{max}, \quad (497)$$

where the maximum RI occurs at x=0. Those familiar with antenna theory will recognize that if we take this equation and multiply through by (2π $L_y/\lambda_0$), where $\lambda_0$ is the free space optical wavelength we find the phase lag ψ in radians $$\psi = -(k_1 \sin\theta_1) x + \psi_{max}. \quad (498)$$

where $\lambda = \lambda_0/n(x)$ and $k_1$ is the wavenumber in the input medium. Thus, while a RI having $n(x) = n_0 e^{-x/\rho}$ allows only one-radius-of-curvature trajectories, in contradistinction the RI of Eq. 497 creates an infinite number of different radius of curvature circles that carry the input light to the second boundary 8d where the rays are all normal to the boundary and therefore easily pass to a homogeneous output medium 8i having output rays, and example of which is 8j. Also, at the dashed line x=$L_x$ the lowest RI available is reached and the RI has to be set to it maximum value $n_{max}$. Thus, the RI is varied in a specific way along the x-direction to create a phase screen that is capable of steering the light.

There are many variations on this idea. A first example, is how to choose the RI distribution to allow steering the light into any direction to maintain parallel rays. A second example is the RI distribution to allow the adding of a conventional mirror at the second boundary 8d to allow for parallel ray steering of light into any direction by controlled reflection. A third example is the use of curved gaps that might be needed in some light steering applications, e.g. a car, boat, aircraft, or spacecraft body having light steering capabilities conformal to its curved surface. A fourth example is providing a RI distribution for focusing. A fifth example is providing a RI distribution for arbitrary wavefront modification, e.g. for adaptive optics for astronomy and other applications. A sixth example is adaptive phase conjugation to allow light to always reflect back to its source independent of surface orientation. A seventh example is beam steering with constraints on uniformity of light flux and étendue considerations. This list is not exhaustive of all possible applications.

In summary, it is seen that different kinds of RI distributions can be created to perform different types of optical functions. These RI distributions may be implemented with a combination of translation, orientation, rotation, and deformation of NPs in DEP controlled colloid. How this is accomplished via a DEP NP orientation process is now described.

Figure 9:
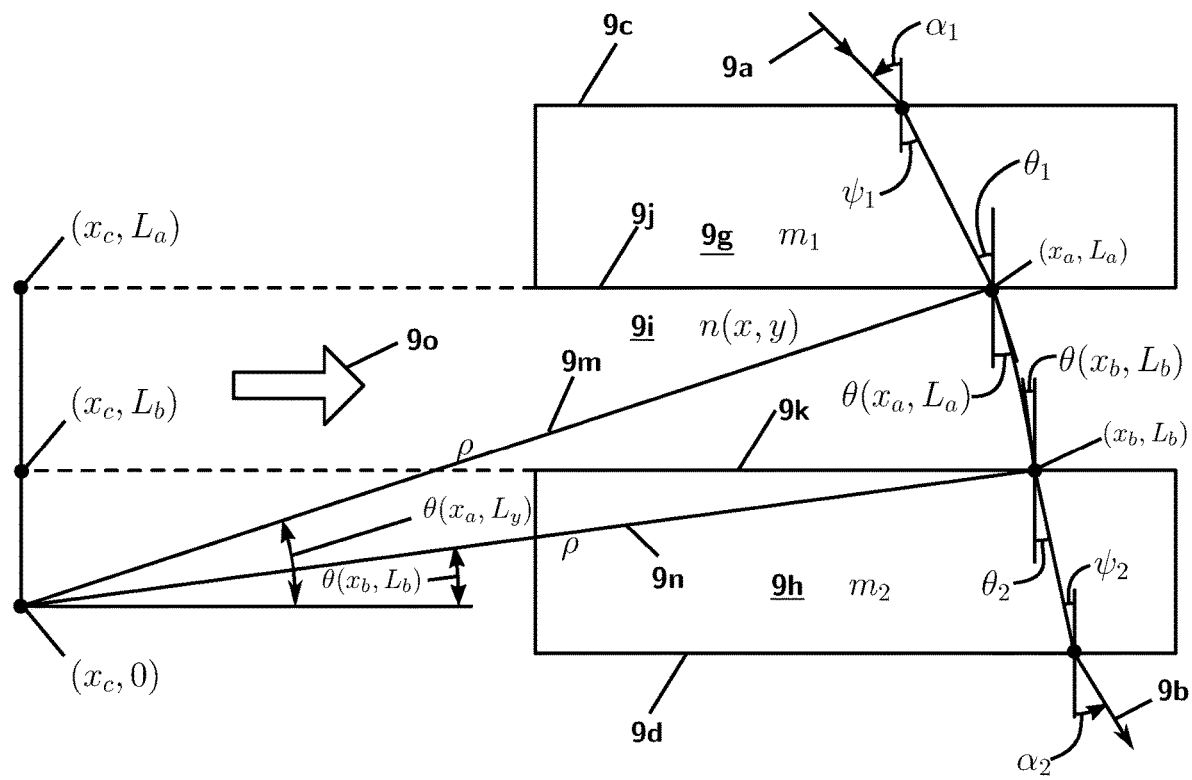
FIG. 9 shows the geometry of a colloid gap, which is formed between two transparent plates, with rays passing through the plates and colloid assuming a positive refractive index gradient and a curved ray trajectory.

In FIG. 9 a slightly more general case of light-beam steering than FIG. 8 is provided. In particular, an input light ray 9a at an input angle $\alpha_1$ is transformed into an output light ray 9b at an output angle $\alpha_2$. The input angle is measured from the normal direction at the input surface 9c and $\alpha_1 > 0$ when measured in the counter clockwise sense from a normal as shown in FIG. 9. Thus, we see that $-\pi/2 \le \mu_1 \le +\pi/2$. Similarly, the output angle is measured from a normal direction at the output surface 9d and $\alpha_2 > 0$ when measured in the counter clockwise sense from the normal. Thus, we see that $-\pi/2 \le \alpha_2 \ge +\pi/2$. The input light ray 9a is in an input medium 9e of refractive index $n_1$. The output ray 9b is in an output medium 9f of refractive index $n_2$.

A first transparent plate 9g of refractive index $m_1$ and a second transparent plate 9h of refractive index $m_2$ sandwich a thin colloid sheet 9i of refractive index n(x, y) located between $0 \le y \le L_a$, which forms a control region for DEP forces, torques, and stresses by DEP processes. The input light ray 9a is refracted at the input surface 9c and subsequently refracts at the colloid input boundary 9j at point ($x_a$, $L_a$) as shown. The ray pass through the colloid sheet 9i on a generally curved trajectory due to a graded refractive index therein and refracts at a colloid output boundary 9k at point ($x_b$, $L_b$) as shown; and then refracts into the second transparent plate 9h and finally refracts at the output surface 9d. Light refracting at a point ($x_a$, $L_a$) has a radius of curvature ρ as depicted by a first radius line 9m. Light refracting at a point ($x_b$, $L_b$) also has a radius of curvature ρ as depicted by a second radius line 9n. A refractive index gradient arrow 90 shows the positive direction of the gradient. The signed quantities $\alpha_1$, $\alpha_2$, and the refractive index gradient arrow 9o are all shown in the positive direction as taken by convention herein. If we take $L_y$ as the thickness of the colloid layer then the following relations hold $$L_y = L_a - L_b = \rho \sin\theta(x_a, L_a) - \rho \sin\theta(x_b, L_b) \quad (499)$$

$$n_1 \sin\alpha_1 = m_1 \sin\psi_1 \quad (500)$$

$$m_1 \sin\psi_1 = n(x_a, L_a) \sin\theta(x_a, L_a) \quad (501)$$

$$m_2 \sin\psi_2 = n(x_b, L_b) \sin\theta(x_b, L_b) \quad (502)$$

Therefore, $$\rho = \frac{L_y}{\sin\theta(x_a, L_a) - \sin\theta(x_b, L_b)} \quad (503)$$

$$= \frac{L_y}{\frac{n_1 \sin\alpha_1}{n(x_a, L_a)} - \frac{n_2 \sin\alpha_2}{n(x_b, L_b)}}. \quad (504)$$

If the refractive index $n(x_a, L_a) \approx n(x_b, L_b) \approx n(x)$ because the gradient in the RI is not too great then $$\rho \approx \frac{L_y n(x)}{n_1 \sin\alpha_1 - n_2 \sin\alpha_2} \quad (505)$$

and we can take $n(x, y) = n(x) = X(x)$ and $Y(y) = 1$ in Eq. 427 then $$\left(\frac{d\ln X(x)}{dx}\right)^2 + \underbrace{\left(\frac{d\ln Y(y)}{dy}\right)^2}_{=0} = \frac{1}{\rho^2(x)} = \left(\frac{n_1 \sin\alpha_1 - n_2 \sin\alpha_2}{L_y X(x)}\right)^2. \quad (506)$$

and by direct quadrature we have that $$n(x) = \left(\frac{n_2 \sin\alpha_2 - n_1 \sin\alpha_1}{L_y}\right) x + n_0 \quad (507)$$

where $n_0$ is the value of the RI at $x=0$. Correction terms to this expression can be developed if the RI gradient is large. Note that if $\alpha_2 = 0$ then we essentially recover Eq. 497. Again, the angles $\alpha_1$ and $\alpha_2$ are positive when measured counterclockwise from the normal on the input and output surfaces. Because RI cannot be constantly increased or decreased there is a corresponding range $0 < x \leq L_x$ where NPs are orientated as needed to produce a desired RI and then reset over and over again as needed so that a large surface can be used to collect and steer light. The RI then varies discontinuously similar to a saw-tooth shape, and it is fully controllable.

Equation 507 says that parallel input ray, e.g. sunlight from the sun, can be steered into any direction desired. Not only in the plane of FIG. 9, but in any direction by using suitable gradients in the RI. Furthermore, the linear RI term for light-beam steering can be combined with a quadratic RI for focusing, and higher order terms are useful for wavefront aberration corrections and adaptive optics applications. Therefore, a PSO system can in general provide a RI change in any direction in the control volume. Some of the RI change may be due to orientation and deformation of NPs and some of the RI change may be due to translation of NPs.

Figure 10A:
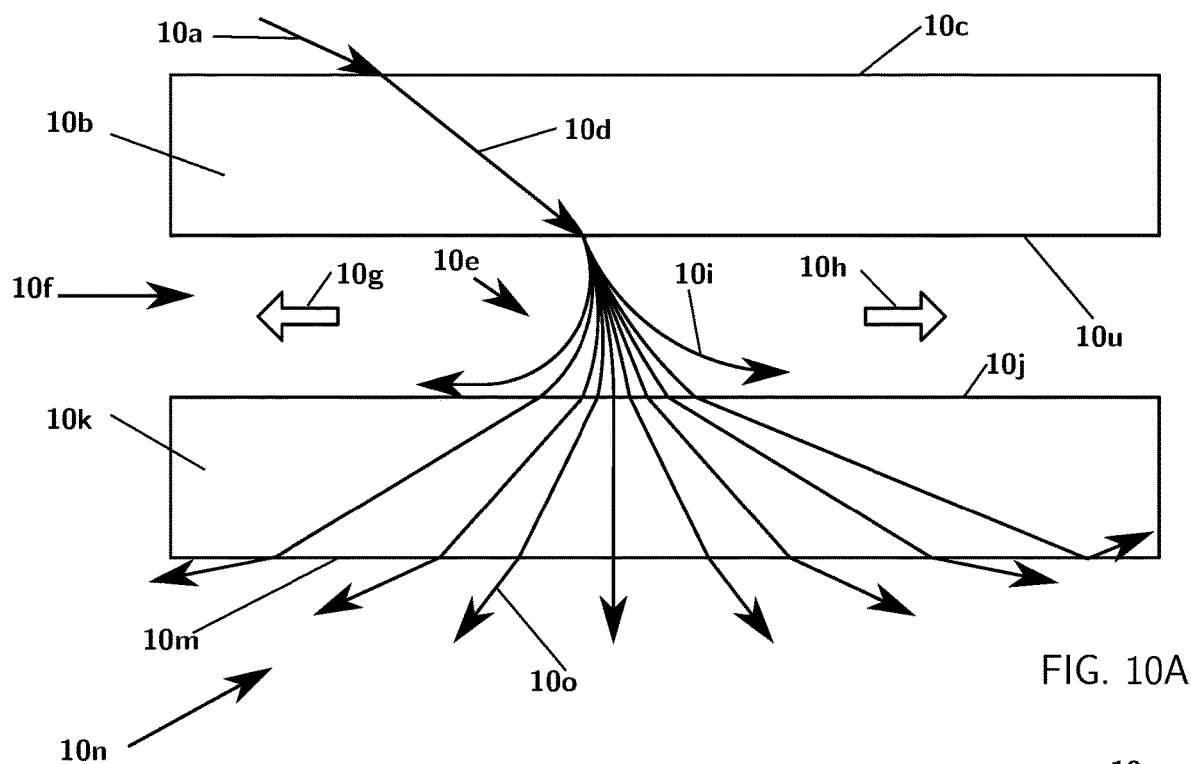
FIG. 10A show in cross section a range of ray behaviors in the presence of refractive index gradients in a thin colloid layer for the case of light-beam steering by transmission through the device.
Figure 10B:
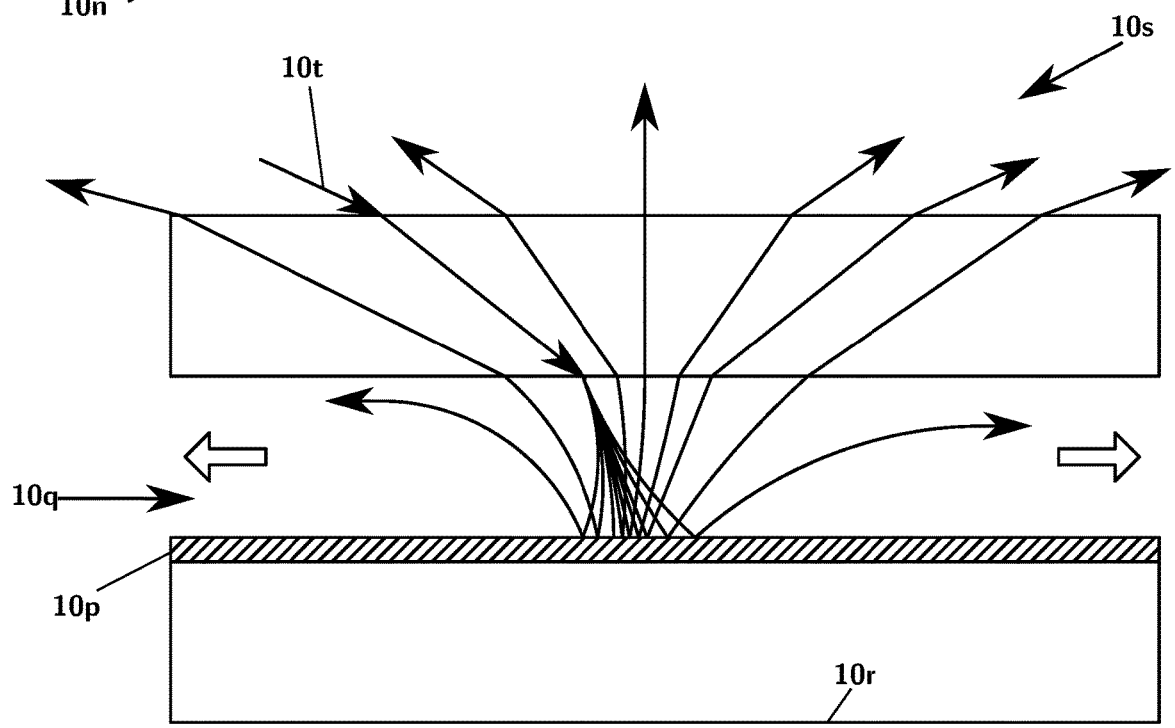
FIG. 10B show in cross section a range of ray behaviors in the presence of refractive index gradients and a mirror in a thin colloid layer for the case of light-beam steering by reflection from the device.

FIGS. 10A-B shows some of the different ways that light can be steered by a colloid controlled by DEP in a thin control volume between two glass plates. Electric field sources are not shown in these figures so the reader can focus on the possible trajectories of a single input ray. For the avoidance of doubt the output rays shown are not occurring at the same time, but are selected by specifying the colloid state by DEP process at a series of times.

FIG. 10A is for light transmission and FIG. 10B is for light reflection. In particular, FIG. 10A shows an input light ray 10a that refracts into a homogeneous and isotropic first transparent plate 10b via an input surface 10c to form a first ray segment 10d, which then is refracted into one curved ray trajectory at colloid input boundary 10u. In general, this allows a continuous and curved ray trajectory group 10e. The process of bending the light occurs in a colloid layer 10f (having thickness as small as roughly 10 μm for visible light) by pulling the light in the direction of a left going RI gradient 10g and a right going RI gradient 10h. If a RI gradient in the colloid is very strong it is even possible to trap some rays such as a first captured ray 10i. Once a curved propagates to a colloid output boundary 10j it is refracted into a second transparent plate 10k and is then again refracted at the output surface 10m. The result is a family of output rays 10n that can cover the full T radians of angular extent. Moreover, this can be extended to a full 47 steradians with additional RI gradients in the colloid layer 10f, which point into or out of the page of FIG. 10A. An example an output ray 10o is provided and it is selected by the particular state of the colloid as induced by the DEP processes for translation, orientation, rotation, and deformation of NPs.

FIG. 10B shows the same system as FIG. 10A except that a dielectric mirror 10p has been added to the bottom of the colloid layer. A mirror (dielectric or metallic) could have been added to the bottom surface 10r as an alternative. The resulting output rays 10s are shown as well as the input ray 10t. So in summary, the direction of an output ray is selected by the RI and its gradient in the colloid layer 10q. Thus, is formed an electronically controllable mirror, where the output reflected light is directed by a DEP process.

In FIG. 11A-H we see how a desired gradient in refractive index (e.g. Eqs. 432 and 497) is implemented using the orientation of particles. This can provide a circular (or parabolic, hyperbolic, etc) trajectory of input light within the colloid as was shown in FIG. 8 and provide linear, parabolic and other types of phase-lag distributions to control broadband light. In FIG. 11A a first transparent plate 11a and a second transparent plate 11b are substantially parallel and separated to form a gap, which is a control volume for a random spheroidal colloid—i.e. either prolate or oblate, but not spherical NPs. This colloid is called the first colloid state 11c. The colloid may have 10,000 NP per cubic micron for control of visible light. This number of NPs is impossible to show in FIG. 11A-H, therefore, the NPs are shown schematically to indicate orientation. Also, for the avoidance of doubt the scale of the NPs relative to all other parts is not to scale.

In one embodiment a plurality of electrodes is placed in or on the transparent plates. This comprises a first electrode array 11d and a second electrode array 11e. The electrode arrays may be pixelated or they may be line electrodes, or arbitrary curves; depending on the application. It is desired to take the initially random state of colloid and organize its individual NPs to create a desired phase-lag distribution via a RI distribution.

In FIG. 11B the system of FIG. 11A is subjected to a substantially high frequency electric field 11f. This creates torques on each randomly orientated NP according to Eqs. 361-363. Assuming that the colloid compactness $\beta$ is not too large there will be a rotational diffusion, as described in Eq. 379. In due course a steady state orientation of each NP is reached with the long axis of each NP orientated along the direction of the electric field as shown in FIG. 11C as a second colloid state 11g. This is due to the use of a very high DEP excitation frequency, which has already described as always aligning the long axis of a NP with the electric field direction. For the avoidance of doubt, the particle is stationary and does not rotate either synchronously or asynchronously with the DEP field during alignment. The main feature of In FIG. 11B is the fields. To avoid clutter in this figure the images of the particles are suppressed. The main feature of In FIG. 11C are the aligned NPs.

Next, in FIG. 11D an asymmetric harmonic electric field 11h is generated between neighboring electrodes as shown. The nonuniform portion of this electric field is substantially located below the surface of the first transparent plate 11a and the second transparent plate 11b. What remains of the harmonic electric field is mostly uniform and capable of aligning NPs by orientation only. The asymmetric electric fields are scanned across the colloid (indicated by the arrows through the electric fields) to form a uniform perturbation angle 11*i* of the NPs and thus create a third colloid state 11*j* as shown in FIG. 11E. With this there are always at least two fields of the set $\{E_{z'}, E_{y'}, E_{z'}\}$ in Eq. 361-363 that are not zero so that at least one torque exists in a uniform and vertically directed electric field. Moreover, unlike a Brownian movement induced angular perturbation of each NP, all the NPs now have the exact same orientation and can be moved in coordinated way from generalized DEP electric fields.

In FIG. 11F each of the electrode elements is allowed to provide pixelated oscillating fields 11*k* using at least one of amplitude variations per pixel, frequency variations per pixel, and time variations per pixel. This provides a different angular orientation of NPs across the colloid and a fourth colloid state 11*m* as shown in FIG. 11G. In FIG. 11H a different region of the colloid is shown and it is easy to see the region of the colloid where the phase abruptly changes due to the limits in the range of the effective RI. This is a fifth colloid state 11*n*. The abrupt change in orientation is equivalent to the line $x=L_x$ in FIG. 8.

Figure 12:
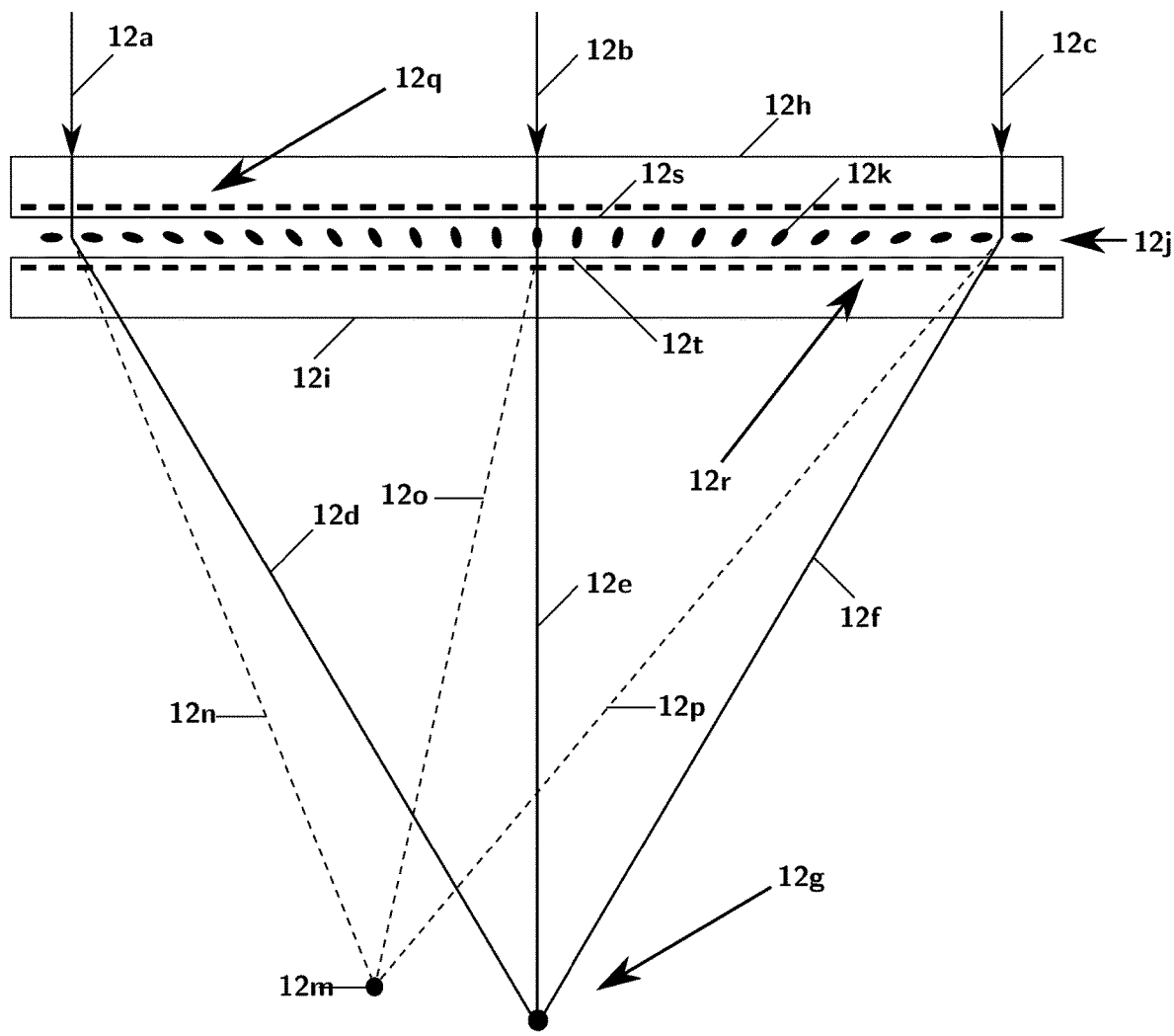
FIG. 12 shows a cross section of an active colloid lens that focuses light that passes through its thin layer based in the induced orientation of nano-particles from dielectrophoresis.

Next, FIG. 12 shows a cross section of an active colloid lens that focuses light that passes through its thin colloid layer based in the induced orientation of nano-particles from dielectrophoresis. This active colloid lens can be millimeters or many meters in diameter depending on the application. For an example light source at infinity relative to the lens the following are the input rays: a first input ray 12*a*, a second input ray 12*b*, and a third input ray 12*c*. The corresponding output rays are a first output ray 12*d*, a second output ray 12*e*, and a third output ray 12*f*. The output rays converge to a first focus region 12*g*.

Between the input and the output rays are two solid transparent media comprising a first transparent solid 12*h* and a second transparent solid 12*i*. Between the first transparent solid and the second transparent solid is a liquid medium with NPs therein. This is called a transparent colloid layer 12*j*, which is contained in a gap providing a control volume that is formed between the first transparent solid 12*h* and the second transparent solid 12*i*. For optical applications the gap formed by the control volume is typically very thin, e.g. 1 µm to µm, though this is not a necessity. The colloid in the gap may include NPs of different sizes, shapes, and composition. However, for the purpose of this example the NPs are at least one of prolate spheroids and oblate spheroids with upwards of 10,000 NPs per cubic micron as an order of magnitude estimation, where each NP has a maximum dimension of about 30 nm for visible light, but can also be other values as needed. The number of particles may be more in quantity or less in quantity as needed for the application and in some cases can range all the way down to zero NPs per cubic micron in some portion of the system. The NPs are chosen to be small enough so that Tyndall scattering is minimized and DEP forces, torques, and stresses are maximized to control the NPs orientation distribution and spatial distribution. The Tyndall scattering is a strong function of the NP size and the dielectric contrast between the liquid and each NP. Therefore, it is possible to make larger NPs with smaller RI contrast compared to the surrounding liquid so that the DEP forces, torques and stresses are larger for quicker dynamic response.

Note that FIG. 12 shows only a schematic representation of the physical components and the ray trajectories. In particular, the transparent colloid layer 12*j* shows large spheroidal NPs along the gap. Note, the figure is physically not to scale, especially the size and number and random placement of NPs shown. That said, the transparent colloid layer 12*j* contains NPs, an example of which is nanoparticle 12*k* that is drawn to be either a prolate spheroid or an oblate spheroid. For both oblate and prolate spheroids the direction of the long axis of the NP is chosen to create a specific RI for the input rays 12*a*, 12*b*, and 12*c* at specific positions, i.e. as indicated by Eq. 286, to affect a concentrating lens. Thus, the transparent colloid layer 12*j* acts like a phase screen that adds specific phase delays to the optical wave. From a ray perspective the phase delay for the second input ray 12*b* is greater than the phase delay for the first input ray 12*a*. In this way the effective optical path length of the combined first input ray 12*a* and the first output ray 12*d* is the same as the combined effective path length of the second input ray 12*b* and the second output ray 12*e*. The effective optical path length of the combined third input and output rays is also the same. The result is that the focus of the lens is at the first focus region 12*g*. If NPs were to rotate or deform into a new configuration then the focus region could be changed to second focus region 12*m* via the fourth output ray 12*n*, fifth output ray 12*o*, and sixth output ray 12*p*. Thus, through a light scattering process in the colloid, the effective RI can be tuned and the direction of propagation of light controlled.

To achieve the dynamic focusing and steering of light the transparent colloid layer 12*j*, which acts like a phase screen to add phase lag along the lens, must transform its effective RI along the lens. This can occur by at least one of NP translation, orientation, and deformation using a DEP process induced by at least one of a first electrode array 12*q* and a second electrode array 12*r*. The electrode array is typically placed in direct contact with the colloid or just past the first control volume wall 12*s* and the second control volume wall 12*t*. The electrodes may include a plurality of discrete electrodes (as shown) or it may be just one large electrode as might be useful for certain applications. For example, an augmented reality display may have 25 micron square pixel elements, while a large concentrating solar array for smelting steel, desalination of water, or electricity generation may have pixel elements that are a square meter and many panels would cover a large area.

Figure 13:
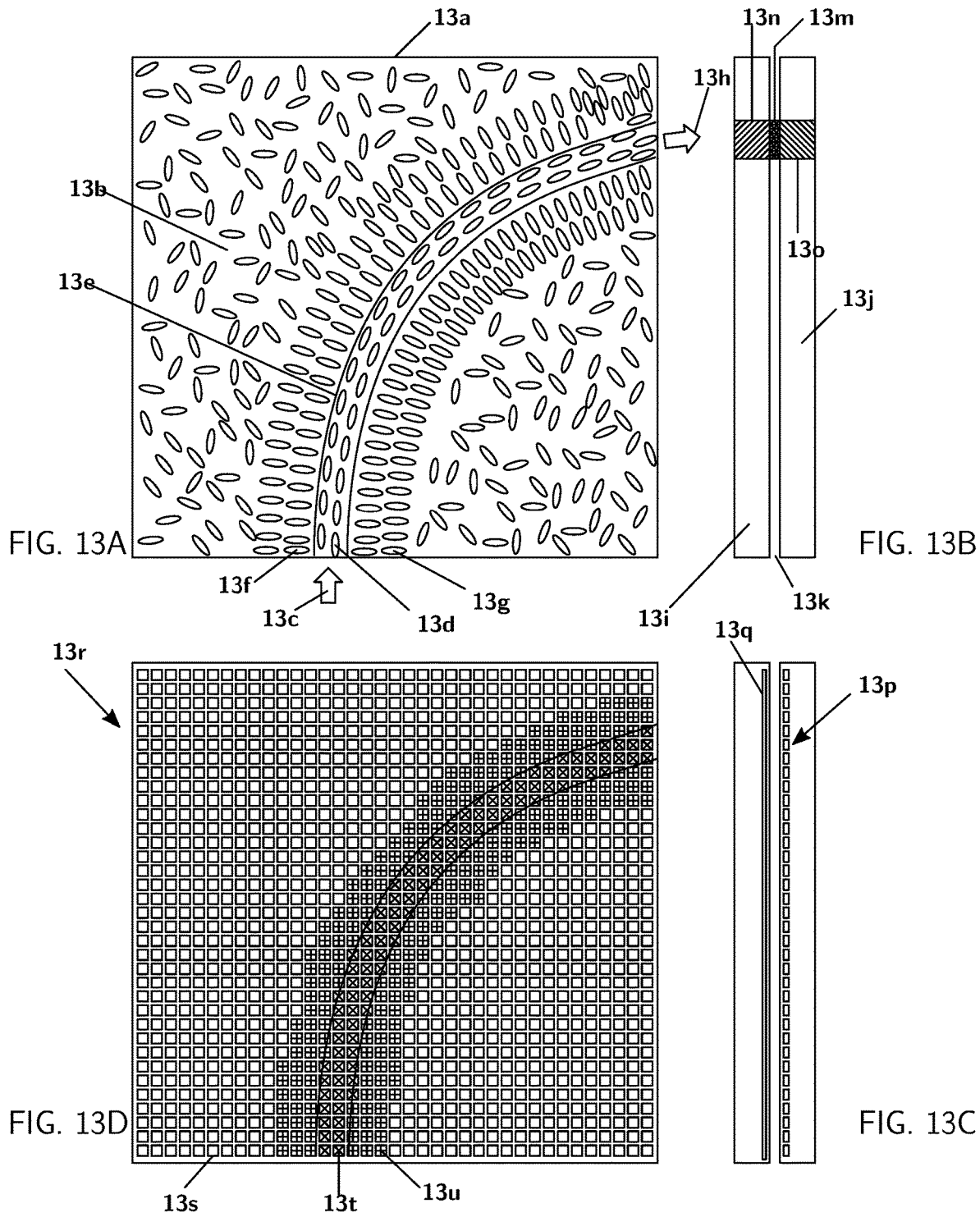
FIG. 13A shows a top view of a reconfigurable waveguide for light.
FIG. 13B shows a cross section view of a reconfigurable waveguide for light.
FIG. 13C shows a top view of the an electro array of a reconfigurable waveguide.
FIG. 13D shows a cross section view of a reconfigurable waveguide electrode array.

FIG. 13A, which is not to scale, shows a top view of a thin optical colloid layer 13*a* where regions of random NP orientation, for example region 13*b*, are interspersed with regions of ordered NP orientation to form a wave guide light. For example, input light 13*c* is launched into a region with high refractive index nanoparticles 13*d*, due to the high RI long-axis of each NP being in the direction of the input light propagation. Also, the curved light path 13*e* is along a region of NPs having a low RI side of the NP facing the propagation direction of the light. For example, a low RI NP is 13*f* is shown on one side of the high refractive index nanoparticles 13*d* and a low RI NP 13*g* is shown on the other side of the high refractive index nanoparticles 13*d*. Thus, the light follows the curved path where the RI is high and exits as output light 13*h*. This is the same principle that a fiber optic works on, i.e. total internal reflection (TIR). Thus, DEP can be used to control a TIR process for guided waves, switching, and other applications.

FIG. 13B shows a side view of FIG. 13A. In particular, a first transparent plate 13*i* and a second transparent plate 13*j* provide a gap that forms a colloid control volume 13*k* where a thin colloid sheet is located. The light exits substantially in one of three regions. A first light output region 13*m* is located within the colloid. A second light output region 13*n* located within the first transparent plate 13*i*. A third light output region 13*o* is located within the second transparent plate 13*j*. The second and third light output regions are outside of the colloid so that only the evanescent electromagnetic fields of the light penetrate into the colloid in the colloid control volume 13k. Thus, if the transparent plates are used as a waveguide then there is minimum scattering with the colloid, but if the light is propagating in the colloid then there is more scattering. Which method is used depends on the application.

FIG. 13C again shows a side view of FIG. 13A. However, now the DEP system is shown comprising transparent electrodes 13p to support time varying voltages that induce electric fields that drive DEP processes, such as translation, orientation, and deformation of NPs. On the opposite side of the electrodes is a conducting transparent ground plane 13q. Each of the electrode pixels can support an independent time varying voltage (with its own frequency, amplitude, and phase) that induces a time varying electric field within the colloid control volume and this provides NP torques, i.e. see for example Eqs. 332-334. So a NP that has an arbitrary orientation in the colloid can align to any specific stability axis based on a plurality of frequencies and amplitudes applied to each pixel.

In FIG. 13D, the top view of the electrode array 13r is shown. Unenergized electrodes, such as 13s, are shown as an empty square. High RI energized electrodes, such as 13t, are shown as squares with an "x" symbol therein. Low RI energized electrodes, such as 13u, are shown as squares with a "+" symbol therein. Finally, it should be noted that electrodes are not a requirement as there is a version of DEP that is without electrodes and uses externally derived from non-local sources fields. This applies to all systems in this disclosure.

Figure 14:
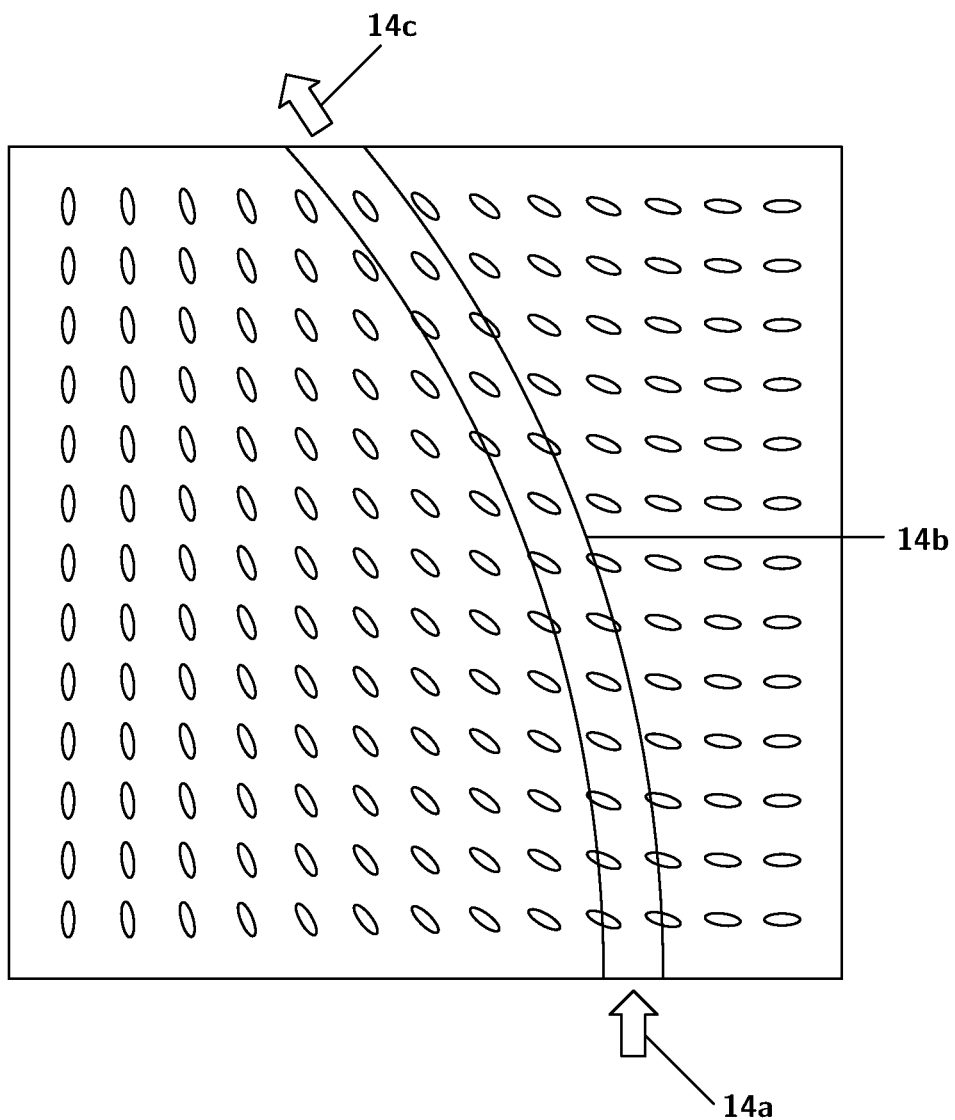
FIG. 14 shows a constant gradient in refractive index as implemented in the orientation of particles and the resulting trajectory of input light along an approximately circular trajectory.

In FIG. 14 a different strategy for bending and steering light is provided. In particular, a linear gradient in the RI will steer light along an approximately circular trajectory. This idea is exploited by rotating the NPs in such a way to induce a gradient from right to left in the page of the image. The resulting input light 14a moves on a curved light trajectory 14b to form output light 14c.

Figure 15:
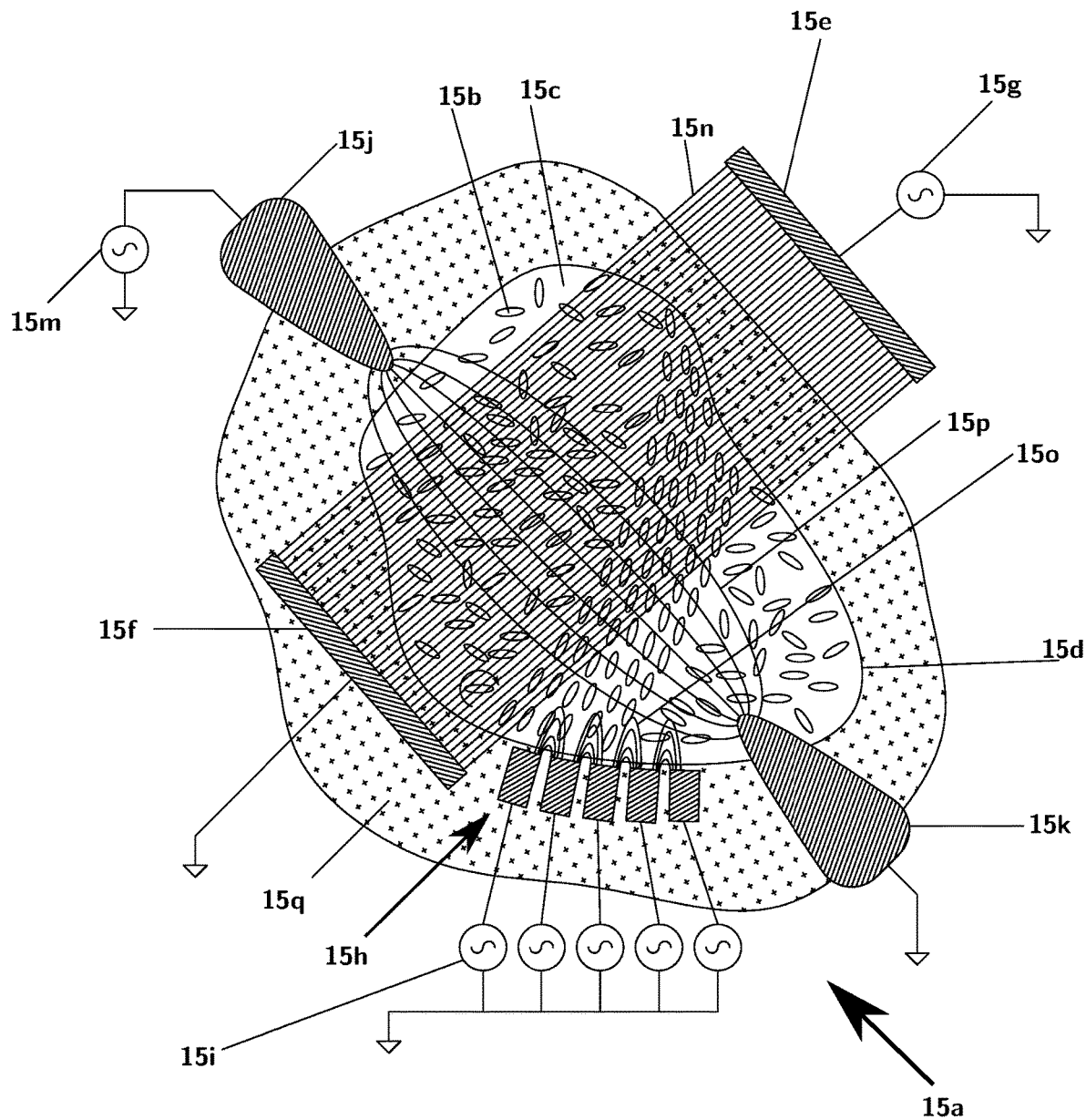
FIG. 15 shows a canonical system comprising electrodes, a control volume, sources of electric fields, and electric fields of different types for implementing dielectrophoresis.
Figure 16:
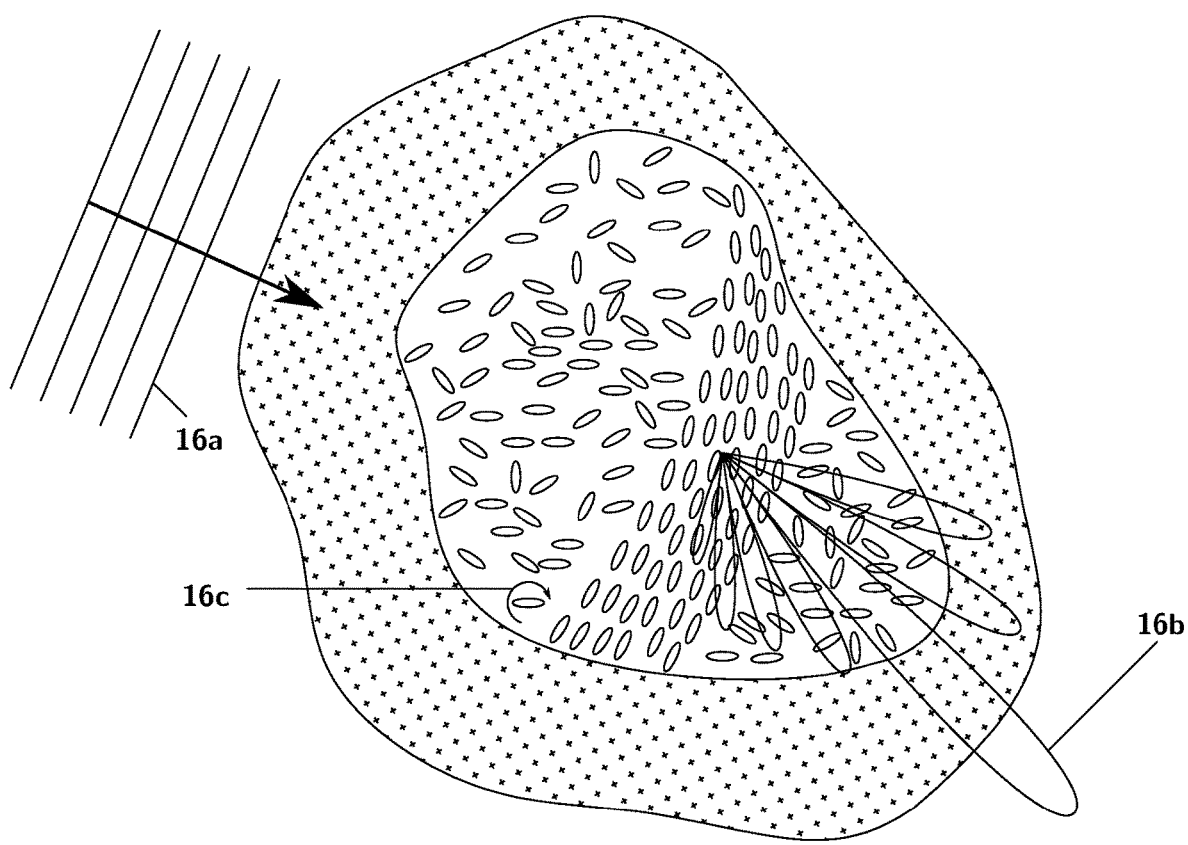
FIG. 16 shows the same canonical system of FIG. 15, but with an emphasis on the particles in the containment volume and the light scattering process.

In FIG. 15 a canonical DEP optical device 15a for scattering input light is shown, including: a plurality of distinct and separate particles, an example of which is 15b, at least one transparent medium 15c where particles can move freely, at least one light scattering control volume 15d, at least one source of electromagnetic fields; such as a uniform source of electric fields comprising a first electrode 15e, a second electrode 15f and a first harmonic voltage source 15g; such as an electrode array 15h having at least one harmonic voltage source 15i; and such as a nonuniform source of electric fields comprising a curved first electrode 15j, a curved second electrode 15k and a harmonic voltage source 15m; which produce uniform electric fields 15n, decaying electric fields 15o and non-uniform electric fields 15p; and additionally at least one transparent solid 15q that forms the control volume and allows light to enter or exit the control volume as needed. The plurality of distinct and separate particles is mixed with the at least one transparent medium to form a substantially transparent non-solid medium, which is a mixture, and where the plurality of distinct and separate particles can flow in the mixture within the at least one light scattering control volume, where there are also electromagnetic fields from the at least one source of electromagnetic fields, so that at least one of forces, torques, and stresses on each of said plurality of particles may exist by means of dielectrophoresis, which allows at least one of the position, orientation, and shape of some portion of said plurality of distinct and separate particles to change by forced diffusion processes so that the optical properties of said mixture can change, so that said input light can interact with said mixture by at least one of traversing the mixture directly and traversing the mixture by evanescent fields at an optical boundary between said mixture and a region external to said at least one light scattering control volume; whereby continuing from FIG. 16 said input light 16a is transformed into output scattered light 16b having different properties including at least one of direction, linear momentum, spin angular momentum, polarization, orbital angular momentum, irradiance, frequency, photon energy, angular spread, power, information content, all by a graded refractive index that is synthesized in both time and space by the rotation, translation, and deformation of a plurality of DEP controllable NPs 16c as needed by controlling the at least one source of electromagnetic fields for DEP processes.

Finally, it should be realized that there are "electrodeless" DEP methods (some references call it eDEP), which use non-metallic means to distribute DEP electric fields instead of metallic electrodes to distribute the DEP electric fields. However, it is equally easy to fabricate patterned metals, dielectrics and semiconductors that direct the DEP electric fields to where they are needed. What is important is not the electrode materials, but rather at least one source of DEP electric fields providing the fields where needed. How the source of DEP electric fields manages to get the DEP fields to the control volume to coordinate the translation, orientation, rotation, and deformation of NPs is really just a detail. Thus, at least one of metallic electrodes, dielectric electrodes, and semiconductor electrodes that are patterning as needed and connected as needed to a source of electric fields is therefore possible and are to be considered as generalized electrodes independent of being metallic, dielectric, semiconductor or any other class of materials.

SPECIFICATION END NOTES

Scope of Invention

First, this disclosure extends the techniques of this author's prior patent application U.S. 2019/0353975, published on 2019 Nov. 21 and entitled, "Agile Light Control by Means of Noise, Impulse, and Harmonic Signal Induced Dielectrophoresis Plus Other Phoretic Forces to Control Optical Shock Waves, Scattering, and the Refractive Index of Colloids; Applications Include: Solar Electricity, Solar Smelting, Solar Desalination, Augmented Reality, LiDAR, 3D-Printing, High-Power Fiber Lasers, Electronic Lenses, Light Beam Steering, Robotic Vision, Sensor Drones, Diffraction-Minimizing Light Beams, Power Beaming, and Software-Configurable Optics." In particular, the above stated prior disclosure was for translation of particles and this disclosure is about extending this to particle orientation, rotation, deformation. This disclosure is also about joint processes such as translation and orientation, translation and deformation of particles.

Second, while the above descriptions in each of the sections contains many specific details for using generalized dielectrophoresis for light control, these details should not be construed as limiting the scope of the invention, but merely providing illustrations of some of the possible methods, physical embodiments and applications. In particular, the present invention is thus not limited to the above theoretical modeling and physical embodiments, but can be changed or modified in various ways on the basis of the general principles of the invention.

Third, every effort was made to provide accurate analysis of the physics as part of teaching the disclosure. Nonetheless, typographical and other errors in equations sometimes make it through reviews. The main features of the invention are described, however not all aspects of the underlying physics are included due to pragmatic constraints of time and page count. Therefore, derivations, individual equations, textural descriptions, and figures should be taken together so that clarity of meaning is ascertained from a body of information even in the event of an unintended error in an equation or other form. Also note that many of the figures in the disclosure are not to scale, but are instead provided to maximize understanding of the underlying concepts. So again the totality of the disclosure is important to consider.

Fourth, the theoretical discussion provided in this disclosure reused some mathematical symbols to mean different things in different locations of the text for historical and pragmatic reasons. The meaning is readily discernible by those skilled in the art when taken in context of the associated descriptions.

Fifth, many potential end-use applications follow from a few physical principles and a few generic embodiments. There are more potential specific applications than can reasonably be discussed and shown in detail with figures.

Sixth, the scope of the invention should in general be determined by the appended claims and their equivalents jointly with the examples, embodiments, and theoretical analysis provided.

Seventh, it should be obvious to those of ordinary skill that while the focus herein is on optics controlled via Dielectrophoresis, this focus may be extended to magnetophoresis, acoustophoresis, chemophoresis, electrophoresis, and other similar modes of particle control.

INDUSTRIAL APPLICABILITY

This invention has applicability for controlling light by controlling scattering from small particles. The control includes optical operations as beam steering and focusing as well as general wavefront modification without significant restrictions due to polarization, direction of input light and direction of output light. Specific applications include, but are not limited to: Light Detection and Ranging (LiDAR), electronically focused camera lenses, robotic visions systems, adaptive automotive headlights, light-art, free-space photonic network configurations for computing, laser machining, laser power beaming to remotely power drones, beamed energy-distribution networks, 3D-printing, topographic mapping, automated inspection, dynamic holograms, remote sensing, point-to-point communications, computer displays, augmented reality displays, virtual reality displays, mixed reality displays, electronic paper, sensor drones, surveying, drought monitoring sensors, aircraft collision avoidance, 5G Light Fidelity (LiFi) networks, drone based structural inspection, very large aperture adjustable-membrane-optics for satellites & astronomy, construction site monitoring, security, laser scanning for bar code readers, optical reflectance switches for telecommunications, solar concentrators, solar power plants, solar desalination plants, solar smelting plants, solar mining, solar radiation control windows, light-beam power combiner, laser systems, laser gyroscopes, laser machining, a manufacturing machine for making graded refractive index devices, software reconfigurable optics, Concentrating Solar Thermal (CST) for intense heat for industrial electricity, steel smelting, desalination, glass, etc. without fossil fuels.

Historical Origin

The historical origin of PSO is Concentrated Solar Power (electricity) and Concentrated Solar Thermal (heat), both being developed by the inventor.

Acknowledgments

The inventor would like to express his sincere thanks and gratitude for the support and extreme patience of his wife Susan and daughter Anora.

REFERENCE SIGNS LIST

6a Spherical Particle 10t Input Ray
6b Oblate Spheroidal Particle 10u Colloid Input Boundary
6c Prolate Spheroidal Particle 11a First Transparent Plate
8a Input Ray 11b Second Transparent Plate
8b Input Medium 11c First Colloid State
8c First Boundary 11d First Electrode Array
8d Second Boundary 11e Second Electrode Array
8e Controllable Colloid 11f High Frequency Electric Field
8f First Point 11g Second Colloid State
8g First Refracted Ray 11h Asymmetric Electric Field
8h Radius Of Curvature 11i Second Colloid State
8i Output Medium 11j Third Colloid State
8j Output Ray 11k Pixelated Oscillating Fields
9a Input Light Ray 11m Fourth Colloid State
9b Output Light Ray 11n Fifth Colloid State
9c Input Surface 12a First Input Ray
9d Output Surface 12b Second Input Ray
9e Input Medium 12c Third Input Ray
9f Input Medium 12d First Output Ray
9g First Transparent Plate 12e Second Output Ray
9h Second Transparent Plate 12f Third Output Ray
9i Colloid Sheet 12g First Focus Region
9j Colloid Input Boundary 12h First Transparent Solid
9k Colloid Input Boundary 12i Second Transparent Solid
9m First Radius Line 12j Transparent Colloid Layer
9n Second Radius Line 12k Nanoparticle
9o Refractive Index Gradient Arrow 12m Second Focus Region
10a Input Light Ray 12n Fourth Output Ray
10b First Transparent Plate 12o Fifth Output Ray
10c Input Surface 12p Sixth Output Ray
10d First Ray Segment 12q First Electrode Array
10e Curved Ray Trajectory Group 12r Second Electrode Array
10f Colloid Layer 12s First Control Volume Wall
10g Left Going RI Gradient 12t Second Control Volume Wall
10h Right Going RI Gradient 13a Top View of Colloid Layer
10i First Captured Ray 13b Random NP Region
10j Colloid Output Boundary 13c Input Light
10k Second Transparent Plate 13d High RI Nanoparticle
10m Output Surface 13e Curved Light Path
10n Family of Output Rays 13f Low RI NP
10o Example Output Ray 13g Low RI NP
10p Dielectric Mirror 13h Output Light
10q Colloid Layer 13i First Transparent Plate
10r Bottom Surface 13j Second Transparent Plate
10s Output Rays 13k Colloid Control Volume
13m First Light Output Region 15e First Electrode
13n Second Light Output Region 15f Second Electrode 13*o* Second Light Output Region 15*g* First Harmonic Voltage Source
13*p* Transparent Electrodes 15*h* Electrode Array
13*q* Transparent Ground Plane 15*i* At Least One Harmonic Voltage Source
13*r* Top View of Electrode Array 15*j* Curved First Electrode
13*s* Unenergized Electrode 15*k* Curved Second Electrode
13*t* High RI Energized Electrode 15*m* Harmonic Voltage Source
13*u* High RI Energized Electrode 15*n* Uniform Electric Fields
14*a* Input Light 15*o* Decaying Electric Fields
14*b* Curved Light Trajectory 15*p* Non-uniform Electric Fields
14*c* Output Light 15*q* Transparent solid
15*a* Canonical DEP Optical Device 16*a* Input Light
15*b* Particles 16*b* Output Scattered Light
15*c* Medium 16*c* Controllable Nanoparticle
15*d* Light Scattering Control Volume

The invention claimed is:

1. An apparatus comprising: a dielectrophoresis-based device configured to optically modify an input light field, the dielectrophoresis-based device comprises;
   (a) a plurality of distinct and separate particles;
   (b) at least one transparent medium;
   (c) at least one light scattering control volume;
   (d) at least one source of electromagnetic fields separate and distinct from the input light field;
   wherein said plurality of distinct and separate particles is mixed with said at least one transparent medium to form a substantially transparent non-solid medium, which is a mixture, and where said plurality of distinct and separate particles can distribute in said mixture within said at least one light scattering control volume, where there are also electromagnetic fields from said at least one source of electromagnetic fields, so that at least one of a particle force, a particle torque, and a particle stress on each of said plurality of distinct and separate particles may exist by means of generalized dielectrophoresis, which allows for a selective determination of at least one of a particle position, a particle orientation, and a particle shape of some portion of said plurality of distinct and separate particles to change by forced diffusion processes, using a function of harmonic field strength and frequency, wherein particles exhibit a nontrivial steady-state orientation, which can be determined as non-parallel to the electric field lines; an input light field interacts with said mixture by at least one of: traversing the mixture directly and/or traversing the mixture by evanescent fields at an optical boundary between said mixture and a region external to said at least one light scattering control volume; wherein said input light field is transformed into an output light field having different properties including at least one of direction, linear momentum, spin angular momentum, polarization, orbital angular momentum, irradiance, frequency, photon energy, angular spread, power, and information content, all by a graded refractive index that is created in both time and space as needed by controlling said at least one source of electromagnetic fields.

2. The apparatus of claim 1, wherein said particle forces, said particle orientations, and said particle stress vary with a dielectrophoretic electric field frequency.

3. The apparatus of claim 1, wherein said particle orientation can be arbitrarily selected by one or more applied frequencies of said electric electromagnetic fields producing the dielectrophoresis.

4. The apparatus of claim 1, wherein said plurality of distinct and separate particles are smaller than the wavelength of input light.

5. The apparatus of claim 1, wherein said plurality of distinct and separate particles comprise nanostructured particles with designed shapes and scattering properties.

6. The apparatus of claim 1, wherein said plurality of distinct and separate particles comprise at least one of a dielectric, a semiconductor, and soft matter such as an emulsion.

7. The apparatus of claim 1, wherein said plurality of distinct and separate particles comprise optical scatterers of at least one of a quantum dot, a plasmonic dot, a photonic crystal dot, a virus, and a biologic cell, and atomically doped materials, all of which have complex internal structures.

8. The apparatus of claim 1, wherein said plurality of distinct and separate particles includes particles having a distribution of different sizes, shapes, dielectric constants, refractive indices and conductivities.

9. The apparatus of claim 1, wherein said plurality of distinct and separate particles comprises at least one of optically transparent, optically opaque and optically reflecting particles.

10. The apparatus of claim 1, wherein said plurality of distinct and separate particles comprises at least one of glass, diamond, titanium dioxide, corundum, barium titanate, metals, and metallic alloys.

11. The apparatus of claim 1, wherein said plurality of distinct and separate particles is subject to at least one of positive material dispersion and negative material dispersion.

12. The apparatus of claim 1, wherein said plurality of distinct and separate particles comprise, doped transparent gain medium with atoms of at least one of dysprosium, erbium, holmium, neodymium, praseodymium, thulium, and ytterbium.

13. The apparatus of claim 1, wherein said plurality of distinct and separate particles comprise photochromatic particles.

14. The apparatus of claim 1, wherein said plurality of distinct and separate particles comprise electret type particles.

15. The apparatus of claim 1, wherein said plurality of distinct and separate particles comprises at least one of solid particles, and particles with voids therein.

16. The apparatus of claim 1, wherein said plurality of distinct and separate particles comprises at least one of: cage molecules, cage molecule derivatives formed by chemical bonding, and endohedral forms of cage molecules.

17. The apparatus of claim 1, wherein said plurality of distinct and separate particles comprise in part surfactants and other chemicals to help provide a stable colloid that remains separated and does not precipitate and flocculate.

18. The apparatus of claim 1, wherein said plurality of distinct and separate particles is optically transparent over a select spectral range.

19. The apparatus of claim 1, wherein said plurality of distinct and separate particles comprise Janus type particles, which comprise different material properties on at least two portions of each particle, so that a self-phoretic process may self-propel and self-rotate said plurality of distinct and separate particles using an energy derived from an environment to provide at least one of a modified distribution of particles and a modification of a diffusion coefficient.

20. The apparatus of claim 1, wherein said at least one source of electromagnetic fields provides fields that have at least one of a field harmonic signal, a plurality of field harmonic signals, a field frequency combs, and a field noise.

21. The apparatus of claim 1, wherein said at least one light scattering control volume has at least one optically transparent window configured to allow light to enter, exit, and interact jointly with said mixture.

22. The apparatus of claim 1, wherein said at least one source of electromagnetic fields is distributed by at least one of metallic electrodes, dielectric electrodes, and semi-conductor electrodes.

23. The apparatus of claim 1, wherein said plurality of distinct and separate particles resides in at least one of a liquid, a gas, and vacuum as a continuous medium.

24. A dielectrophoresis-based device for scattering an input light field, comprising;
   (a) a plurality of distinct and separate particles;
   (b) at least one transparent medium;
   (c) at least one light scattering control volume;
   (d) at least one source of electromagnetic fields;
   wherein said plurality of distinct and separate particles is mixed with said at least one transparent medium to form a substantially transparent non-solid medium, which is a mixture, and where said plurality of distinct and separate particles can distribute in said mixture within said at least one light scattering control volume, where there are also electromagnetic fields from said at least one source of electromagnetic fields, so that at least one of a particle force, a particle torque, and particle stress on each of said plurality of distinct and separate particles may exist by means of generalized dielectrophoresis, which allows at least one of a particle position, a particle orientation, and a particle shape of some portion of said plurality of distinct and separate particles to change by forced diffusion processes so that optical properties of said mixture can change, so that an input light interacts with said mixture by at least one of: traversing the mixture directly and/or traversing the mixture by evanescent fields at an optical boundary between said mixture and a region external to said at least one light scattering control volume; wherein said input light field can be transformed into an output light field having different properties including at least one of direction, linear momentum, spin angular momentum, polarization, orbital angular momentum, irradiance, frequency, photon energy, angular spread, power, and information content, all by a graded refractive index that is created in both time and space as needed by controlling said at least one source of electromagnetic fields; and said plurality of distinct and separate particles comprise at least one of a dielectric, a semiconductor, and soft matter such as an emulsion.

25. A dielectrophoresis-based device for scattering an input light field, comprising;
   (a) a plurality of distinct and separate particles;
   (b) at least one transparent medium;
   (c) at least one light scattering control volume;
   (d) at least one source of electromagnetic fields;
   wherein said plurality of distinct and separate particles is mixed with said at least one transparent medium to form a substantially transparent non-solid medium, which is a mixture, and where said plurality of distinct and separate particles can distribute in said mixture within said at least one light scattering control volume, where there are uniform electromagnetic fields from said at least one source of electromagnetic fields, so that at least one of a particle force, a particle torque, and particle stress on each of said plurality of distinct and separate particles may exist by means of generalized dielectrophoresis, which allows at least one of a particle position, a particle orientation, and a particle shape of some portion of said plurality of distinct and separate particles to change by forced diffusion processes so that optical properties of said mixture can change, so that an input light interacts with said mixture by at least one of: traversing the mixture directly and/or traversing the mixture by evanescent fields at an optical boundary between said mixture and a region external to said at least one light scattering control volume; wherein said input light field can be transformed into an output light field having different properties including at least one of direction, linear momentum, spin angular momentum, polarization, orbital angular momentum, irradiance, frequency, photon energy, angular spread, power, and information content, all by a graded refractive index that is created in both time and space as needed by controlling said at least one source of electromagnetic fields.

* * * * *